US012710358B2

(12) United States Patent
Kangas et al.

(10) Patent No.: US 12,710,358 B2
(45) Date of Patent: Aug. 18, 2026

(54) REFERENCE SWITCH ARCHITECTURES FOR NONCONTACT SENSING OF SUBSTANCES

(71) Applicant: Apple Inc., Cupertino, CA (US)

(72) Inventors: Miikka M. Kangas, Campbell, CA (US); Mark Alan Arbore, Los Altos, CA (US); David I. Simon, San Francisco, CA (US); Michael J. Bishop, Waterloo (CA); James W. Hillendahl, San Carlos, CA (US); Robert Chen, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 180 days.

(21) Appl. No.: 18/808,482

(22) Filed: Aug. 19, 2024

(65) Prior Publication Data

US 2024/0410822 A1 Dec. 12, 2024

Related U.S. Application Data

(63) Continuation of application No. 18/111,740, filed on Feb. 20, 2023, now Pat. No. 12,085,500, which is a (Continued)

(51) Int. Cl.
*G01N 21/27* (2006.01)
*G01J 3/02* (2006.01)

(Continued)

(52) U.S. Cl.
CPC .......... *G01N 21/276* (2013.01); *G01J 3/0286* (2013.01); *G01J 3/32* (2013.01);

(Continued)

(58) Field of Classification Search
CPC .... G01N 21/276; G01N 21/35; G01N 21/474; G01N 21/4785; G01N 21/21;

(Continued)

(56) References Cited

U.S. PATENT DOCUMENTS 3,805,074 A * 4/1974 McCormack ...... G01N 21/3504 250/354.1
3,861,788 A 1/1975 Webster (Continued)

FOREIGN PATENT DOCUMENTS

CN 101199413 6/2008
CN 101622566 1/2010

(Continued)

OTHER PUBLICATIONS

Aguirre et al. (Feb. 17, 2010). "High speed optical coherence microscopy with autofocus adjustment and a miniaturized endoscopic imaging probe," Optical Society of America, vol. 18, No. 5, Retrieved from the Internet: lir-11:1-1Up://w,A,w.ncbi.nlimnih.govipmclarticies/PMC2908909/pdlioe-18-5-4222.pcii , retrieved on Oct. 31, 2014, Figures 107, pp. 4226-4235.

(Continued)

*Primary Examiner* — Blake C Riddick
(74) *Attorney, Agent, or Firm* — Brownstein Hyatt Farber Schreck, LLP

(57) ABSTRACT

This relates to systems and methods for measuring a concentration and type of substance in a sample at a sampling interface. The systems can include a light source, optics, one or more modulators, a reference, a detector, and a controller. The systems and methods disclosed can be capable of accounting for drift originating from the light source, one or more optics, and the detector by sharing one or more components between different measurement light paths. Additionally, the systems can be capable of differentiating between different types of drift and eliminating erroneous measurements due to stray light with the placement of one or more modulators between the light source and the sample or reference. Furthermore, the systems can be capable of detecting the substance along various locations and depths (Continued)

within the sample by mapping a detector pixel and a microoptics to the location and depth in the sample.

20 Claims, 22 Drawing Sheets

Related U.S. Application Data continuation of application No. 17/063,483, filed on Oct. 5, 2020, now Pat. No. 11,585,749, which is a continuation of application No. 15/751,095, filed as application No. PCT/US2016/049330 on Aug. 29, 2016, now Pat. No. 10,801,950.

(60) Provisional application No. 62/213,004, filed on Sep. 1, 2015.

(51) Int. Cl.

| | |
|---|---|
| ***G01J 3/32*** | (2006.01) |
| ***G01J 3/36*** | (2006.01) |
| ***G01J 3/42*** | (2006.01) |
| ***G01J 3/433*** | (2006.01) |
| ***G01J 3/447*** | (2006.01) |
| ***G01N 21/21*** | (2006.01) |
| ***G01N 21/35*** | (2014.01) |
| ***G01N 21/47*** | (2006.01) |
| ***G01N 21/49*** | (2006.01) |

(52) U.S. Cl.

CPC . *G01J 3/36* (2013.01); *G01J 3/42* (2013.01); *G01J 3/433* (2013.01); *G01J 3/447* (2013.01); *G01N 21/35* (2013.01); *G01N 21/474* (2013.01); *G01N 21/4785* (2013.01); *G01N 21/21* (2013.01); *G01N 2021/4709* (2013.01); *G01N 2021/4778* (2013.01); *G01N 21/49* (2013.01); *G01N 2201/0221* (2013.01); *G01N 2201/12707* (2013.01); *G01N 2201/12723* (2013.01)

(58) Field of Classification Search

CPC ........... G01N 21/49; G01N 2021/4709; G01N 2021/4778; G01N 2201/0221; G01N 2201/12707; G01N 2201/12723; G91J 3/0286; G91J 3/32; G91J 3/36; G91J 3/42; G91J 3/433; G91J 3/447

See application file for complete search history.

(56) References Cited

U.S. PATENT DOCUMENTS

| | | | | |
|---|---|---|---|---|
| 4,082,464 | A * | 4/1978 | Johnson, Jr. ............. | G01J 3/12 356/418 |
| 4,195,311 | A | 3/1980 | Moran | |
| 4,236,076 | A | 11/1980 | Judge | |
| 4,260,263 | A | 4/1981 | Kummer | |
| 4,286,327 | A | 8/1981 | Rosenthal | |
| 4,300,167 | A | 11/1981 | Miller | |
| 4,810,077 | A | 3/1989 | Sting | |
| 4,956,796 | A | 9/1990 | Rogers | |
| 4,975,581 | A | 12/1990 | Robinson | |
| 5,220,403 | A | 6/1993 | Batchelder | |
| 5,430,787 | A | 7/1995 | Norton | |
| 5,475,235 | A | 12/1995 | Phillips | |
| 5,483,261 | A | 1/1996 | Yasutake | |
| 5,488,204 | A | 1/1996 | Mead et al. | |
| 5,644,667 | A | 7/1997 | Tabuchi | |
| 5,652,654 | A | 7/1997 | Asimopoulos | |
| 5,737,078 | A | 4/1998 | Takarada | |
| 5,818,629 | A | 10/1998 | Kinoshita | |
| 5,825,352 | A | 10/1998 | Bisset et al. | |
| 5,835,079 | A | 11/1998 | Shieh | |
| 5,880,411 | A | 3/1999 | Gillespie et al. | |
| 5,936,739 | A | 8/1999 | Cameron | |
| 5,953,133 | A | 9/1999 | Fujimiya et al. | |
| 6,048,755 | A | 4/2000 | Jiang | |
| 6,104,946 | A | 8/2000 | Tsuchiya | |
| 6,122,042 | A | 9/2000 | Wunderman et al. | |
| 6,188,391 | B1 | 2/2001 | Seely et al. | |
| 6,198,531 | B1 | 3/2001 | Nielsen | |
| 6,236,459 | B1 | 5/2001 | Negahdaripour | |
| 6,248,988 | B1 | 6/2001 | Krantz | |
| 6,310,610 | B1 | 10/2001 | Beaton et al. | |
| 6,424,416 | B1 | 7/2002 | Gross et al. | |
| 6,519,033 | B1 | 2/2003 | Quist | |
| 6,690,387 | B2 | 2/2004 | Zimmerman et al. | |
| 6,826,424 | B1 | 11/2004 | Zeng et al. | |
| 6,844,554 | B2 | 1/2005 | Karlsson | |
| 6,892,449 | B1 | 5/2005 | Brophy et al. | |
| 6,940,625 | B2 | 9/2005 | Endo et al. | |
| 6,987,906 | B2 | 1/2006 | Nakama et al. | |
| 6,999,183 | B2 | 2/2006 | Nielsen et al. | |
| 7,015,894 | B2 | 3/2006 | Morohoshi | |
| 7,061,623 | B2 | 6/2006 | Davidson | |
| 7,129,508 | B2 | 10/2006 | Chen | |
| 7,184,064 | B2 | 2/2007 | Zimmerman et al. | |
| 7,203,426 | B2 | 4/2007 | Wu et al. | |
| 7,282,723 | B2 | 10/2007 | Schomacker | |
| 7,405,825 | B2 | 7/2008 | Schuurmans et al. | |
| 7,428,057 | B2 | 9/2008 | De Lega et al. | |
| 7,433,042 | B1 | 10/2008 | Cavanaugh | |
| 7,466,636 | B2 | 12/2008 | Buchler et al. | |
| 7,495,768 | B2 | 2/2009 | Mori et al. | |
| 7,623,233 | B2 | 11/2009 | Freese et al. | |
| 7,650,743 | B2 | 1/2010 | Wehler et al. | |
| 7,663,607 | B2 | 2/2010 | Hotelling et al. | |
| 7,720,291 | B2 | 5/2010 | Trifonov et al. | |
| 7,751,741 | B2 | 7/2010 | Hirai | |
| 7,884,933 | B1 | 2/2011 | Kashyap | |
| 8,102,530 | B2 | 1/2012 | Sperling | |
| 8,179,526 | B2 | 5/2012 | Bennett et al. | |
| 8,498,681 | B2 | 7/2013 | Wang et al. | |
| 8,515,217 | B2 | 8/2013 | Bernasconi et al. | |
| 8,518,643 | B2 | 8/2013 | Rank et al. | |
| 8,564,784 | B2 | 10/2013 | Wang et al. | |
| 8,597,190 | B2 | 12/2013 | Rule et al. | |
| 8,619,177 | B2 | 12/2013 | Perwass | |
| 8,619,237 | B2 | 12/2013 | Hillman et al. | |
| 8,629,930 | B2 | 1/2014 | Brueckner et al. | |
| 8,634,072 | B2 | 1/2014 | Trainer | |
| 8,670,123 | B2 | 3/2014 | Schleipen et al. | |
| 8,731,638 | B2 | 5/2014 | Butler | |
| 8,928,877 | B2 | 1/2015 | Lim et al. | |
| 8,951,472 | B2 | 2/2015 | Kellner et al. | |
| 8,958,056 | B2 | 2/2015 | Wiethege et al. | |
| 9,013,684 | B2 | 4/2015 | Xalter et al. | |
| 9,024,252 | B2 | 5/2015 | Chiarello et al. | |
| 9,036,145 | B2 | 5/2015 | Froigneux et al. | |
| 9,036,956 | B2 | 5/2015 | Tseng et al. | |
| 9,062,957 | B2 | 6/2015 | Yamada | |
| 9,075,015 | B2 | 7/2015 | Shapiro | |
| 9,185,272 | B2 | 11/2015 | Ebe | |
| 9,217,669 | B2 | 12/2015 | Wu et al. | |
| 9,234,747 | B2 | 1/2016 | Ishii et al. | |
| 9,287,314 | B2 | 3/2016 | Toda | |
| 9,307,127 | B2 | 4/2016 | Masuda | |
| 9,322,773 | B2 | 4/2016 | Coates et al. | |
| 9,377,396 | B2 | 6/2016 | Goldring et al. | |
| 9,380,968 | B2 | 7/2016 | Nishida et al. | |
| 9,442,084 | B2 | 9/2016 | Kakefuda | |
| 9,459,201 | B2 | 10/2016 | Gulati et al. | |
| 9,494,535 | B2 | 11/2016 | Sezginer | |
| 9,531,963 | B2 | 12/2016 | Yamanaka | |
| 9,562,848 | B2 | 2/2017 | Goldring et al. | |
| 9,585,604 | B2 | 3/2017 | Ruchti et al. | |
| 9,597,024 | B2 | 3/2017 | Robinson et al. | |
| 9,739,663 | B2 | 8/2017 | Haider et al. | |
| 9,804,027 | B2 | 10/2017 | Fish et al. | |
| 9,955,111 | B2 | 4/2018 | Mori | |
| 10,085,656 | B2 | 10/2018 | Sato | |

(56) References Cited

U.S. PATENT DOCUMENTS

| | | | | |
|---|---|---|---|---|
| 10,132,996 | B2 | 11/2018 | Lambert | |
| 10,139,278 | B2 | 11/2018 | Fish et al. | |
| 10,274,426 | B2 | 4/2019 | Arbore et al. | |
| 10,411,433 | B2 | 9/2019 | Weber | |
| 10,416,434 | B2 | 9/2019 | Fujimoto et al. | |
| 10,429,597 | B2 | 10/2019 | ten Have et al. | |
| 10,551,605 | B2 | 2/2020 | Arbore et al. | |
| 10,620,105 | B2 | 4/2020 | Trainer | |
| 10,718,931 | B2 | 7/2020 | Arbore et al. | |
| 10,788,366 | B2 | 9/2020 | Arbore et al. | |
| 10,801,950 | B2 | 10/2020 | Kangas et al. | |
| 10,983,413 | B2 | 4/2021 | Shin et al. | |
| 11,035,793 | B2 | 6/2021 | Arbore et al. | |
| 11,206,985 | B2 | 12/2021 | Alford et al. | |
| 11,226,459 | B2 | 1/2022 | Bishop et al. | |
| 11,243,115 | B2 | 2/2022 | Arbore et al. | |
| 11,320,717 | B2 | 5/2022 | Zhu et al. | |
| 11,378,808 | B2 | 7/2022 | Hargis et al. | |
| 11,579,080 | B2 | 2/2023 | Arbore et al. | |
| 11,585,749 | B2 | 2/2023 | Kangas et al. | |
| 11,726,036 | B2 | 8/2023 | Arbore et al. | |
| 11,852,318 | B2 | 12/2023 | Arbore et al. | |
| 11,960,131 | B2 | 4/2024 | Bishop et al. | |
| 12,007,275 | B2 | 6/2024 | Arbore et al. | |
| 2003/0108821 | A1 | 6/2003 | Mei | |
| 2004/0147810 | A1 | 7/2004 | Mizuno | |
| 2005/0063431 | A1 | 3/2005 | Gallup et al. | |
| 2006/0178570 | A1 | 8/2006 | Robinson | |
| 2007/0057211 | A1 | 3/2007 | Bahlman et al. | |
| 2007/0258083 | A1 | 11/2007 | Heppell | |
| 2008/0044128 | A1 | 2/2008 | Kish et al. | |
| 2009/0087925 | A1 | 4/2009 | Wagner | |
| 2010/0220315 | A1 | 9/2010 | Morrell et al. | |
| 2011/0081064 | A1 | 4/2011 | Hsu | |
| 2011/0184260 | A1 | 7/2011 | Robinson et al. | |
| 2012/0059232 | A1 | 3/2012 | Gross et al. | |
| 2012/0281258 | A1 | 11/2012 | Sheblee et al. | |
| 2013/0215409 | A1* | 8/2013 | Wiethege | G01S 7/4816 356/3.01 |
| 2015/0018642 | A1* | 1/2015 | Gulati | A61B 5/0022 600/316 |
| 2015/0018644 | A1 | 1/2015 | Gulati et al. | |
| 2015/0226659 | A1 | 8/2015 | Matayoshi et al. | |
| 2017/0006231 | A1* | 1/2017 | Mori | G11B 27/3027 |
| 2017/0164848 | A1 | 6/2017 | Nadeau et al. | |
| 2017/0328912 | A1 | 11/2017 | Szlag et al. | |
| 2018/0052378 | A1 | 2/2018 | Shin et al. | |
| 2019/0137337 | A1 | 5/2019 | Ridder et al. | |
| 2022/0037856 | A1 | 2/2022 | Ghosh et al. | |
| 2022/0104735 | A1 | 4/2022 | Lee et al. | |
| 2022/0136899 | A1 | 5/2022 | Arbore et al. | |
| 2023/0204497 | A1 | 6/2023 | Kangas et al. | |
| 2023/0266243 | A1 | 8/2023 | Arbore et al. | |
| 2023/0314321 | A1 | 10/2023 | Arbore et al. | |
| 2024/0117953 | A1 | 4/2024 | Arbore et al. | |
| 2024/0288306 | A1 | 8/2024 | Arbore et al. | |
| 2025/0110043 | A1 | 4/2025 | Arbore et al. | |

FOREIGN PATENT DOCUMENTS

| | | |
|---|---|---|
| CN | 101625319 | 1/2010 |
| CN | 101840004 | 9/2010 |
| CN | 102038486 | 5/2011 |
| CN | 102308196 | 1/2012 |
| CN | 102334021 | 1/2012 |
| CN | 102439426 | 5/2012 |
| CN | 102472664 | 5/2012 |
| CN | 102519976 | 6/2012 |
| CN | 102803930 | 11/2012 |
| CN | 103842797 | 6/2014 |
| CN | 104614084 | 5/2015 |
| CN | 104733483 | 6/2015 |
| CN | 105223163 | 1/2016 |
| CN | 105438912 | 3/2016 |
| CN | 106662706 | 5/2017 |
| CN | 106941779 | 7/2017 |
| CN | 107250767 | 10/2017 |
| CN | 108449957 | 8/2018 |
| DE | 102018211972 | 1/2020 |
| EP | 0168983 | 1/1986 |
| EP | 0943950 | 9/1999 |
| EP | 1292134 | 3/2003 |
| EP | 1403985 | 3/2004 |
| EP | 1432045 | 6/2004 |
| EP | 2219021 | 8/2010 |
| EP | 2320027 | 5/2011 |
| EP | 3213053 B1 | 8/2019 |
| GB | 2399220 | 9/2004 |
| JP | 2000163031 | 6/2000 |
| JP | 2000171403 | 6/2000 |
| JP | 2002342033 | 11/2002 |
| JP | 2003090798 | 3/2003 |
| JP | 2010044004 | 2/2010 |
| JP | 2013/533502 | 8/2013 |
| JP | 2014163895 | 9/2014 |
| JP | 2020511693 | 4/2020 |
| JP | 2020516959 | 6/2020 |
| KR | 1020050003353 | 1/2005 |
| KR | 20070092818 | 9/2007 |
| KR | 1020090116731 | 11/2009 |
| KR | 1020110077598 | 7/2011 |
| KR | 20130045189 | 5/2013 |
| KR | 1020140130702 | 11/2014 |
| WO | WO 85/003575 | 8/1985 |
| WO | WO 01/014929 | 3/2001 |
| WO | WO 03/056876 | 7/2003 |
| WO | WO 03/087787 | 10/2003 |
| WO | WO 04/031824 | 4/2004 |
| WO | WO 06/086566 | 8/2006 |
| WO | WO 07/121593 | 11/2007 |
| WO | WO 08/032193 | 3/2008 |
| WO | WO 13/126280 | 8/2013 |
| WO | WO 15/029787 | 3/2015 |
| WO | WO 15/101992 | 7/2015 |
| WO | WO 16/106350 | 6/2016 |
| WO | WO 16/106368 | 6/2016 |
| WO | WO 16/109355 | 7/2016 |
| WO | WO 17/040431 | 3/2017 |
| WO | WO 17/184420 | 10/2017 |
| WO | WO 17/184423 | 10/2017 |
| WO | WO 20/065391 | 4/2020 |

OTHER PUBLICATIONS

Bogaerts, et al., "Off-Chip Coupling," *Handbook of Silicon Photonics*, CRC Press, Apr. 2013, 43 pages.

He et al., "Integrated Polarization Compensator for WDM Waveguide Demultiplexers," *IEEE Photonics Technology Letters* vol. 11, No. 2, Feb. 1999, pp. 224-226.

Ke, S. et al. (Feb. 10, 2009) "Three-dimensional coherent transfer function for a confocal microscope with two D-shaped pupils," Applied Optics, Optical Society of America, Washington, DC; US, vol. 48, No. 5, pp. 810-817.

Kurugol, S. et al. (2011). "Semi-automated Algorithm for Localization of Dermal/Epidermal Junction in Reflectance Confocal Microscopy Images of Human Skin," Proc. of SPIE, vol. 7904, ten pages.

Sayli et al., "Two-distance partial pathlength method for accurate measurement of muscle oxidative metabolism using fNIRS," Proceeding of SPIE, Bellingham, Washington USA, vol. 6084, 2006, 8 pages.

Xia et al., "Study of optical parameters of polystyrene spheres in dense aqueous suspensions," *Applied Optics*, May 23, 2012, vol. 51, No. 16, pp. 3263-3268.

* cited by examiner

REFERENCE SWITCH ARCHITECTURES FOR NONCONTACT SENSING OF SUBSTANCES

CROSS-REFERENCE TO RELATED APPLICATIONS

This application is a continuation of U.S. patent application Ser. No. 18/111,740, filed Feb. 20, 2023, which is a continuation of U.S. patent application Ser. No. 17/063,483, filed Oct. 5, 2020, now U.S. Pat. No. 11,585,749, which is a continuation of U.S. patent application Ser. No. 15/751,095, filed Feb. 7, 2018, now U.S. Pat. No. 10,801,950, which is a National Phase Patent Application under 35 U.S.C. § 371 of International Application No. PCT/US2016/049330, filed Aug. 29, 2016, which claims priority to U.S. Provisional Patent Application No. 62/213,004, filed Sep. 1, 2015, which are hereby incorporated by reference in their entirety.

FIELD

This relates generally to a reference switch architecture capable of detecting one or more substances in a sample at a sampling interface, and more particularly, capable of reconstructing one or more optical paths in the sample.

BACKGROUND

Absorption spectroscopy is an analytical technique that can be used to determine the concentration and type of substance in a sample at a sampling interface. Conventional systems and methods for absorption spectroscopy can include emitting light at the sample. As light transmits through the sample, a portion of the light energy can be absorbed at one or more wavelengths. This absorption can cause a change in the properties of the light exiting the sample. The properties of the light exiting the sample can be compared to the properties of the light exiting a reference, and the concentration and type of substance in the sample can be determined based on this comparison.

Although the comparison can determine the concentration and type of substance in the sample, the measurements and determination can be erroneous due to the inability to differentiate and compensate for stray light and fluctuations, drift, and variations early on, instead of after a large number (e.g., tens or hundreds) of sample points are measured. Furthermore, some conventional systems and methods may not be capable of measuring the concentration at multiple locations within the sample. Those systems and methods that can be capable of measuring the concentration at multiple locations can require complicated components or detection schemes to associate the depths of the locations within the sample or path lengths of the light exiting the sample.

SUMMARY

This relates to systems and methods for measuring a concentration of a substance in a sample when the concentration in the sample is low or the SNR is low (e.g., SNR<$10^{-4}$ or $10^{-5}$). The systems and methods disclosed can be capable of accounting for fluctuations, drift, and/or variations originating from the light source, one or more optics, and the detector in the system by sharing one or more components between the light path for measuring the sample optical properties and the light path for measuring the reference optical properties. Additionally, the systems can be capable of differentiating between different types of drift and can be capable of eliminating erroneous measurements due to stray light with the placement of one or more modulators between the light source and the sample or reference. Furthermore, the systems can be capable of detecting the substance along various locations and depths within the sample by mapping a detector pixel in a detector array and a microoptics in a microoptics unit to the location and depth in the sample.

DETAILED DESCRIPTION

Figure 1:
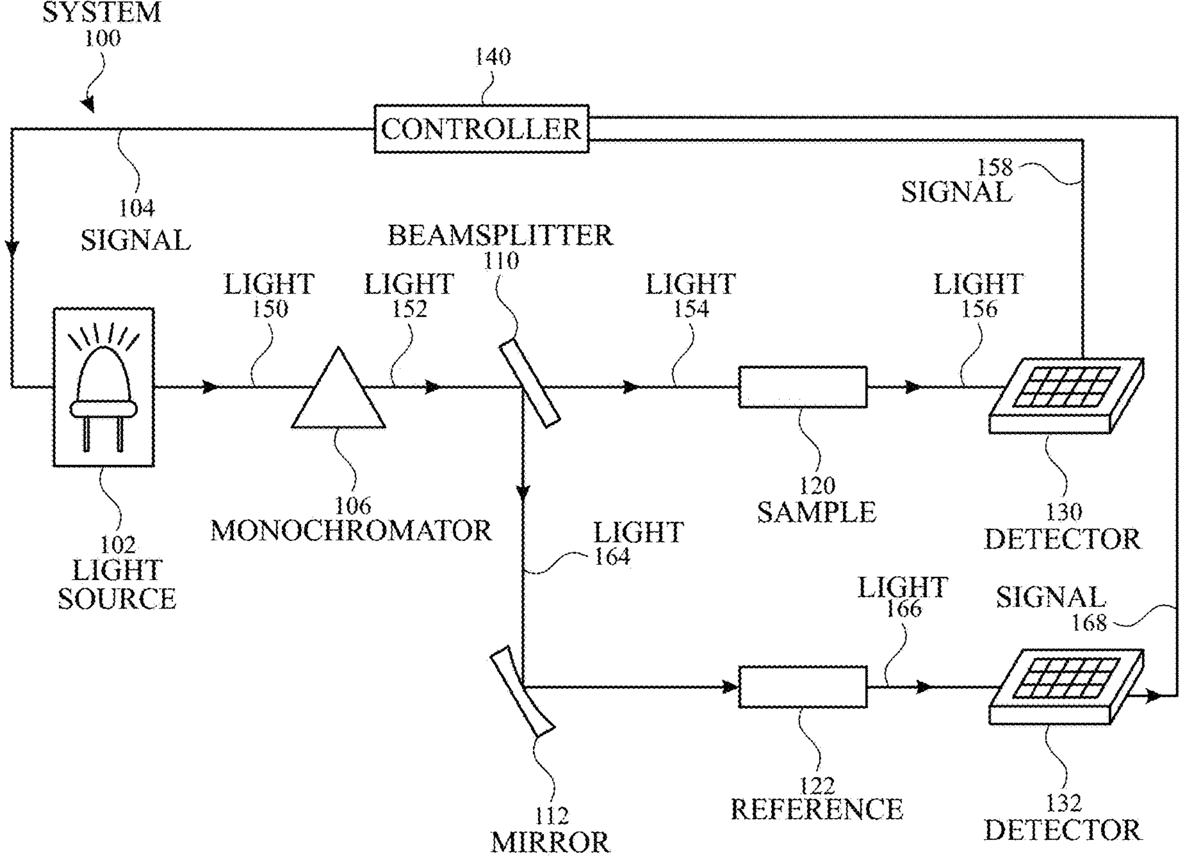
FIG. 1 illustrates an exemplary system comprising multiple detectors for measuring the concentration of a substance in a sample according to examples of the disclosure.

In the following description of examples, reference is made to the accompanying drawings in which it is shown by way of illustration specific examples that can be practiced. It is to be understood that other examples can be used and structural changes can be made without departing from the scope of the various examples.

Representative applications of methods and apparatus according to the present disclosure are described in this section. These examples are being provided solely to add context and aid in the understanding of the described examples. It will thus be apparent to one skilled in the art that the described examples may be practiced without some or all of the specific details. Other applications are possible, such that the following examples should not be taken as limiting.

Various techniques and process flow steps will be described in detail with reference to examples as illustrated in the accompanying drawings. In the following description, numerous specific details are set forth in order to provide a thorough understanding of one or more aspects and/or features described or referenced herein. It will be apparent, however, to one skilled in the art, that one or more aspects and/or features described or referenced herein may be practiced without some or all of these specific details. In other instances, well-known process steps and/or structures have not been described in detail in order to not obscure some of the aspects and/or features described or referenced herein.

Further, although process steps or method steps can be described in a sequential order, such processes and methods can be configured to work in any suitable order. In other words, any sequence or order of steps that can be described in the disclosure does not, in and of itself, indicate a requirement that the steps be performed in that order. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modification thereto, does not imply that the illustrated process or any of its steps are necessary to one or more of the examples, and does not imply that the illustrated process is preferred.

This disclosure relates to systems and methods for measuring a concentration and type of substance in a sample at a sampling interface. In some examples, the concentration in the sample can be low, or the SNR can be low (e.g., $SNR<10^{-4}$ or $10^{-5}$). The systems can include a light source, optics, one or more modulators, a reference, a detector, and a controller (or logic). The systems and methods disclosed can be capable of accounting for fluctuations, drift, and/or variations originating from the light source, one or more optics, and the detector by sharing one or more components between the light path for measuring the sample optical properties and the light path for measuring the reference optical properties. Additionally, the systems can be capable of differentiating between different types of drift and can be capable of eliminating erroneous measurements due to stray light with the placement of one or more modulators between the light source and the sample or reference. Furthermore, the systems can be capable of detecting the substance along various locations and depths within the sample by mapping a detector pixel in a detector array and a microoptics in a microoptics unit to the location and depth in the sample.

For substances in a sample, each substance can have a signature in a certain wavelength regime, indicated by the location of one or more absorbance peaks. One exemplary wavelength regime can be short-wavelength infrared (SWIR). A substance can absorb higher amounts of energy at one or more wavelengths and can absorb lower amounts of energy at other wavelengths, forming a spectral fingerprint unique to the substance. The determination of the type of substance in the sample can be performed by matching the pattern of the one or more absorbance peaks to this spectral fingerprint. Additionally, the concentration of the substance can be based on the amount of absorption.

The sample at a sampling interface can comprise multiple substances that can modify light incident. Of the multiple substances, one or more substances can be a substance of interest and other substances may not be of interest. In some examples, the substances not of interest can absorb more incident light than the substance of interest. Additionally, spectral artifacts can "mask" the absorbance peaks of the one or more substances of interest. Both the spectral artifacts and the absorption of substances not of interest can make detection of the substance of interest difficult. Furthermore, there can be an inhomogeneous distribution of the one or more substances in the sample, which can produce variations in the optical properties (e.g., linear birefringence, optical activity, diattenuation) of the sample.

Absorption spectroscopy is an analytical technique that can be used to determine the concentration and type of substance in a sample. Light can have an initial intensity or energy when emitted from a light source and incident on a sample. As the light is transmitted through the sample, a portion of the energy can be absorbed at one or more wavelengths. This absorption can cause a change (e.g., loss) in the intensity of the light exiting the sample. As the concentration of the substance in the sample increases, a higher amount of energy can be absorbed, and this can be represented by the measured absorbance as:

$$A = 2 - \log(T) \tag{1}$$

where T is the transmittance of the light exiting the sample.

The amount of light exiting the sample after being at least partially absorbed by a substance can decrease exponentially as the concentration of the substance in the sample increases.

Given the relationship between absorbance and transmittance stated in Equation 1, a linear relationship can exist between absorbance and the concentration of the substance in the sample. With this relationship, the concentration of the substance in the sample can be calculated using a reference and a proportional equation, defined as:

$$\frac{A_{sample}}{A_{reference}} = \frac{C_{sample}}{C_{reference}} \quad (2)$$

where $A_{sample}$ and $A_{reference}$ are the sample absorbance and reference absorbance, respectively, and $C_{sample}$ and $C_{reference}$ are the concentrations of the substance in the sample and in the reference, respectively. In some examples, the substance can include one or more chemical constituents, and the measurement can be used to determine the concentration of each chemical constituent present in the sample.

Figure 2:
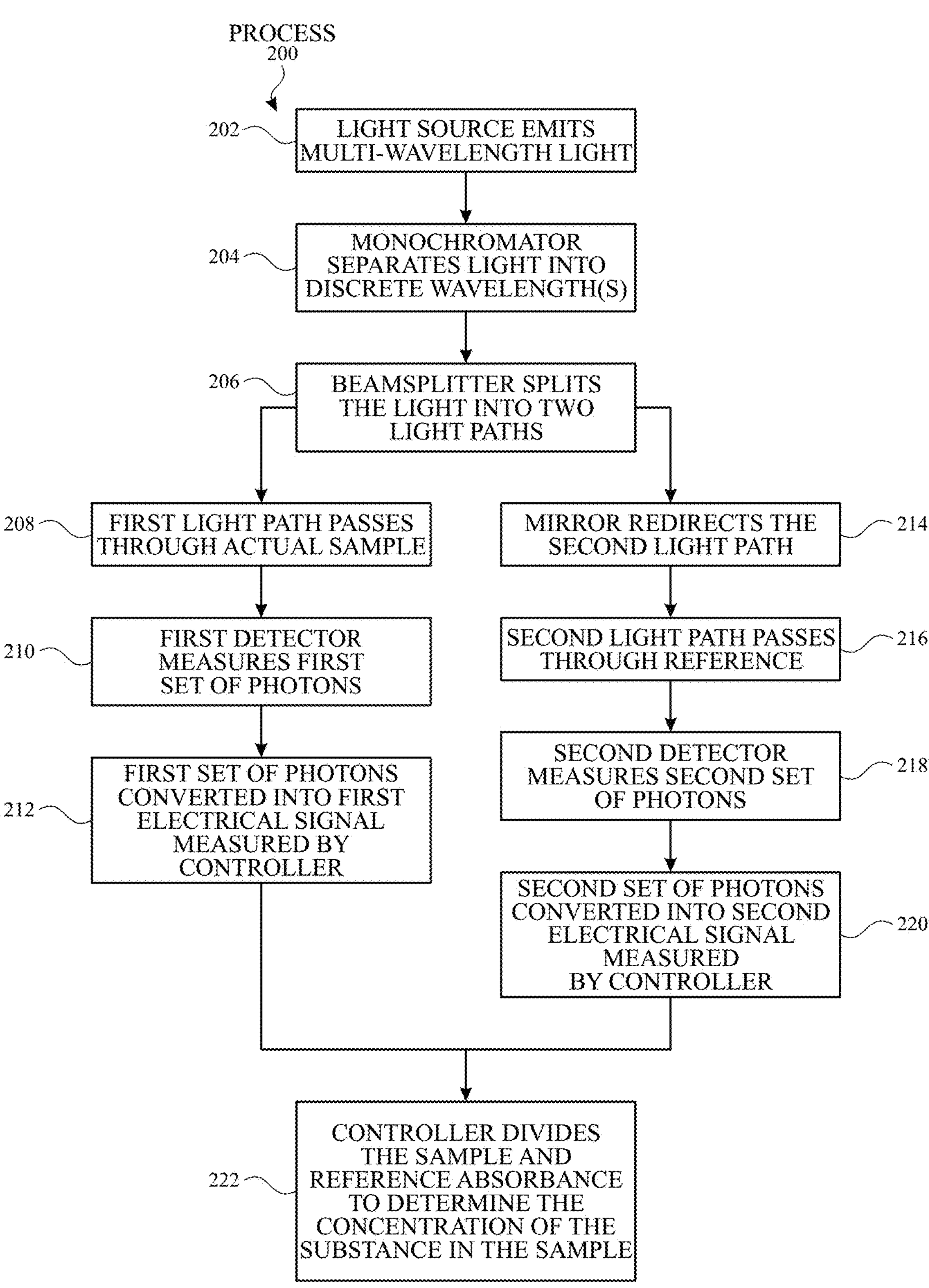
FIG. 2 illustrates an exemplary process flow for measuring the concentration and type of substance in a sample using a system comprising multiple detectors according to examples of the disclosure.

FIG. 1 illustrates an exemplary system and FIG. 2 illustrates an exemplary process flow for measuring the concentration of a substance in a sample using a system comprising multiple detectors according to examples of the disclosure. System 100 can include light source 102 controlled by controller 140 through signal 104. Light source 102 can emit multi-band or multi-wavelength light 150 towards monochromator 106 (step 202 of process 200). A monochromator is a component that can select one or more discrete wavelengths from multi-wavelength light 150. In some examples, monochromator 106 can comprise an entrance slit configured to exclude unwanted or stray light. The monochromator can be coupled with one or more interference or absorption filters, prisms, or diffraction gratings for wavelength selection. Monochromator 106 can separate light 150 into one or more discrete wavelengths forming light 152 (step 204 of process 200). Light 152 can be incident on beamsplitter 110. A beamsplitter is an optical component that can split a beam of light into multiple beams of light. Here, beamsplitter 110 can split light 152 into two light beams: light 154 and light 164 (step 206 of process 200).

Light 154 can be incident on sample 120. A portion of light can be absorbed by the substance in sample 120, and a portion of light can transmit through sample 120 (step 208 of process 200). The portion of light that transmits through sample 120 can be represented as light 156. Light 156 can comprise a set of photons that can impinge upon the active area of detector 130. Detector 130 can respond to or measure light or photons impinging on the active area (step 210 of process 200) and can generate electrical signal 158, which can be indicative of the properties of light 156 (step 212 of process 200). Electrical signal 158 can be input into controller 140.

Light 164 can be directed towards mirror 112 (step 214 of process 200). Mirror 112 can be any type of optics capable of directing or redirecting light towards reference 122. In some examples, the system can, additionally or alternatively, include, but is not limited to, non-reflective component(s) (e.g., curved waveguide) for light redirection. In some examples, system 100 can include other types of optics such as light guides, diffraction gratings, or a reflectance plate. Light 164 can be incident on reference 122. A portion of light 164 can be absorbed by the substance in reference 122, and a portion of light 164 can transmit through reference 122 as light 166 (step 216 of process 200). Light 166 can comprise a set of photons that can impinge upon the active area of detector 132. In some examples, detector 130 and detector 132 can be matched detectors. That is, detector 130 and detector 132 can have similar characteristics including, but not limited to, the type of detector, the operating conditions, and performance. Detector 132 can respond to or measure light or photons impinging on the active area (step 218 of process 200) and can generate an electrical signal 168 indicative of the properties of light 166 (step 220 of process 200). Electrical signal 168 can be input into controller 140.

Controller 140 can receive both signal 158 and signal 168. In some examples, signal 158 can include the sample absorbance (indicated as $A_{sample}$ in Equation 2), and signal 168 can include the reference absorbance (indicated as $A_{reference}$ in Equation 2). Controller 140 can divide the sample absorbance by the reference absorbance to obtain a ratio. The concentration of the substance in reference 122 can be a pre-determined or known value. Thus, controller 140 can use the ratio of the sample and reference absorbance and the known concentration of the substance in the reference to determine the concentration of the substance in the sample (step 222 of process 200).

One advantage to determining the composition of the substance in the sample using system 100 (illustrated in FIG. 1) can be that fluctuations, drift, and/or variations originating from the light source, and not originating from changes in the composition of the substance, can be compensated. For example, if the properties of light 152 emitted from light source 102 unexpectedly change, both light 154 and light 164 can be equally affected by this unexpected change. As a result, both light 156 and light 166 can also be equally affected such that the change in light can be canceled when controller 140 divides signal 158 by signal 168. However, since system 100 includes two different detectors (e.g., detector 130 and detector 132) for the absorbance measurements, fluctuations, drift, and/or variations originating from the detectors themselves may not be compensated. Although detector 130 and detector 132 can be matched (i.e., have the same characteristics), the rate or effect that various factors unrelated to the substance, such as environmental conditions, can have on the different detectors may not be the same. One skilled in the art would appreciate that the same characteristics can include tolerances that result in a 15% deviation. With differing effects to the different detectors, only one signal, and not both signals, can be perturbed. Instead of controller 140 realizing that there is a factor unrelated to the substance that has perturbed only one signal, controller 140 can erroneous calculate this perturbation as a difference in the concentration of sample 120 compared to the reference 122. Alternatively or additionally, controller 140 can mistake the type of substance if the perturbation leads to change in the spectral fingerprint.

There can be many sources of fluctuations, drift, and variations. One exemplary drift can be an initialization drift due to "warming up" the components. While the user can wait a certain time until such initialization drift has stabilized, this may not be a suitable solution in certain applications. For example, in systems where low power consumption is desired, certain components can be turned off when not in use to conserve power and then switched on when in use. Waiting for the components to warm up may become frustrating for the user depending on how long it would take for stabilization. Furthermore, the power consumed while waiting may consume power such that the benefit of turning off the components may be negated. Another exemplary drift can be due to noise. For example, 1/f noise can be present due to randomly changing non-ohmic contacts of the electrodes and/or influences from surface state traps within a component. With random changes, not only are the changes unpredictable, but also may affect the different detectors in a different manner. Another exemplary drift can be thermal drift due to variations in temperature and/or humidity of the ambient environment, which may also affect the different detectors in a different manner.

Regardless of the source of the fluctuations, drift, and variations, the effect of having a detector measure the sample and a different detector measure the reference can lead to an unwanted change in the sensitivity, detectivity, and/or absorbance spectrum. Since the light path traveling through the sample can be different from the light path traveling through the reference and there can be many non-shared components or unmapped correlations between the two paths, any change in signal due to mismatch between the light paths may not be differentiated from the change in signal due to the substance of interest.

Since light source 102 in system 100 can be shared, drift and instabilities originating from light source 102 can be compensated for. However, drift or instabilities originating from components that are not shared (i.e., not common) along both light paths may not be compensated for. Moreover, the measurement capabilities of the system can be limited in situations where the detectors are shot noise limited. Shot noise is the noise or current generated from random generation and flow of mobile charge carriers. With shot noise limited detectors, the different detectors can have random and/or different noise floors. As a result, system 100 (illustrated in FIG. 1) may not be suitable for high sensitivity or low signal measurements.

Figure 3:
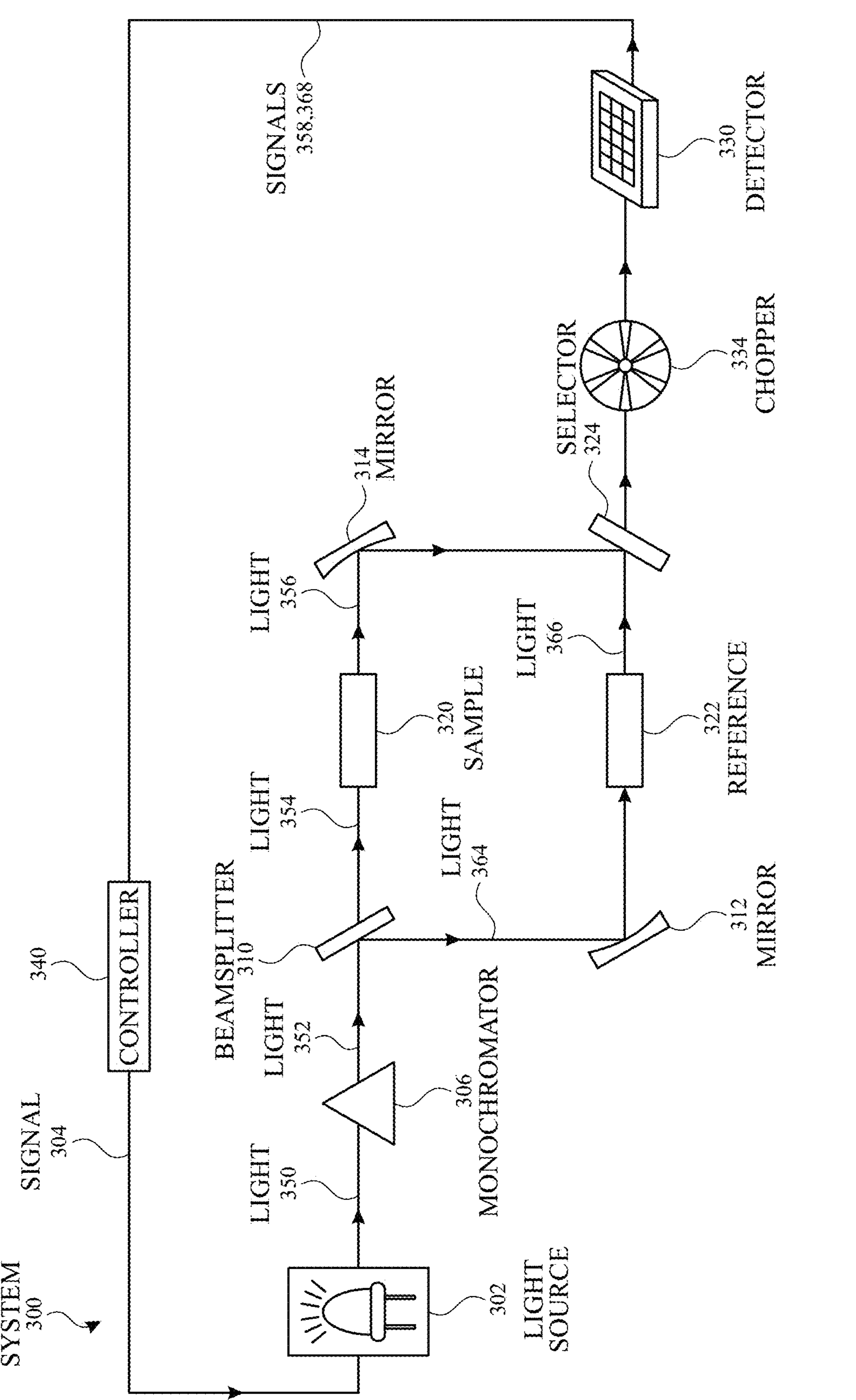
FIG. 3 illustrates an exemplary system comprising a shared detector for measuring the concentration and type of substance in a sample according to examples of the disclosure.
Figure 4:
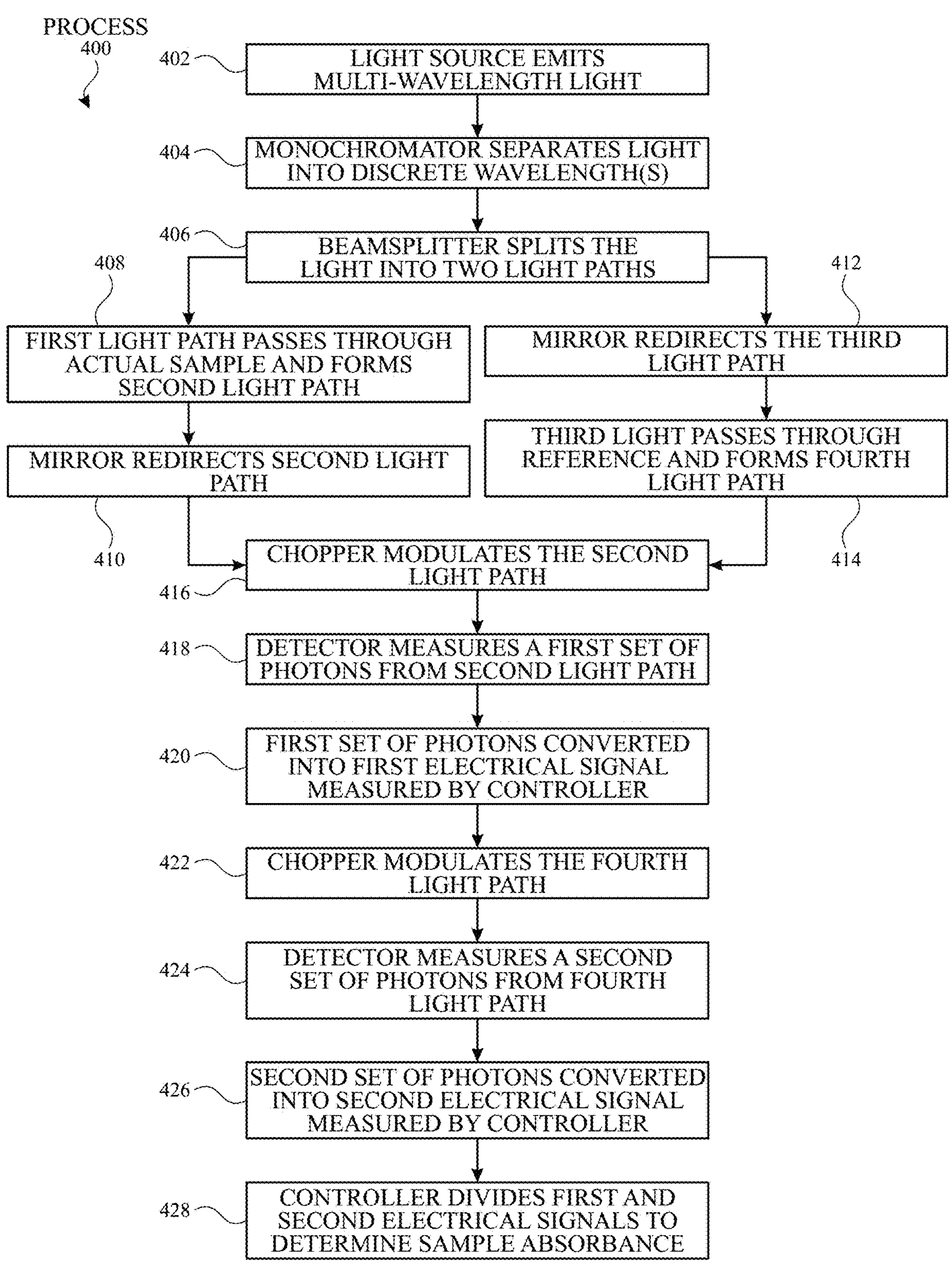
FIG. 4 illustrates an exemplary process flow for measuring the concentration and type of substance in a sample using a system comprising a shared detector according to examples of the disclosure.

FIG. 3 illustrates an exemplary system and FIG. 4 illustrates an exemplary process flow for measuring the concentration and type of substance in a sample using a system comprising a shared detector according to examples of the disclosure. System 300 can include light source 302 controlled by controller 340 through signal 304. Light source 302 can emit multi-wavelength light 350 towards monochromator 306 (step 402 of process 400). Monochromator 306 can separate multi-wavelength light 350 into one or more discrete wavelengths of light comprising light 352 (step 404 of process 400). Light 352 can be directed towards beamsplitter 310, which can then split light into two light beams: light 354 and light 364 (step 406 of process 400).

Light 354 can be incident on sample 320. A portion of light can be absorbed by the substance in sample 320, and a portion of light can transmit through sample 320 (step 408 of process 400). The portion of light that transmits through the sample can be referred to as light 356. Light 356 can be directed towards mirror 314. Mirror 314 can change the direction of propagation of light 356 toward selector 324 (step 410 of process 400).

Light 364 can be incident on mirror 312. Mirror 312 can change the direction of propagation of light towards reference 322 (step 412 of process 400). A portion of light 364 can be absorbed by the chemical substance in reference 322, and a portion of light 364 can transmit through reference 322 (step 414 of process 400). The portion of light that transmits through reference 322 can be referred to as light 366.

Both light 356 and 366 can be incident on selector 324. Selector 324 can be any optical component capable of moving or selecting the light beam to direct towards the chopper 334. Chopper 334 can be a component that periodically interrupts the light beam. System 300 can alternate in time between chopper 334 modulating light 356 and modulating light 366. Light transmitting through chopper 334 can be incident on the active area of detector 330. Both light 356 and light 366 can each comprise a set of photons that impinge upon the active area of detector 330. Detector 330 can respond to or measure light or photons impinging on the active area and can generate an electrical signal indicative of the properties of light.

In a first time, chopper 334 can modulate light 356 (step 416 of process 400). Detector 330 can measure light 356 that has transmitted through the sample 320 (step 418 of process 400) and can generate an electrical signal 358 indicative of the properties of light 356 (step 420 of process 400). In a second time, chopper 334 can modulate light 366 (step 422 of process 400). Detector 330 can measure light 366 that has transmitted through reference 322 (step 424 of process 400) and can generate an electrical signal 368 indicative of the properties of light 366 (step 426 of process 400).

Controller 340 can receive both signal 358 and signal 368 at different times. Signal 358 can include the sample absorbance $A_{sample}$, and signal 368 can include the reference absorbance $A_{reference}$. Controller 340 can divide the sample absorbance $A_{sample}$ by the reference absorbance $A_{reference}$ (step 428 of process 400) to obtain a ratio. The concentration of the substance in the reference 322 can be a pre-determined or known value. Using the ratio of the sample absorbance and the reference absorbance and the concentration of the substance in reference 322, Equation 2 can be used to determine the concentration of the substance in sample 320.

Although system 300 (illustrated in FIG. 3) can compensate for minor fluctuations, drifts, and/or variations in the detector due to the shared detector, it may be difficult to discern between different types of drift. There can be multiple types of drift, such as zero drift and gain drift. Zero drift refers to a change in the zero level over time, thereby preventing a constant (horizontal) relationship with time. Gain drift refers to a change in the average number of electronic carriers per generated electron-hole pair. That is, gain drift refers to a change in the efficiency or ratio of generated electron-hole pairs to the current response of the detector. In order to discern between the zero drift and the gain drift, the system should be capable of stabilizing one type of drift and then measuring the other. For example, to determine the gain drift from the light source, the system should be DC stabilized (i.e., a stable zero drift). However, due to lack of capability for stabilizing one type of drift in system 300, in some instances, it may be difficult to discern between zero drift and gain drift.

In some instances, the presence of stray light that can be measured by the detector can lead to an erroneous signal and an erroneous determination of the concentration or type of substance. In system 300, the placement of chopper 334 after light has transmitted through sample 320 or reference 322 can lead to the stray light reaching sample 320 or reference 322. The stray light may not contribute to the spectroscopic signal, so by allowing the stray light to reach sample 320 or reference 322, the photons included in the stray can be detected by detector 330. The photons from the stray light impinging on the active area of detector 330 can lead to erroneous changes in either signal 358 or signal 368. With a change in signal 358 or signal 368, controller 340 may not be able to determine whether or how much this change is due to stray light or due to variations in light source 302. Therefore, system 300 may not be suitable for situations where there can be non-negligible amounts of stray light present.

Figure 5:
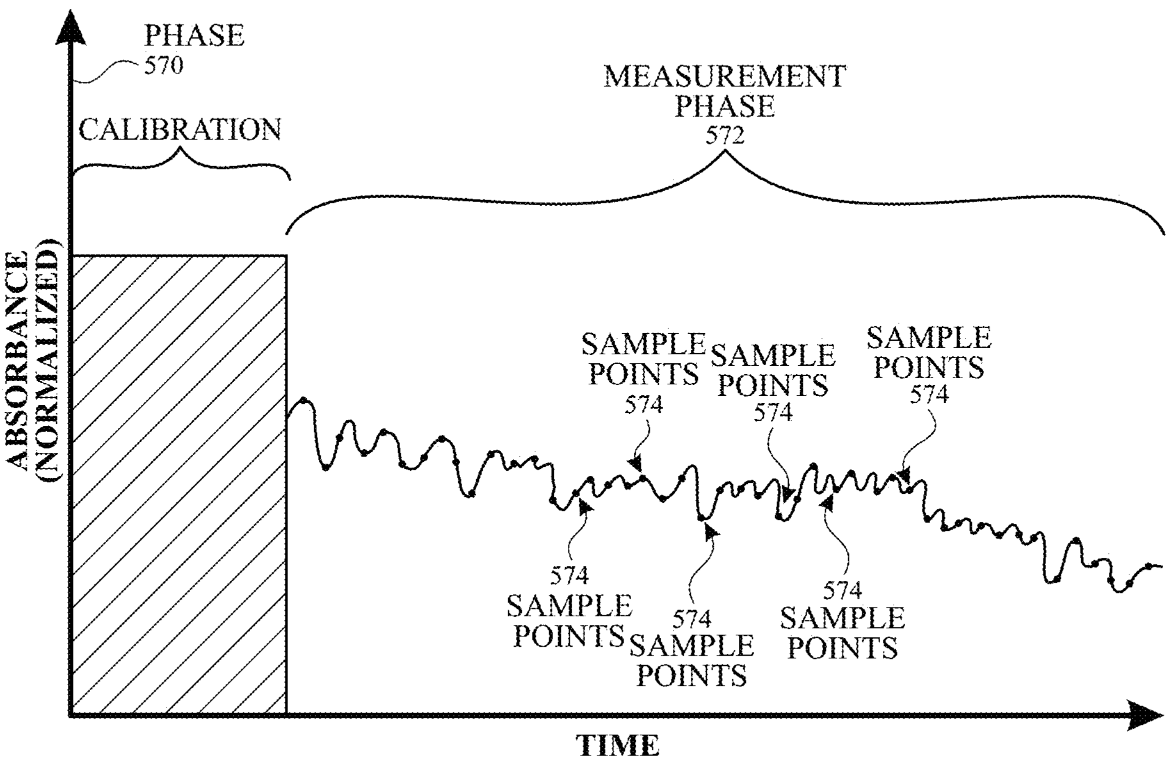
FIG. 5 illustrates an exemplary plot of absorbance measurements for determining the concentration and type of substance according to examples of the disclosure.

When there is a low concentration of the substance of interest in the sample, a system with increased accuracy and sensitivity, compared to system 100 (illustrated in FIG. 1) and system 300 (illustrated in FIG. 3), may be desired. To measure the concentration of a substance, system 100 (illustrated in FIG. 1) and system 300 (illustrated in FIG. 3) can measure the sample and reference multiple times. FIG. 5 illustrates an exemplary plot of the absorbance measurements for determining the concentration and type of substance according to examples of the disclosure. The system can begin with calibration phase 570, where one or more components in the system can be optimized, calibrated, and/or synchronized to minimize errors. Calibration phase 570 can include, for example, only measuring the reference absorbance. Alternatively, a sample with a known, stable concentration of the substance can be placed in the light path where the sample is located. The system can be either on or off. The controller can determine the absorbance and set the "zero level" equal to this absorbance. If the signal has saturated or clipped due to a significant drift, the controller can adjust the light source emission properties until the signal is no longer saturated.

Once calibration phase 570 is complete and the zero level has been determined, the system can proceed to measurement phase 572. In measurement phase 572, the concentration of the substance in the sample can be measured by sampling several times to generate a plurality of sample points 574. In some examples, the system can measure tens to hundreds of sample points 574. Once a certain number of sample points 574 have been obtained, the controller can average the values of the sample points 574 to determine the absorbance. Obtaining multiple sample points and determining the average may be needed because, as illustrated in the FIGURE, the absorbance measurements can include minor perturbations that, if not accounted for, can lead to errors in the determination of the concentration of the substance. In some examples, calibration phase 570 can be repeated to re-zero the zero level when the light source changes emission wavelength, after a pre-determined time has elapsed between consecutive calibration phases, or after a pre-determined number of sample points have been measured.

In some instances, the measurement procedure illustrated in FIG. 5 can have long times between consecutive calibration phases, which can lead to inaccurate average signal measurements due to the set zero level drifting from the actual zero level. The FIGURE illustrates the zero drift or gain drift, where the absorbance signal can start to deviate from a constant (or horizontal) relationship with time due to the zero level or gain level drifting away from the actual zero level or actual gain level, respectively. While the time between consecutive calibration phases can be shortened, there can be a limit on the minimum time period between calibration phases due to the minimum number of sample points that may be needed in order for the average of the sample point values to be an accurate indication of the concentration of the substance in the sample. This can be particularly true in situations where the SNR is low, which can require tens to hundreds of repeated measurements in order to achieve an average absorbance value that is somewhat accurate.

Figure 6:
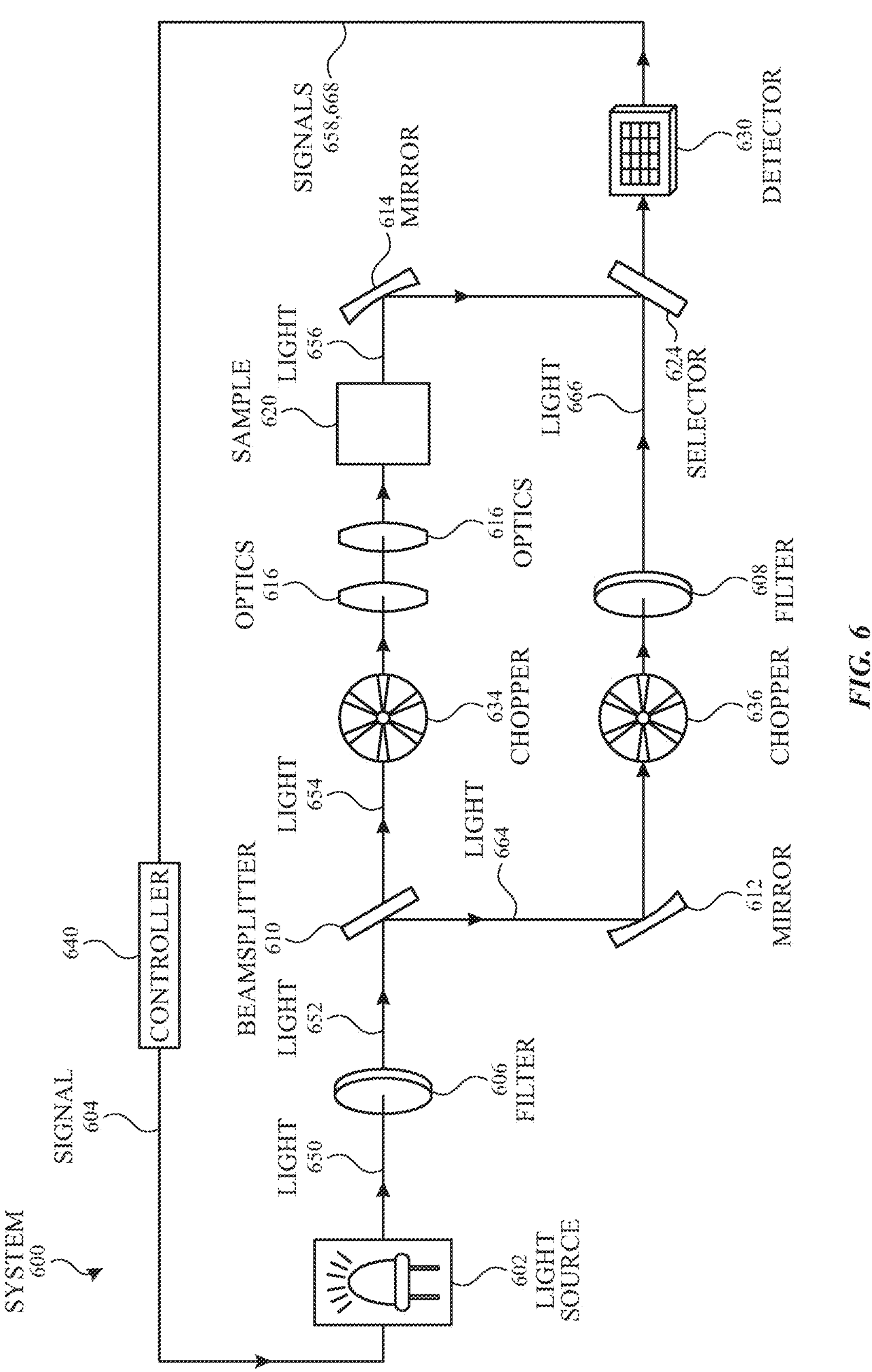
FIG. 6 illustrates an exemplary system comprising a modulator located between the light source and the sample for measuring the concentration and type of substance in a sample according to examples of the disclosure.
Figure 7:
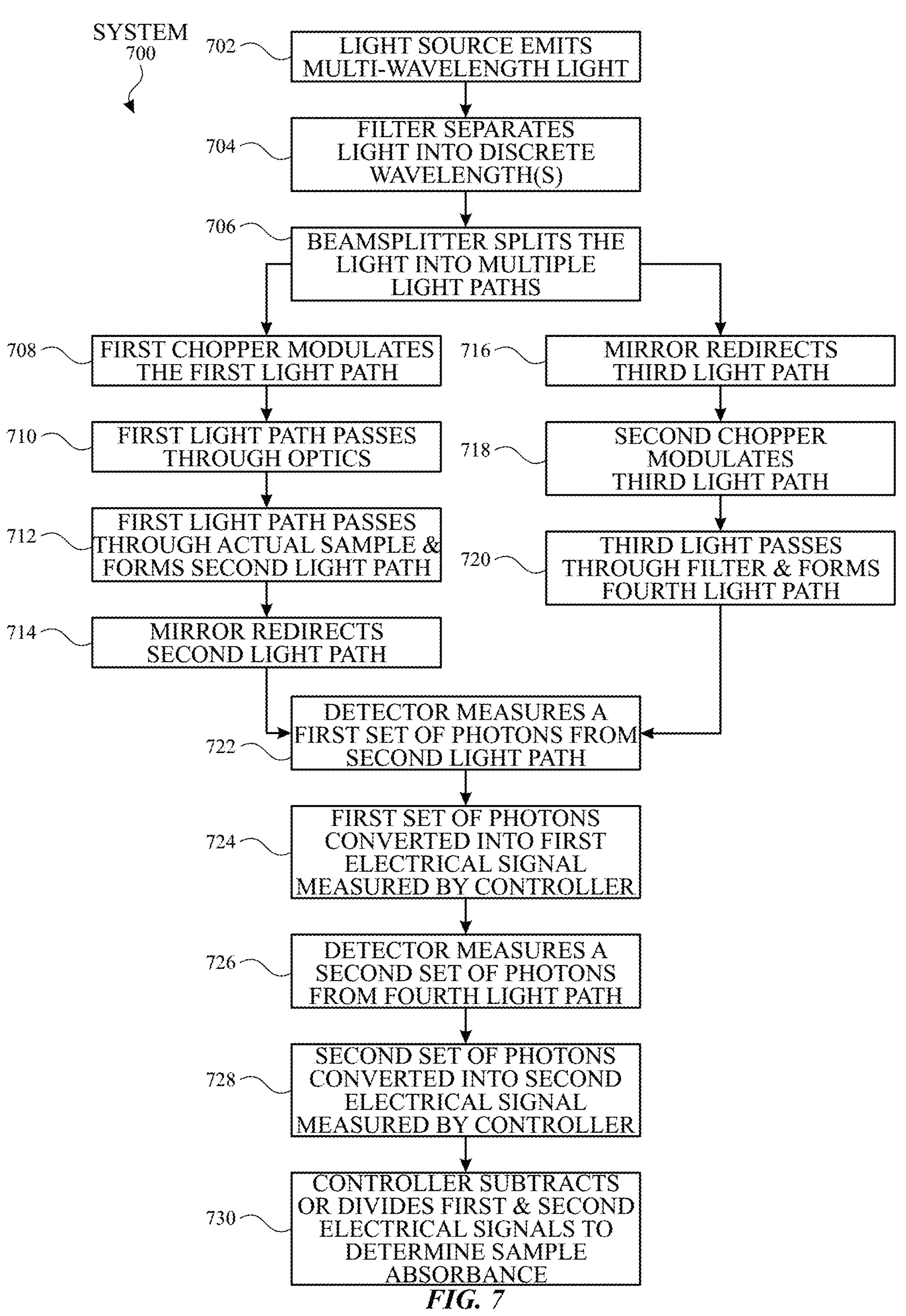
FIG. 7 illustrates an exemplary process flow for measuring the concentration and type of substance in a sample using a system comprising a modulator located between the light source and the sample according to examples of the disclosure.

FIG. 6 illustrates an exemplary system and FIG. 7 illustrates an exemplary process flow for measuring the concentration of a substance in a sample using a system comprising a modulator located between the light source and the sample according to examples of the disclosure. System 600 can include light source 602 coupled to controller 640. Controller 640 can send signal 604 to light source 602. In some examples, signal 604 can include a current or voltage waveform. Light source 602 can be directed towards filter 606, and signal 604 can cause light source 602 to emit light 650 towards filter 606 (step 702 of process 700). Light source 602 can be any source capable of generating light including, but not limited to, a lamp, a laser, a light emitting diode (LED), an organic LED (OLED), an electroluminescent (EL) source, a super-luminescent diode, any super-continuum source including a fiber-based source, or a combination of one or more of these sources. In some examples, light source 602 can be capable of emitting a single wavelength of light. In some examples, light source 602 can be capable of emitting a plurality of wavelengths of light. In some examples, the plurality of wavelengths can be close to or adjacent to one another providing a continuous output band. In some examples, light source 602 can be a super-continuum source capable of emitting light in at least a portion of both the SWIR and MWIR ranges. A super-continuum source can be any broadband light source that outputs a plurality of wavelengths. In some examples, light source 602 can be any tunable source capable of generating a SWIR signature.

Filter 606 can be any type of filter that is capable of tuning or selecting a single wavelength or multiple discrete wavelengths by tuning the drive frequency. In some examples, filter 606 can be an acousto-optic tunable filter (AOTF). In some examples, filter 606 can be an angle tunable narrow bandpass filter. Although not illustrated in the FIGURE, filter 606 can be coupled to controller 640, and controller 640 can tune the drive frequency of filter 606. In some examples, filter 606 can be a transmit band filter configured to selectively allow one or more continuous bands (i.e., wavelength ranges) of light to transmit through. Light 650 can comprise multiple wavelengths (step 702 of process 700) and after transmitting through filter 606, can form light 652 comprising one or more discrete wavelengths (step 704 of process 700). In some examples, light 652 comprises fewer wavelength of light than light 650. Light 652 can be directed towards beamsplitter 610. Beamsplitter 610 can be any type of optic capable of splitting incoming light into multiple light beams. In some examples, each light beam split by the beamsplitter 610 can have the same optical properties. One skilled in the art would appreciate that the same optical properties can include tolerances that result in a 15% deviation. Beamsplitter 610 can split light 652 into two light beams (step 706 of process 700): light 654 and light 664, as illustrated in the FIGURE.

Light 654 can transmit through chopper 634, where chopper 634 can modulate the intensity of light 654 (step 708 of process 700). Chopper 634 can be any component capable of modulating the incoming light beam. In some examples, chopper 634 can be an optical chopper. In some examples, chopper 634 can be a mechanical shutter. In some examples, chopper 634 can be a modulator or a switch. Light 654 can transmit through optics 616 (step 710 of process 700). Optics 616 can include one or more components configured for changing the behavior and properties, such as the beam spot size and/or angle of propagation, of light 654. Optics 616 can include, but are not limited to, a lens or lens arrangement, beam directing element, collimating or focusing element, diffractive optic, prism, filter, diffuser, and light guide. Optics 616 can be placed in any arrangement such as a resolved path sampling (RPS) system, confocal system, or any optical system suitable for measuring a concentration and type of substance in sample 620. The optical can be an optical system capable of resolving multiple angles of incidence on a sample surface and different path lengths of a plurality of optical paths. In some examples, the optical system configured for accepting one or more incident light rays with a path length within a range of path lengths and an angle of incidence within a range of angles, and rejecting optical paths with a path length outside the range of path lengths and with an angle of incidence outside the range of angles.

Light 654 can transmit through sample 620. Energy can be absorbed at one or more wavelengths by the substance in the sample 620, causing a change in the properties of light 656 exiting the sample (step 712 of process 700). In some examples, light 656 can be formed by reflection or scattering of the substance located in the sample. Light 656 can be incident on mirror 614, which can redirect light 656 towards selector 624 (step 714 of process 700). Mirror 614 can be any type of optics capable of changing the direction or angle of propagation of light. For example, mirror 614 can be a concave mirror. In some examples, the system can, additionally or alternatively, include, but is not limited to, non-reflective component(s) (e.g., curved waveguide) for light redirection.

Light 664 can be incident on mirror 612 (step 716 of process 700). Mirror 612 can redirect light 664 towards detector 630. Mirror 612 can be any mirror capable of changing the direction or angle of propagation of light. In some examples, mirror 612 can have the same optical properties as mirror 614. Light 664 can transmit through chopper 636, which can modulate the intensity of light 664 (step 718 of process 700). In some examples, chopper 634 and chopper 636 can have the same chopper characteristics, such as chopping frequency and disc configuration. One skilled in the art would appreciate that the same chopper characteristics can include tolerances that result in a 15% deviation. In some examples, chopper 636 can be a shutter, such as a microelectromechanical (MEMS) shutter. In some examples, chopper 636 can be a modulator or a switch. The modulated light can transmit through filter 608 to generate light 666 (step 720 of process 700). Filter 608 can be any type of filter capable of selectively transmitting light. In some examples, filter 608 can be a neutral density filter, blank attenuator, or filter configured for attenuating or reducing the intensity of all wavelengths of light. In some examples, filter 608 can attenuate light by a pre-determined or known constant value or attenuation factor.

Both light 656 and light 666 can be incident on selector 624. Selector 624 can be any optical component capable of moving or selecting the light beam to direct towards detector 630. System 600 can alternate in time between allowing light 656 to be incident on the active area of detector 630 at one time and allowing light 666 to be incident on the active area of detector 630 at another time. In both situations, light 656 and light 666 can each include a set of photons. The photons can impinge on the active area of detector 630, and detector 630 can generate an electrical signal indicative of the properties of the incident light or number of impinging photons. Detector 630 can measure the set of photons from light 656 impinging on its active area (step 722 of process 700) and can generate an electrical signal 658 (step 724 of process 700). Signal 658 can be indicative of the properties of light 656, which can represent the energy from light 654 that is not absorbed by the substance of interest. Detector 630 can measure the set of photons from light 666 impinging on its active area (step 726 of process 700) and can generate an electrical signal 668 (step 728 of process 700). Signal 668 can be indicative of the properties of light 664 that was not absorbed by filter 608 and can act as a reference.

Detector 630 can be any type of detector capable of measuring or responding to light or photons, such as photodiodes, photoconductors, bolometers, pyroelectric detectors, charge coupled devices (CCDs), thermocouples, thermistors, photovoltaics, and photomultiplier tubes. Detector 630 can include a single detector pixel or a detector array, such as a multi-band detector or a focal plane array (FPA). A detector array can include one or more detector pixels disposed on a substrate. A detector pixel can include one or more detector elements with a common footprint. A detector element can be an element designed to detect the presence of light and can individually generate a signal representative of the detected light. In some examples, detector 630 can be any type of detector capable of detecting light in the SWIR. Exemplary SWIR detectors can include, but are not limited to, Mercury Cadmium Telluride (HgCdTe), Indium Antimonide (InSb), and Indium Gallium Arsenide (InGaAs). In some examples, detector 630 can be a SWIR detector capable of operating in the extended wavelength range (up to 2.7 μm).

Controller 640 can receive both signal 658 and signal 668, where each signal can be received at a different time. Signal 658 can include the sample absorbance $A_{sample}$, and signal 668 can include the reference absorbance $A_{reference}$. Controller 640 can divide (or subtract) the sample absorbance $A_{sample}$ by the reference absorbance $A_{reference}$ (step 730 of process 700) to obtain a ratio. The amount of reduction in intensity produced by filter 608 can be a pre-determined or known value or attenuation factor. Using the ratio of the sample absorbance and the reference absorbance and the attenuation factor for filter 608, Equation 2 can be used to determine the concentration of the substance of interest in sample 620. In some examples, controller 640 can compare the reference absorbance to one or more absorbance values stored in a lookup table or in memory to determine the concentration and type of substance in the sample. Although Equation 2 and the above discussion is provided the context of absorbance, examples of the disclosure include, but are not limited to, any optical property such as reflectivity, refractive index, density, concentration, scattering coefficient, and scattering anisotropy.

System 600 can be an alternative to system 100 (illustrated in FIG. 1) and system 300 (illustrated in FIG. 3). System 600 can have a shared detector (e.g., detector 630) to measure light through sample 620 and filter 608. Utilizing a shared detector can eliminate or alleviate unpredictable changes in sensitivity, detectivity, and/or absorbance due to differing (or random) fluctuations, drifts, and/or variations. As discussed above, the fluctuations, drifts, and/or variations can be due to initialization, 1/f noise, and/or environmental changes that can affect the two detectors in a different manner. Additionally, system 600 can tolerate and discern non-negligible amounts of stray light due to the placement of chopper 634 and chopper 636 in the light path prior to being incident on sample 620 and filter 608, respectively. Furthermore, unlike system 100 and system 300, system 600 can account for any fluctuations, drifts, and/or variations originating from both light source 602 and detector 630.

In some examples, attenuation of incoming light by filter 608 by a pre-determined or known constant value can lead to a mismatch between light 656 (i.e., light that transmits through sample 620) and light 666 (i.e., light that transmits through filter 608). This mismatch can be due to differing absorbance at different wavelengths. At one or more wavelengths, the substance in sample 620 can absorb a large percentage of light, and therefore, a low attenuation factor for filter 608 would be suitable at those one or more wavelengths. At other wavelengths, the same substance and same concentration of that substance in sample 620 can absorb very little light, and therefore, a high attenuation factor for filter 608 would be suitable. Since filter 608 can attenuate by a constant value for all wavelengths of interest, accurate measurements of system 600 can be limited to only one or a small number of wavelengths. Furthermore, a blank attenuator or neutral density filter may not be effective when detecting a low concentration of the substance of interest in the sample if the attenuation factor is not optimal. Therefore, a system that can account for the variations in absorbance with wavelength in sample 620 and can be capable of detecting a low concentration of the substance in the sample may be desired.

Figure 8:
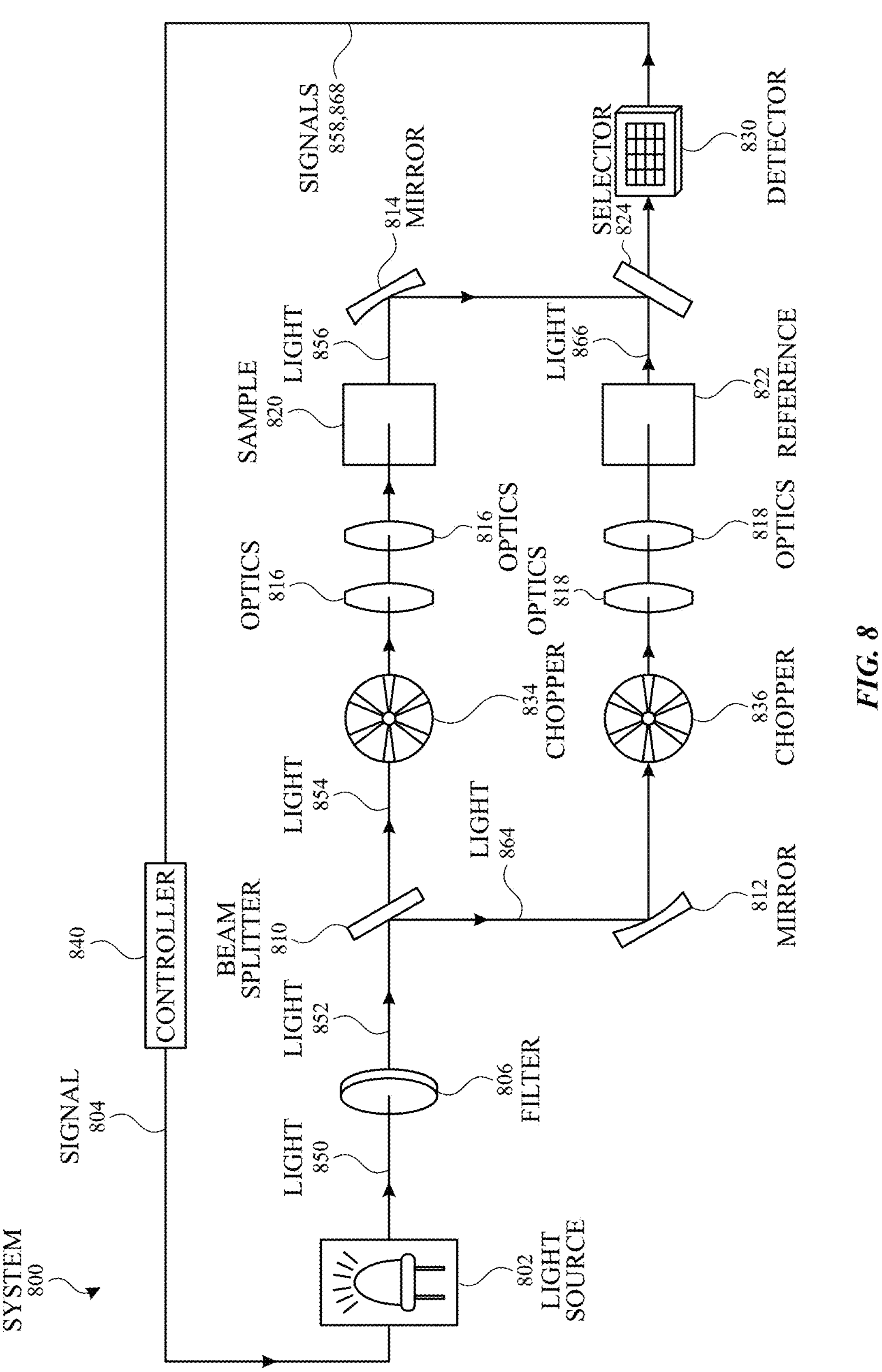
FIG. 8 illustrates an exemplary system comprising a modulator located between the light source and the sample for measuring the concentration and type of substance in a sample according to examples of the disclosure.
Figure 9:
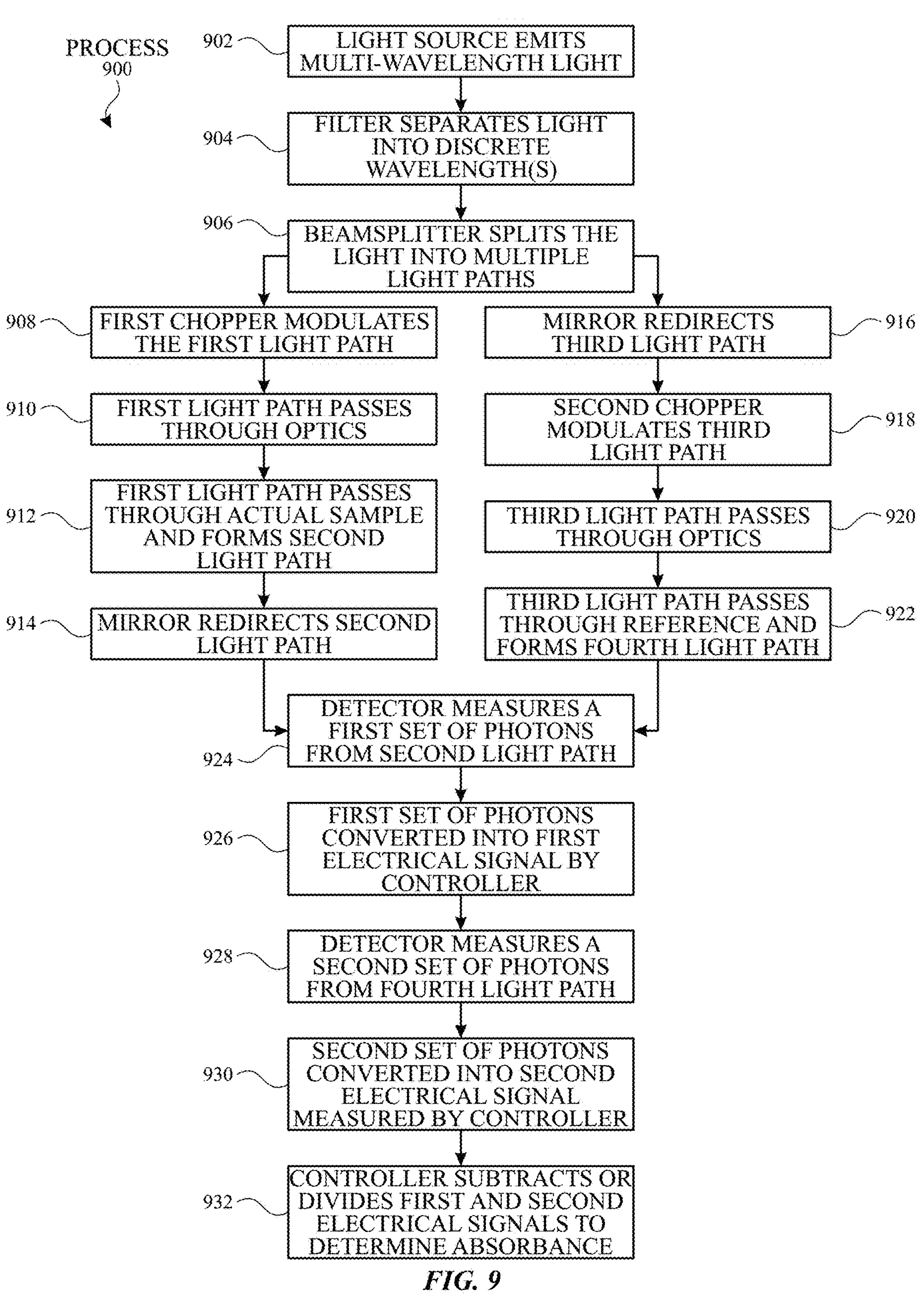
FIG. 9 illustrates an exemplary process flow for measuring the concentration and type of substance in a sample using a system comprising a modulator located between the light source and the sample according to examples of the disclosure.

FIG. 8 illustrates an exemplary system and FIG. 9 illustrates an exemplary process flow for measuring the concentration of a substance in a sample using a system comprising a modulator located between the light source and the sample according to examples of the disclosure. System 800 can include light source 802 coupled to controller 840. Controller 840 can send signal 804 to light source 802. In some examples, signal 804 can include a current or voltage waveform. Light source 802 can be directed towards filter 806, and signal 804 can cause light source 802 to emit light 850 (step 902 of process 900). Light source 802 can be any source capable of emitting light 850. In some examples, light source 802 can be capable of emitting a single wavelength of light. In some examples, light source 802 can be capable of emitting a plurality of wavelengths of light. An exemplary light source can include, but is not limited to, a lamp, laser, LED, OLED, EL source, super-luminescent diode, super-continuum source, fiber-based source, or a combination of one or more of these sources. In some examples, the plurality of wavelengths can be close to or adjacent to one another providing a continuous output band. In some examples, light source 802 can be any tunable source capable of generating a SWIR signature. In some examples, light source 802 can be a super-continuum capable of emitting light at least in a portion of both the SWIR and MWIR.

Filter 806 can be any filter capable of tuning and selecting a single wavelength or multiple discrete wavelengths by tuning the drive frequency. In some examples, filter 806 can be an AOTF. In some examples, filter 606 can be an angle tunable narrow bandpass filter. Although not illustrated in the FIGURE, filter 806 can be coupled to controller 840, and controller 840 can tune the drive frequency of filter 806. In some examples, filter 806 can be a transmit band filter configured to selectively allow one or more continuous bands (i.e., wavelength ranges) of light to transmit through. Light 850 can comprise multiple wavelengths and, after transmitting through filter 806, can form light 852 comprising one or more discrete wavelengths (step 904 of process 900). In some examples, light 852 comprises fewer wavelengths of light than light 850. Light 852 can be directed towards a beamsplitter 810. Beamsplitter 810 can be any type of optic capable of splitting incoming light into multiple light beams. In some examples, each light beam split by beamsplitter 810 can have the same optical properties. One skilled in the art would appreciate that the same optical properties can include tolerances that result in a 15% deviation. As illustrated in the FIGURE, beamsplitter 810 can split light 852 into two light beams: light 854 and light 864 (step 906 of process 900).

Light 854 can transmit through chopper 834, where chopper 834 can modulate the intensity of light 854 (step 908 of process 900). Chopper 834 can be any component capable of modulating or periodically interrupting the incoming light beam. In some examples, chopper 834 can be an optical chopper. In some examples, chopper 834 can be a mechanical shutter, such as a MEMS shutter. In some examples, chopper 834 can be a modulator or a switch. Light 854 can transmit through optics 816 (step 910 of process 900). Optics 816 can include one or more components configured for changing the behavior and properties, such as the beam spot size and/or angle of propagation, of light 854. Optics 816 can include, but are not limited to, a lens or lens arrangement, beam directing element, collimating or focusing element, diffractive optic, prism, filter, diffuser, and light guide. Optics 816 can include any type of optical system, such as a RPS system, confocal system, or any optical system suitable for measuring a concentration and type of substance in sample 820.

Light 854 can be directed towards sample 820. Sample 820 can absorb a portion of light 854 and can transmit a portion of light 854 at one or more wavelengths (step 912 of process 900). A portion of light 854 can be absorbed by the substance in sample 820, and a portion of light 854 can transmit through the sample 820. The portion of light 854 that transmits through the sample 820 can be referred to as light 856. In some examples, light 856 can be formed by reflection or scattering of the substance located in sample 820. Light 856 can be directed towards mirror 814, and mirror 814 can redirect light 856 towards mirror 814 (step 914 of process 900). Mirror 814 can be any type of optics capable of changing the direction of light propagation. In some examples, mirror 814 can be a concave mirror configured to change the direction of light propagation by 90°. In some examples, the system can, additionally or alternatively, include, but is not limited to, non-reflective component(s) (e.g., curved waveguide) for light redirection.

The second light path formed by the beamsplitter 810 splitting light 852 can be referred to as light 864. Light 864 can be directed towards mirror 812. Mirror 812 can be any type of optics capable of changing the direction of the propagation of light 864. Mirror 812 can redirect light 864 towards selector 824 (step 916 of process 900) by changing its direction of propagation by 90°. In some examples, the system can, additionally or alternatively, include, but is not limited to, non-reflective component(s) (e.g., curved waveguide) for light redirection.

Light 864 can transmit through chopper 836, and chopper 836 can modulate light 864 (step 918 of process 900). Chopper 836 can be any component capable of modulating the intensity of the incoming light beam. In some examples, chopper 834 and chopper 836 can have the same chopping characteristics, such as chopping frequency and disc configuration. One skilled in the art would appreciate that the same chopping characteristics can include tolerances that result in a 15% deviation. In some examples, chopper 836 can be a mechanical shutter, such as a MEMS shutter. In some examples, chopper 834 can be an optical modulator or a switch. Light 864 can transmit through optics 818 (step 920 of process 900). Optics 818 can include one or more lenses, beam directing elements, collimating or focusing elements, diffractive optics, prisms, filters, diffusers, light guides, or a combination of one or more these optical elements and can be arranged in any arrangement (e.g., RPS system or confocal system) suitable for measuring a concentration and type of substance in sample 820 or reference 822. In some examples, optics 818 can have the same components, arrangement, and/or characteristics as optics 816.

Light exiting optics 818 can be incident on reference 822 (step 922 of process 900). Reference 822 can have one or more known spectroscopic properties (e.g., scattering characteristics, reflection characteristics, or both) that may be selected to match the spectroscopic properties of an intended sample. For example, reference 822 can have one or more spectroscopic properties that match the spectroscopic properties of skin tissue. In some examples, reference 822 can be a copy or a "phantom" replica of sample 820. In some examples, the absorption spectra of reference 822 can be the same as the absorption spectra of sample 820. One skilled in the art would appreciate that the same absorption spectra can include tolerances that result in a 15% deviation. A portion of light can be absorbed by reference 822, and a portion of light can transmit through reference 822, forming light 866. After transmitting through reference 822, light 866 can be directed towards selector 824.

Selector 824 can be any optical component capable of moving or selecting the light beam to direct towards detector 830. In some examples, selector 824 can be coupled to controller 840, and controller 840 can send a signal (not shown) to control the movement of selector 824. In one time, selector 824 can allow light 856 to be incident on the active area of detector 830. Light 856 can comprise a set of photons, and detector 830 can measure the number of photons in light 856 (step 924 of process 900). Detector 830 can generate an electrical signal 858 indicative of the properties (or the number of photons) of light 856 (step 926 of process 900). Signal 858 can be sent to controller 840, which can store and/or process the signal. In another time, selector 824 can allow light 866 to be incident on the active area of detector 830. Light 866 can also comprise a set of photons, and detector 830 can measure the number of photons in light 866 (step 928 of process 900). Detector 830 can generate an electrical signal 868 indicative of the properties (or the number of photons) of light 866 (step 930 of process 900). Signal 868 can be sent to controller 840, which can store and/or process the measured signal.

Detector 830 can include single detector pixel or a detector array. In some examples, detector 830 can be any type of detector capable of detecting light in the SWIR. In some examples, detector 830 can be a HgCdTe, InSb, or InGaAs single detector or a FPA. In some examples, detector 830 can be a SWIR detector capable of operating in the extended wavelength range of up to 2.7 μm.

Controller 840 can receive both signal 858 and signal 868, but at different times. Signal 858 can include the sample absorbance $A_{sample}$, and signal 868 can include the reference absorbance $A_{reference}$. In some examples, controller 840 can divide (or subtract) the sample absorbance $A_{sample}$ by the reference absorbance $A_{reference}$ to determine the concentration of the substance of interest in sample 820 (step 932 of process 900). In some examples, controller 840 can compare the reference absorbance to one or more absorbance values stored in a lookup table or in memory to determine the concentration and type of substance in sample 820. In some examples, signal 858 can differ from signal 868 by the amount of drift from light source 802, detector 830 or both. The controller 840 can divide (or subtract) signal 858 by signal 868 to determine the amount of drift. Although Equation 2 and the above discussion are provided in the context of absorbance, examples of the disclosure include, but are not limited to, any optical property, such as reflectivity, refractive index, density, concentration, scattering coefficient, and scattering anisotropy.

System 800 can include all of the advantages of system 600 while also accounting for variations in the absorbance of sample 820 with wavelength. Although the systems disclosed above illustrate one or more components, such as choppers, optics, mirrors, sample, light source, filters, and detector, one of ordinary skill in the art would understand that the system is not limited to only the components illustrated in the exemplary FIGURES. Furthermore, one of ordinary skill in the art would understand that the location and arrangement of such components are not limited solely to the location and arrangement illustrated in the exemplary FIGURES.

While an ideal layout or arrangement of the system would have all components shared between the light path traveling through the sample and the light path traveling the reference, such an arrangement might not be physically possible or feasible. Examples of the disclosure include locating one or more components susceptible to drifting such that these components are common or shared among the two (or multiple) light paths, and locating components not susceptible to drifting (i.e., stable components) to be non-common or not shared among the two (or multiple light paths). For example, components susceptible to drifting can include any electronics or optoelectronic components. Additionally, components not susceptible to drifting can include optics. As illustrated in both system 600 of FIG. 6 and system 800 of FIG. 8, the light source (e.g., light source 602 and light source 802) and the detector (e.g., detector 630 and detector 830) can be susceptible to drifting, and therefore can be shared between the two light paths (e.g., light 656 and light 666; light 856 and light 866). On the other hand, choppers (e.g., chopper 634, chopper 636, chopper 834, and chopper 836) and optics (e.g., optics 616, optics 816, and optics 818) can be stable and not susceptible to drifting, and therefore can be individual to each light path.

Figure 10A:
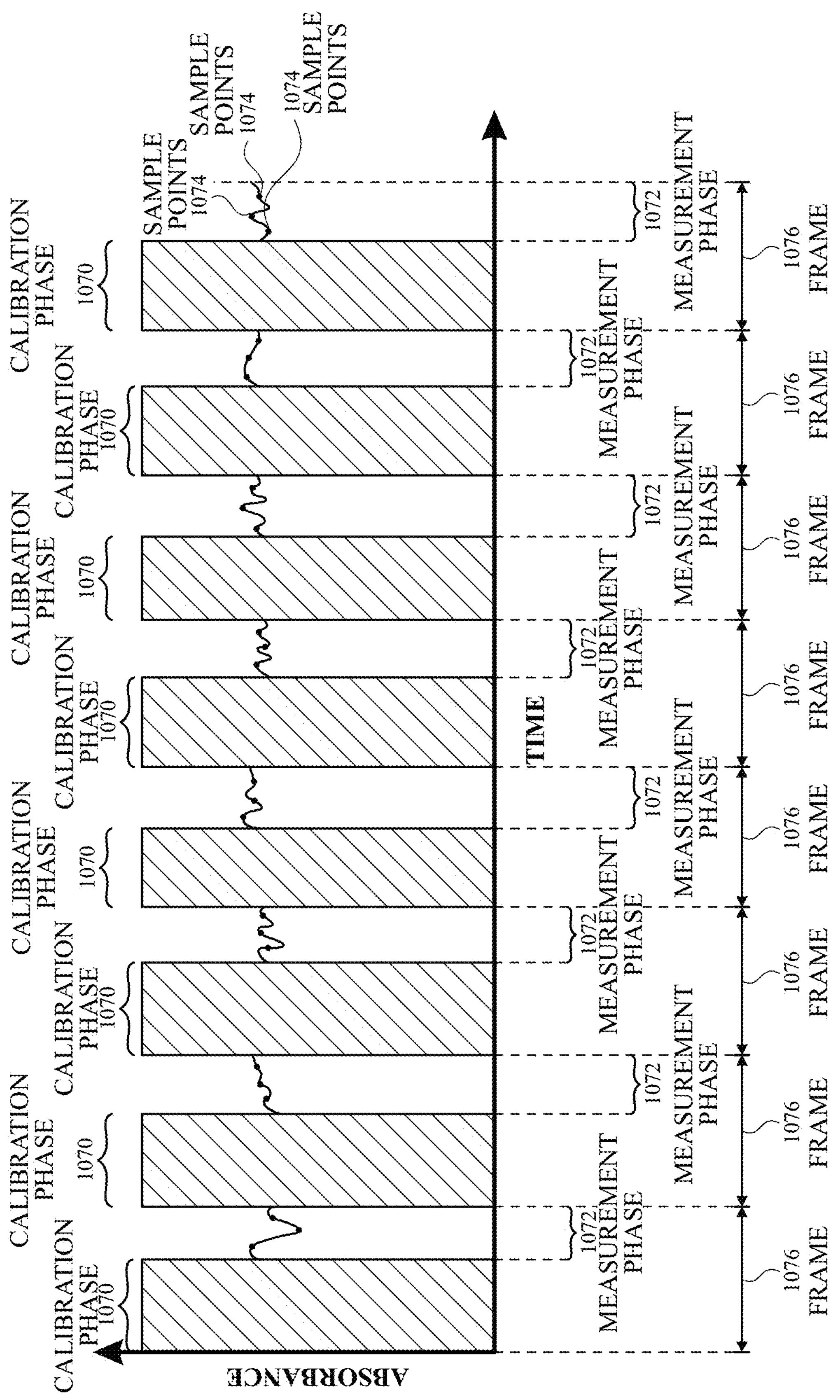
FIGS. 10A-10C illustrate exemplary plots of absorbance measurements used for determining the concentration and type of substance according to examples of the disclosure.

FIG. 10A illustrates an exemplary plot of absorbance measurements used for determining the concentration and type a substance according to examples of the disclosure. The absorbance measurement can comprise a plurality of frames 1076. Each frame 1076 can include one or more calibration phases 1070 and one or more measurement phases 1072. Each calibration phase 1070 can include one or more steps to measure the noise floor, stray light leakage, or both. For example, the light source in the system can be off or deactivated such that light is not incident on the sample or reference. The detector can take a measurement to determine the amount of dark current and stray light leakage. In some examples, this measurement can be used to determine the zero level. The detector can send this measurement to the controller, and the controller can store the measurement and/or the relevant information in memory. The controller can use this information to determine the actual absorbance of the substance in the sample or reference, or can use this information to set the zero level.

Measurement phases 1072 can be interspersed in between the calibration phases 1070. Measurement phases 1072 can include measuring the absorbance spectrum of the sample during one time and then measuring the absorbance spectrum of the reference during another time, as discussed above. In some examples, any optical property (e.g., reflectivity, refractive index, density, concentration, scattering coefficient, and scattering anisotropy) can be measured instead of, or in addition to, the absorbance. The controller can divide (or subtract) the absorbance spectrum of the sample by the absorbance spectrum of the filter/reference. In some examples, the controller can compare the reference absorbance to one or more absorbance values stored in a lookup table or memory to determine the concentration of the substance in the sample. The measurement can be repeated multiple times within each measurement phase 1072 to generate a plurality of sample points 1074, and the average of the sample points 1074 can be used. In some examples, the controller can compile sample points 1074 from multiple frames 1076 when determining the average signal value. In some examples, the duration of at least one measurement phase 1072 can be based on a pre-determined or fixed number of sample points 1074. In some examples, the number of sample points 1074 within at least one measurement phase 1072 can be less than 10. In some examples, the number of sample points 1074 within at least one measurement phase 1172 can be less than 100. In some examples, the duration of at least one measurement phase 1072 can be based on the stability (i.e., time before drifting by more than 10%) of the reference. For example, if the reference remains chemically stable for 60 seconds, the duration of measurement phase 1072 can also be 60 seconds. In some examples, the duration of measurement phase 1072 can be based on the stability of the shared components (e.g., light source and detector). Once a measurement phase 1072 is complete, the controller can proceed to the next frame 1076.

By calibrating more frequently, both the zero drift and the gain drift can be accounted for. Additionally, unlike the procedure illustrated in FIG. 5, the drift can be corrected at every frame, which can prevent any significant deviation from the zero level. Furthermore, any fluctuations and/or variations can be compensated for prior to, during, or shortly after the signal begins to deviate. By compensating for the fluctuations, drift, and/or variations and re-zeroing the zero level early on, instead of after tens or hundreds of sample points are measured, the average signal value can be more accurate. In some examples, the number of sample points 1074 taken during measurement phase 1072 can be less than the number of sample points 574 taken during measurement phase 572 (illustrated in FIG. 5). In some examples, measurement phase 1072 can be shorter than measurement phase 572.

Figure 11:
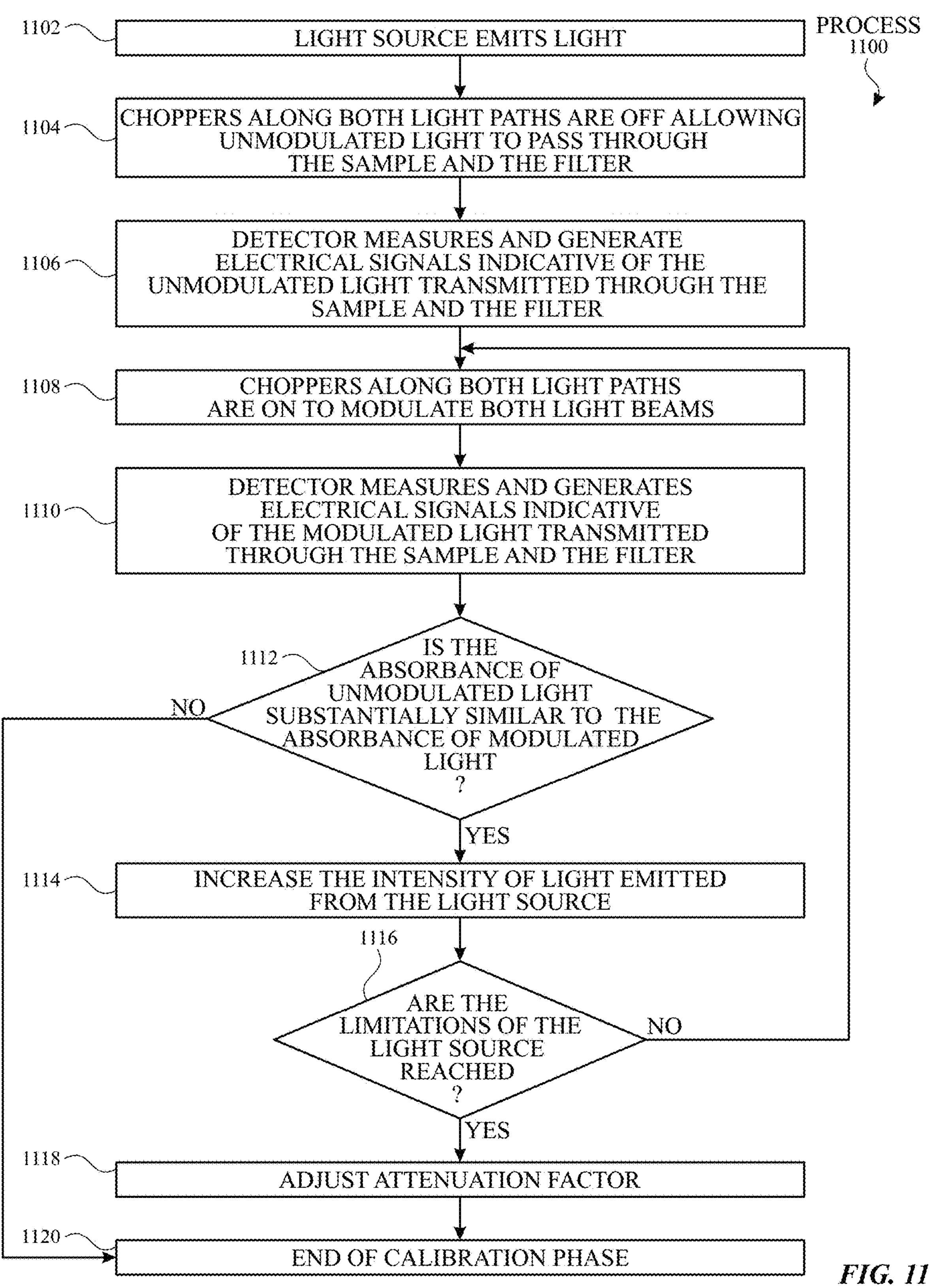
FIG. 11 illustrates an exemplary process flow during a calibration procedure according to examples of the disclosure.

In some examples, calibration phrase 1070 can include adjustment of the attenuation factor for those systems that employ a filter as a reference (e.g., filter 608 of system 600 illustrated in FIG. 6). FIG. 11 illustrates an exemplary process flow during a calibration procedure according to examples of the disclosure. The light source can be turned on or activated to emit light (step 1102 of process 1100). In a first time period, the choppers along both light paths (e.g., choppers 634 and 636) can be off allowing unmodulated light (e.g., light 654 and light 664) to transmit through to the sample (e.g., sample 620) and filter (e.g., filter 608) (step 1104 of process 1100). The detector can measure and generate a first set of electrical signals indicative of the unmodulated light transmitted through the sample and through the reference (step 1106 of process 1100). In a second time, the choppers located along both light paths can be turned on or activated such that the choppers are modulating light (step 1108 of process 1100). The detector can measure and generate a second set of electrical signals indicative of the modulated light not absorbed by the sample and the reference (step 1110 of process 1100). If the absorbance from the unmodulated light is close to (e.g., within 10%) or the same as absorbance from the modulated light (step 1112 of process 1100), then the system can increase or continue to increase the properties of light (e.g., light emitted from light source 602) (step 1114 of process 1100). In some examples, the increase can occur until the absorbance from the first set of electrical signals (i.e., unmodulated light) is no longer close (e.g., within 10% from) to the absorbance from the second set of electrical signals (i.e., modulated light). If the limitations of the light source are reached at any time during these steps (step 1116 of process 1100), the attenuation factor can be adjusted instead of adjusting the properties of the light source (step 1118 of process 1100). Once the properties of light emitted from the light source, the attenuation factor or both are optimized, the calibration phase can be complete (step 1120 of process 1100). Such a calibration procedure can be used to prevent stray light from dominating over light transmitted through the sample. Furthermore, such a calibration procedure can lead to better drift stabilization because drift can be ascertained, and therefore, compensated for.

In some examples, the overall time for measuring a certain number of sample points 1074 can be greater than the overall time for measuring the same number of sample points 574 (using the method illustrated in FIG. 6) due to interspersed calibration phases 1070. However, the procedure illustrated in FIG. 5 can be limited to measurements where the SNR value is high, as discussed above. Although the overall time may be longer, the capability of measuring at low SNRs can outweigh the compromise with longer overall time. In some examples, the system can be configured for utilizing the procedure illustrated in FIG. 5 when the SNR values are above a pre-determined threshold and utilizing the procedure illustrated in FIG. 10 when the SNR values are below a pre-determined threshold. In some examples, the pre-determine threshold can be on the order of $10^{-5}$. In some examples, the number of sample points 1074 needed for an accurate average signal value may be lower due to the more frequent calibration phases preventing significant deviations and drift.

Figure 10B:
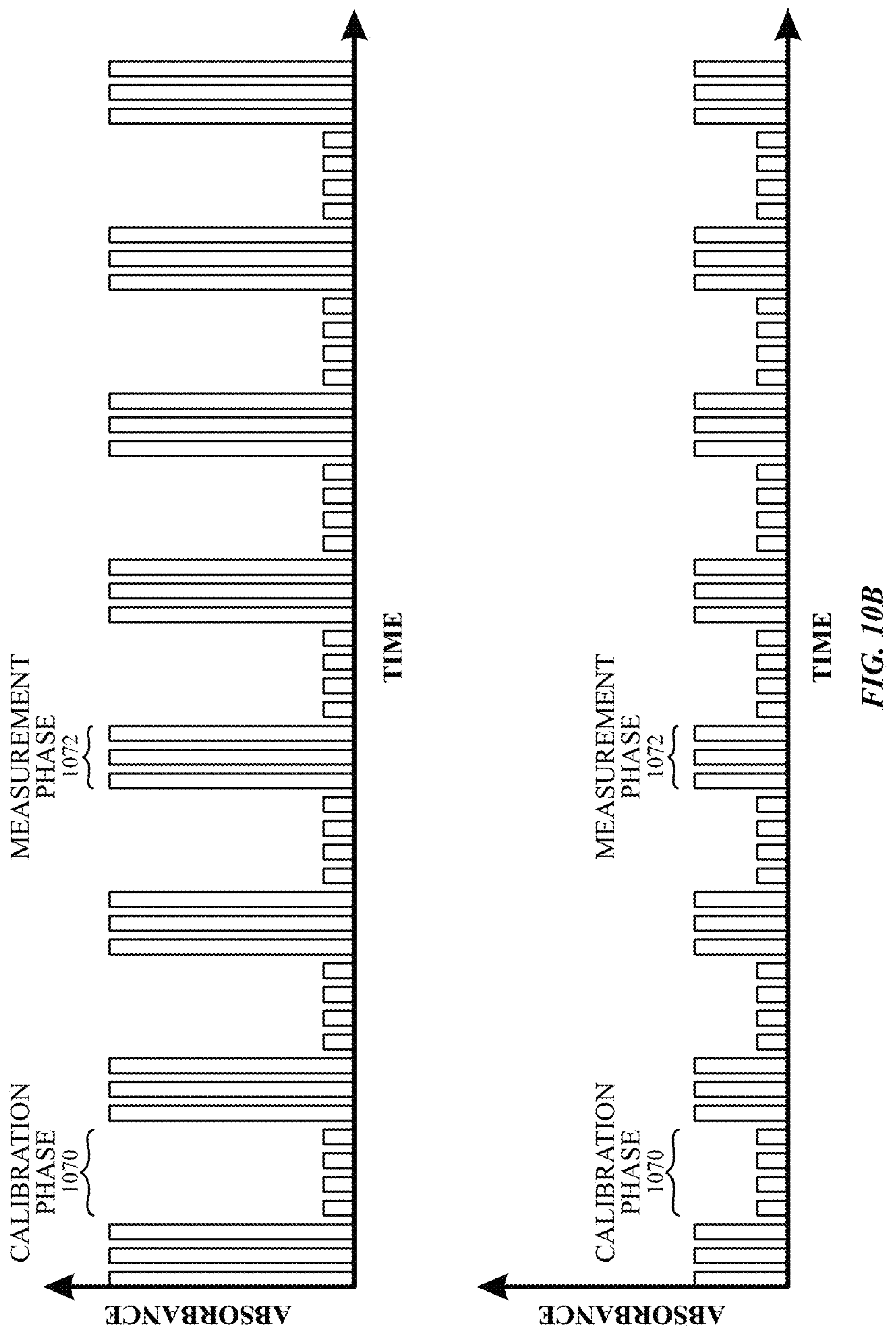

FIG. 10B illustrates exemplary plots of absorbance measurements used for determining the concentration and type of substance according to examples of the disclosure. The measurement can include a plurality of measurement phases 1072 interspersed with calibration phases 1070. The top of FIG. 10B illustrates exemplary absorbance measurements for the sample, and the bottom of FIG. 10B illustrates exemplary absorbance measurements for the reference. For a given calibration phase 1070, the signal can be sub-modulated, as illustrated in the FIGURE. Similarly, for a given measurement phase 1072, the signal can, additionally or alternatively, be sub-modulated. By sub-modulating the signal, the absorbance values can be measured sooner than without sub-modulation. Therefore, drift can be accounted and the measured values can be given to the controller earlier on (or within the measurement phase 1072), instead of having to wait for the completion of a measurement phase 1072. In some examples, the method illustrated in FIG. 10B can be used to add in modulation or change the frequency over time.

Figure 10C:
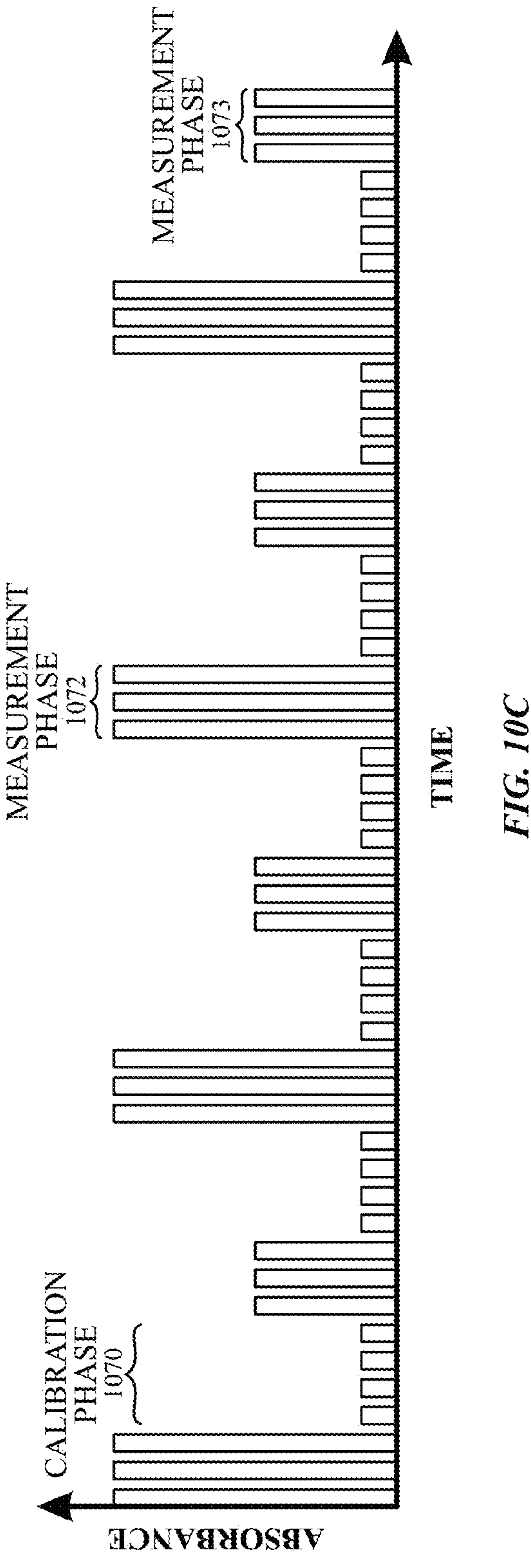

FIG. 10C illustrates an exemplary plot of an absorbance measurement used for determining the concentration and type of substance according to examples of the disclosure. In some examples, the reference switching can be nested temporally. As illustrated in the figure, measurement phase 1072 can alternate with measurement phase 1073, where calibration phase 1070 can be interspersed between the measurement phase 1072 and measurement phase 1073. Measurement phase 1072 can include measuring the absorbance spectrum of the sample, and measurement phase 1073 can include measuring the absorbance spectrum of the reference. In some examples, two-dimensional drift (e.g., gain and offset) can be corrected when the system is configured for operating at moderate frequencies, and one-dimensional drift (e.g., gain or offset) can be corrected when the system is configured for operating at high frequencies.

Due to the inhomogeneous nature of the concentration of substances within a sample, certain applications may require measurements along several different areas and each area can have a different location and path length relative to the optical components in the system. Therefore, a system that can measure several different areas and can recognize the actual or relative differences in path lengths from the optical components to the sample may be desired.

Figure 12:
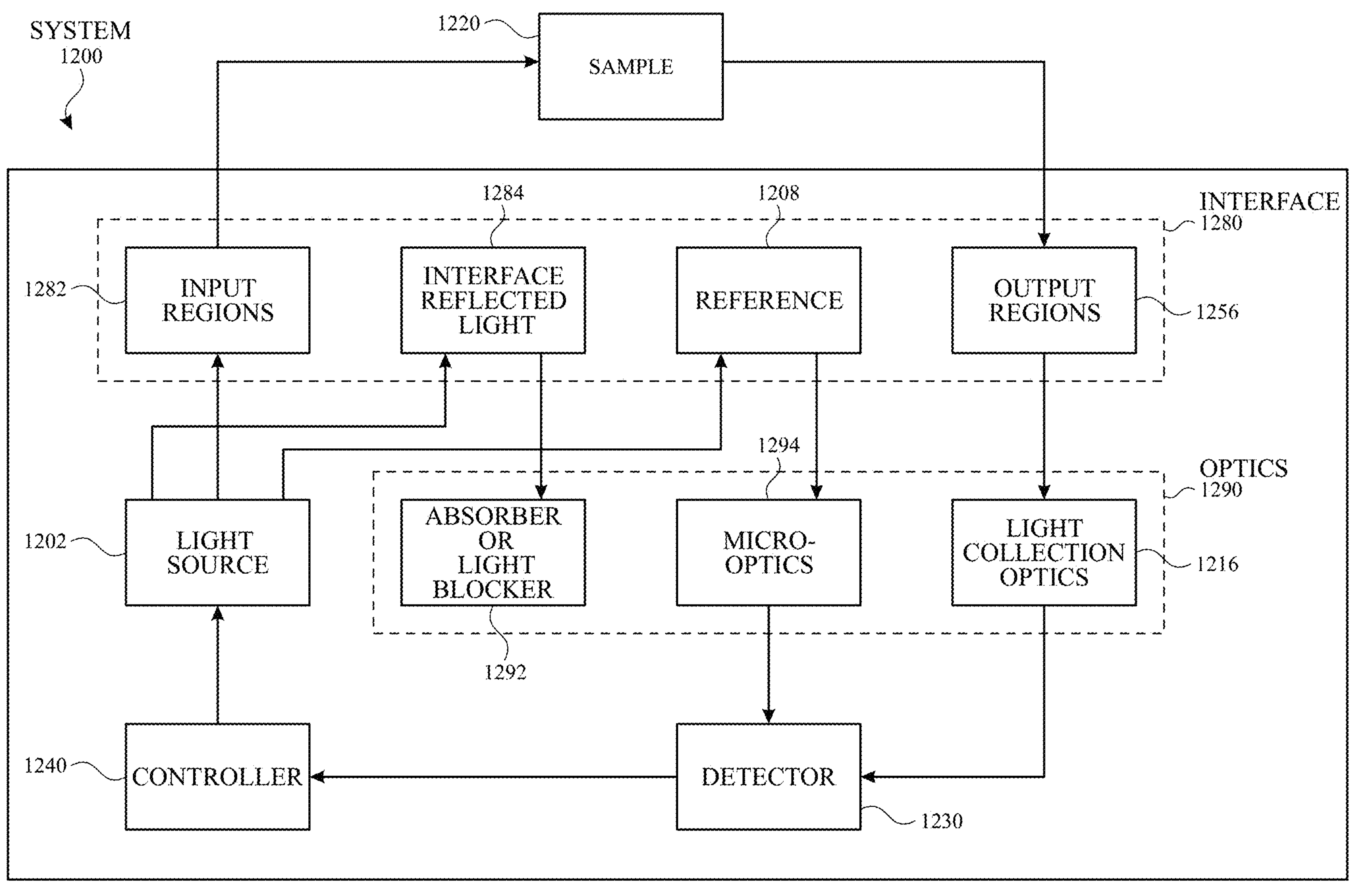
FIG. 12 illustrates an exemplary block diagram of an exemplary system capable reconstructing a plurality of optical paths originating from different locations within a sample and capable of resolving different path lengths of the plurality of optical paths according to examples of the disclosure.

FIG. 12 illustrates an exemplary block diagram of an exemplary system capable of measuring several different locations within a sample and capable of recognizing different path lengths, angles of incidence, or both associated with the different locations according to examples of the disclosure. System 1200 can include interface 1280, optics 1290, light source 1202, detector 1230, and controller 1240. Interface 1280 can include input regions 1282, interface reflected light 1284, reference 1208, and output regions 1256. Optics 1290 can include absorber or light blocker 1292, microoptics 1294, and light collection optics 1216. Sample 1220 can be located near, close to, or touching a portion of system 1200. Light source 1202 can be coupled to controller 1240. Controller 1240 can send a signal (e.g., current or voltage waveform) to control light source 1202 to emit light towards the sample-system interface. Depending on whether the system is measuring the substance in the sample or in the reference, light source 1202 can emit light towards input regions 1282 or reference 1208.

Input regions 1282 can be configured to allow light to exit system 1200 and be incident on sample 1220. Light can penetrate a certain depth into sample 1220 and can reflect back towards system 1200. The reflected light can enter back into system 1200 through output regions 1256 and can be collected by light collection optics 1216, which can redirect, collimate, and/or magnify the reflected light. The reflected light can be directed towards detector 1230, and detector 1230 can measure light that has penetrated into sample 1220 and reflected back into system 1230. Detector 1230 can be coupled to controller 1240 and can send an electrical signal indicative of the reflected light to controller 1240.

Light source 1202 can, additionally or alternatively, emit light towards reference 1208. Reference 1208 can reflect light towards microoptics 1294. Microoptics 1294 can redirect, collimate, and/or magnify the reflected light towards detector 1230. Detector 1230 can measure light reflected from reference 1208 and can generate an electrical signal indicative of this reflected light. Controller 1240 can be configured to receive both the electrical signal indicative of the reflected light and the electrical signal indicative of light reflected from reference 1208 from detector 1230.

In both situations where the system is measuring the substance in the sample and in the reference, light emitted from light source 1202 can reflect off the sample-system interface. Light reflected off the sample-system interface can be referred to as interface reflected light 1284. In some examples, interface reflected light 1284 can be light emitted from light source 1202 that has not reflected off sample 1220 or reference 1208 and can be due to light scattering. Since interface reflected light 1284 can be unwanted, absorber or light blocker 1292 can prevent interface reflected light 1284 from being collected by microoptics 1294 and light collection optics 1216, which can prevent interface reflected light 1284 from being measured by detector 1230.

Figure 13:
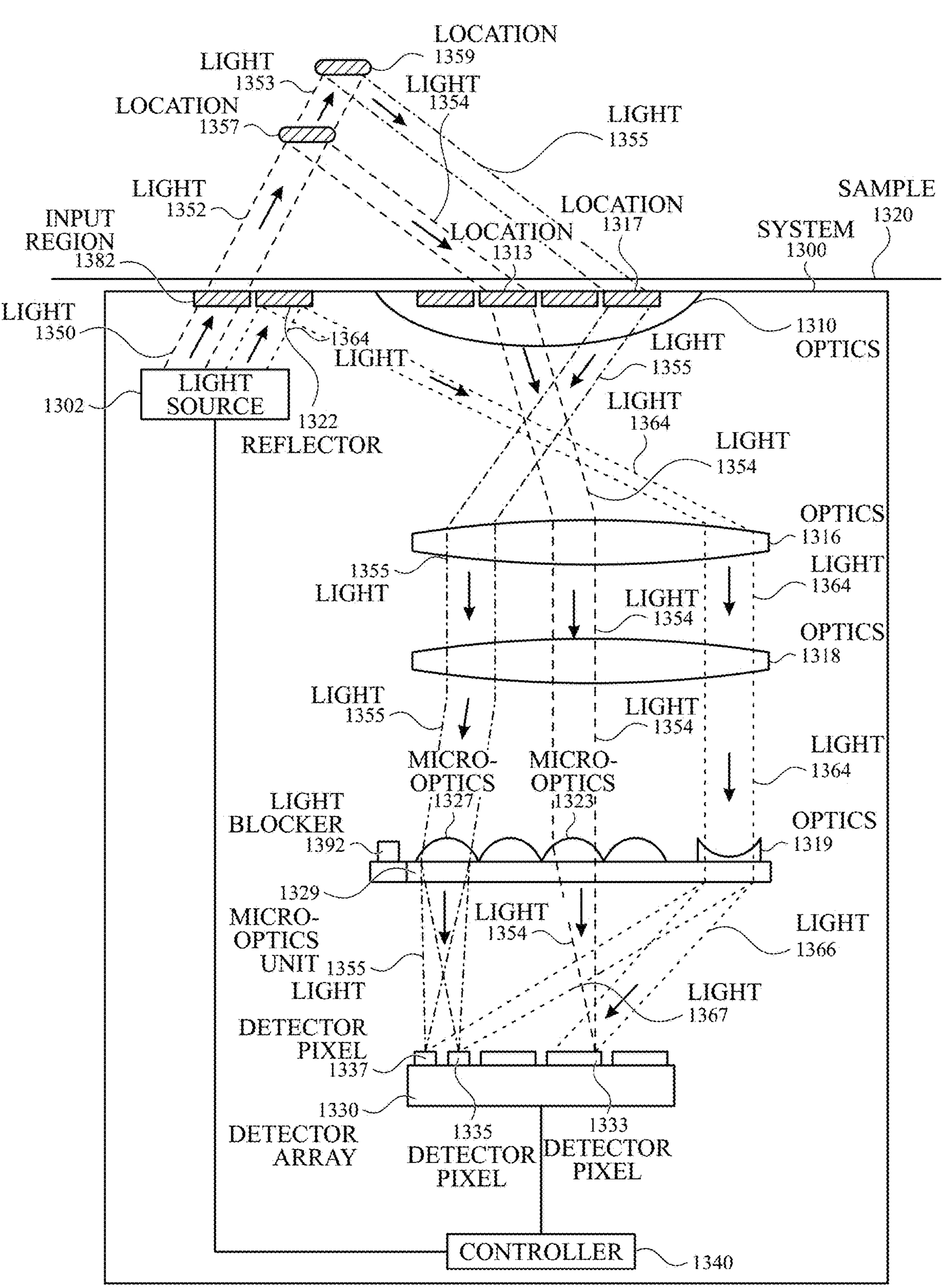
FIG. 13 illustrates a cross-sectional view of an exemplary system capable of measuring different locations in the sample and capable of resolving different light paths associated with the different locations in the sample according to examples of the disclosure.

FIG. 13 illustrates a cross-sectional view of an exemplary system capable of measuring the concentration and type of one or more substances at different locations in a sample and capable of resolving the properties of the optical paths associated with the different locations in the sample according to examples of the disclosure. In some examples, the one or more substances of interest can have a low concentration (e.g., more than one order of magnitude less) in the sample than other substances of interest. In some examples, the concentration of the one or more substances can lead to a low SNR (i.e., SNR<$10^{-4}$ or $10^{-5}$). System 1300 can be close to, touching, resting on, or attached to sample 1320. Sample 1320 can include one or more locations, such as location 1357 and location 1359, where the substance of interest can be measured.

System 1300 can include light source 1302. Light source 1302 can be configured to emit light 1350. Light source 1302 can be any source capable of generating light including, but not limited to, a lamp, laser, LED, OLED, EL source, super-luminescent diode, super-continuum source, fiber-based source, or a combination of one or more of these sources. In some examples, light source 1302 can be capable of emitting a single wavelength of light. In some examples, light source 1302 can be capable of emitting a plurality of wavelengths of light. In some examples, light source 1302 can be any tunable source capable of generating a SWIR signature. System 1300 can include input region 1382 located close to or near sample 1320 or an edge of the system. Input region 1382 can be formed by one or more transparent components including, but not limited to, a window, optical shutter, and mechanical shutter.

Light 1350 can exit system 1300 through input region 1382. Light directed at location 1357 in sample 1320 can be referred to as light 1352. Light 1352 can penetrate through sample 320 and can be incident on location 1357. In some examples, the angle of incidence of light 1352 at location 1357 can be 45°. In some examples, light 1352 can be a collimated beam. Location 1357 can include a concentration of the substance of interest. Light 1352 can be partially absorbed at location 1357 and can be partially reflected as light 1354. In some examples, light 1354 can be formed by light transmitting through sample 1320. Light 1354 can penetrate through sample 1320 and can enter system 1300 at location 1313 of lens 1310. In some examples, lens 1310 can be in contact or near sample 1320. In some examples, lens 1310 can be any type of optical component capable of changing the behavior and properties of the incoming light. Lens 1310 can include a plurality of locations, such as location 1313 and location 1317, where light can to enter system 1300. In some examples, lens 1310 can include a transparent material. In some examples, lens 1310 can be a Fresnel lens or a lens configured with a large aperture (e.g., an aperture larger than the size of the incoming light beam) and a short focal length. In some examples, lens 1310 can be a Silicon lens.

System 1300 can include optics to magnify or project the incoming light beam. In some examples, optics can be a system capable of reimaging or projecting the image of the incoming light at the sample-system interface to another location. For example, the system can reimage the angles of incident light and the position of incident light to another plane (e.g., a plane located closer to the detector array 1330). System 1300 can include lens 1316 and lens 1318 configured for reimagining light 1364. Lens 1316 and lens 1318 can be configured to produce intermediate planes of focus. With intermediate planes of focus, the length of the focus can be extended. For example, to reimage the optical paths at the sample-system interface onto detector array 1330 without magnification, location 1357 can be located a distance f away from lens 1310. The distance f can be equal to the focal length of lens 1310. Lens 1316 can be located a distance **2*f* (i.e., two times the focal length) away from lens 1310, lens 1318 can be located a distance 2*f* from lens 1316, microlens array 1329 can be located a distance 2*f* away from lens 1318, and detector array 1330 can be located a distance f away from microlens array 1329. In some examples, the optics in system 1300** can magnify the image by a factor, such as 2.5× or 5×.

Light 1354 can transmit through lens 1316 and 1318 and can be incident on microlens 1323, included in microlens array 1329. Microlens array 1329 can comprise a plurality of microlenses, such as microlens 1321, microlens 1323, microlens 1325, and microlens 1327 attached to a substrate. In some examples, microlens 1321, microlens 1323, microlens 1325, and microlens 1327 can be any type of lens and can include any type of material conventionally used in lenses. A microlens can be a small lens or one that is smaller (e.g., a lens with a diameter less than 1 mm) than a conventional lens. In some examples, two or more of microlenses included in the microlens array 1329 can have the same optical and/or physical properties. One skilled in the art would appreciate that the same optical properties and the same physical properties can include tolerances that result in a 15% deviation. Light 1354 can transmit through microlens 1323 and can be incident on detector pixel 1333. In some examples, microlens array 1329 can be coupled to one or more apertures or apertures. In some examples, microlens array 1329 can be coupled to a patterned aperture, such as an aperture where locations between adjacent microlenses are opaque to prevent light mixing.

Detector pixel 1333 can be included in detector array 1330. Detector array 1330 can include a plurality of detector pixels, such as detector pixel 1331, detector pixel 1333, detector pixel 1335, and detector pixel 1337. In some examples, detector array 1330 can be a detector including a single detector pixel detector. In some examples, at least one detector pixel can be independently controlled from other detector pixels included in the detector array 1330. In some examples, at least one detector pixel can be capable of detecting light in the SWIR. In some examples, at least one detector pixel can be a SWIR detector capable of operating between 2.2-2.7 μm. In some examples, at least one detector pixel can be a HgCdTe, InSb, or InGaAs based detector. In some examples, at least one detector pixel can be capable of detecting a position and/or angle of the incoming light beam. Detector pixel 1333 can detect light 1354 and can generate an electrical signal indicative of the properties of light 1354. Detector array 1430 can transmit the electrical signal to controller 1340. Controller 1340 can process and/or store the electrical signal.

System 1300 can include reflector 1322. Light source 1302 can emit light 1364. Light 1364 can be directed at reflector 1322. Reflector 1322 can include any type of material capable of at least partially reflecting light. Exemplary reflective materials can include, but are not limited to, Titanium (Ti), Cobalt (Co), Niobium (Nb), Tungsten (W), Nickel Chrome (NiCr), Titanium Tungsten (TiW), Chrome (Cr), Aluminum (Al), Gold (Au), and Silver (Ag). The thickness of reflector 1322 can be determined based on the wavelength of light, type of material, and/or composition. In some examples, the size and shape of reflector 1322 can be configured to be larger or the same as the size and/or shape of the light beam included in light 1364. One skilled in the art would appreciate that the same size and the same shape can include tolerances that result in a 15% deviation. In some examples, reflector 1322 can be configured such that the reflectivity of light 1364 can be greater than 75%. In some examples, reflector 1322 can be configured such that the reflectivity of light 1364 can be greater than 90%. In some examples, the size and shape of reflector 1322 can be such that no or minimal (e.g., less than 10%) amounts of light 1364 is allowed to transmit through reflector 1322 and light 1364 is prevented from penetrating through sample 1320. In some examples, reflector 1322 can be configured to reflect light 1364 as a specular reflection. In some examples, reflector 1322 can be a spectroscopically neutral blocker. In some examples, the reference can be formed by chopping light 1364 between sample 1320 and reference (e.g., reflector 1322).

Light 1364 can reflect off reflector 1322 towards lens 1316. Similar to lens 1312 and lens 1314, lens 1316 and lens 1318 can reimage or project the image of the incoming light at the sample-system interface. In some examples, lens 1316 and lens 1318 can be configured such that a replica of the optical paths are the sample-system interface is produced onto another plane (e.g., plane where the detector array 1330 is located) without magnification. In some examples, lens 1316 and lens 1318 can be configured such that a magnification, such as 2.5×-5× magnification, is introduced into the replica. Light 1364 can transmit through lens 1316 towards lens 1318. Light 1364 can transmit through lens 1318 and can be incident on lens 1319.

Lens 1319 can be any type of lens configured for spreading out the incoming light beam. In some examples, lens 1319 can be a negative lens, which can be a lens with a focal length that is negative. In some examples, lens 1319 can be a prism. In some examples, lens 1319 can include a different prism wedge angled for each detector pixel in the detector array 1330. In some examples, system 1300 can be configured with a beamsplitter for spreading out the incoming light. Lens 1319 can be configured to spread out or divide light into multiple beams, such as light 1366 and light 1367. In some examples, lens 1319 can spread out light such that each light beam is directed to a different detector pixel on the detector array 1330. In some examples, lens 1319 can uniformly spread out light such that the optical properties of each light beam are the same. One skilled in the art would appreciate that the same optical properties can include tolerances that result in a 15% deviation. In some examples, lens 1319 can spread out the light beam such that intensities of at least two light beams are different. In some examples, lens 1319 can comprise multiple lenses or microlenses. In some examples, the size and/or size of lens 1319 can be based on the number of detector pixels and/or the intensity of the one or more light beams exiting lens 1319. In some examples, one or more apertures can be coupled to lens 1319 to control the intensity and/or direction of light exiting lens 1319. In some examples, lens 1319 or system 1300 can be configured such that light that reflects off a surface of sample 1320 or an edge of system 1300 reflects back into the system (i.e., light that has not traveled through sample 1320) and is prevented from being incident on lens 1319, although stray light or background light can be incident on lens 1319.

Light 1364 can transmit through lens 1319 to form light 1366. Light 1366 can be incident on detector pixel 1333. Detector pixel 1333 can detect light 1366 and can generate an electrical signal indicative of the properties of light 1366. The electrical signal can be transmitted from detector array 1330 to controller 1340. Controller 1340 can process and/or store the electrical signal. Controller 1340 can utilize the signal information measured from light 1354 to determine the reflectivity or concentration of the substance located at location 1357 within sample 1320 and can utilize the signal information from light 1366 to determine the properties of reflector 1322. Using any of the above discussed methods, controller 1340 can process both signal information to determine the concentration and type of substance at location 1357 located in sample 1320.

There can be an inhomogeneous distribution of the one or more substances in the sample, which can produce variations in the optical properties (e.g., linear birefringence, optical activity, diattenuation) of the sample. Therefore, a system capable of measuring multiple locations within sample 1320 and corresponding measurements can be beneficial. To measure a different location, such as location 1359 different from location 1357, light source 1302 can emit light 1350 towards input region 1382. In some examples, system 1300 can include multiple apertures. For example, system 1300 can include at least two apertures, where light 1352 can exit one aperture and light 1353 can exit the other aperture. Light directed at location 1359 can be referred to as light 1353. Light 1353 can penetrate through sample 1320 and can be incident on location 1359. Light 1353 can have any angle of incidence at location 1359 including, but not limited to, 45°. In some examples, light 1353 can be a collimated beam. Location 1359 can include a concentration of one or more substances of interest. Light 1353 can be partially absorbed at location 1359 and can be partially reflected as light 1355. In some examples, light 1355 can be formed by light transmitting through sample 1320. Light 1355 can travel through sample 1320 and can enter system 1300 at location 1317 of lens 1310. Light 1355 can transmit through lens 1310 and can be directed towards lens 1312. Light 1355 can transmit through lens 1312 and lens 1314 and can be directed towards microlens 1327 of microlens array 1329. As illustrated in the figure, although lens 1312 and lens 1314 can be shared by light 1354 and light 1355 (i.e., different light beams), the locations where light 1354 and light 1355 are incident on lens 1312 and lens 1314 can be different. Additionally or alternatively, light 1354 and light 1355 can share lens 1312 and lens 1314 by utilizing the lenses at different times.

Light 1355 can be incident on microlens 1327, can transmit through microlens 1327, and can be incident on detector pixel 1337 of detector array 1330. Detector pixel 1337 can detect light 1355 and can generate an electrical signal indicative of the properties of light 1355. Detector array 1330 can transmit the electrical signal to controller 1340. Controller 1340 can process and/or store the electrical signal.

Similar to the discussion given above, a reference signal can be measured using reflector 1322. Light source 1302 can emit light 1364 towards reflector 1322. Reflector 1322 can be configured to reflect light 1364 towards detector array 1330. Light 1364 can transmit through lens 1316 and lens 1318. Light 1364 can be incident on lens 1319, which can be configured to spread out the incoming light beam. Lens 1319 can form light 1367, which can be incident on detector pixel 1337. Detector pixel 1337 can detect light 1367 and can generate an electrical signal indicative of the properties of light 1367. The electrical signal can be transmitted from detector array 1330 to controller 1340. Controller 1340 can process and/or store the electrical signal. Controller 1340 can utilize the signal information measured from light 1355 to determine the reflectivity or concentration of the substance at location 1359 and can utilize the signal information from light 1367 to determine the properties of the reflector 1322. Controller 1340 can process both signal information to determine the concentration of the substance at location 1359. In some examples, controller 1340 can determine the properties of reflector 1322 or light 1366 incident on detector pixel 1333 and light 1367 incident on detector pixel 1337 simultaneously without the need for separate measurements. In some examples, location 1357 and location 1359 can have the same depth from the surface of sample 1320. One skilled in the art would appreciate that the same depth can include tolerances that result in a 15% deviation. In some examples, location 1357 and location 1359 can have different depths from the surface of sample 1320. Controller 1340 can measure the reflectivity, refractive index, density, concentration, scattering coefficient, scattering anisotropy, absorbance, or any combination of optical properties at both location 1357 and location 1359 and can average the measured values. Although the FIGURE and discussion above relates to two locations in the sample, examples of the disclosure can include any number of locations and are not limited to one or two locations.

Although detector array 1330 can be configured to detect the angle or location of incident light, controller 1340 can determine this information based on the detector pixel included in the detector array 1330. In some examples, light emitted from light source 1302 can be a well-defined (i.e., directional and sharp) light beam and reflected light from sample 1320 can be specular, one or more microlens included in microlens array 1329 can correspond to a different location in sample 1320. Additionally, one or more detector pixels included in detector array 1330 can be associated with a microlens in the microlens array 1329. For example, when controller 1340 or detector array 1330 measures light incident on detector pixel 1337, system 1300 can determine that the incident light originated from location 1359 in sample 1320 due to the association of detector pixel 1337 to location 1359. Additionally, when controller 1340 or detector array 1330 measures light incident on detector pixel 1333, system 1300 can determine that the incident light originated from location 1357 due to the association of detector pixel 1333 to location 1357. In some examples, detector pixel 1331 and detector pixel 1435 can be associated to additional locations (not shown) in sample 1320.

Figure 14A:
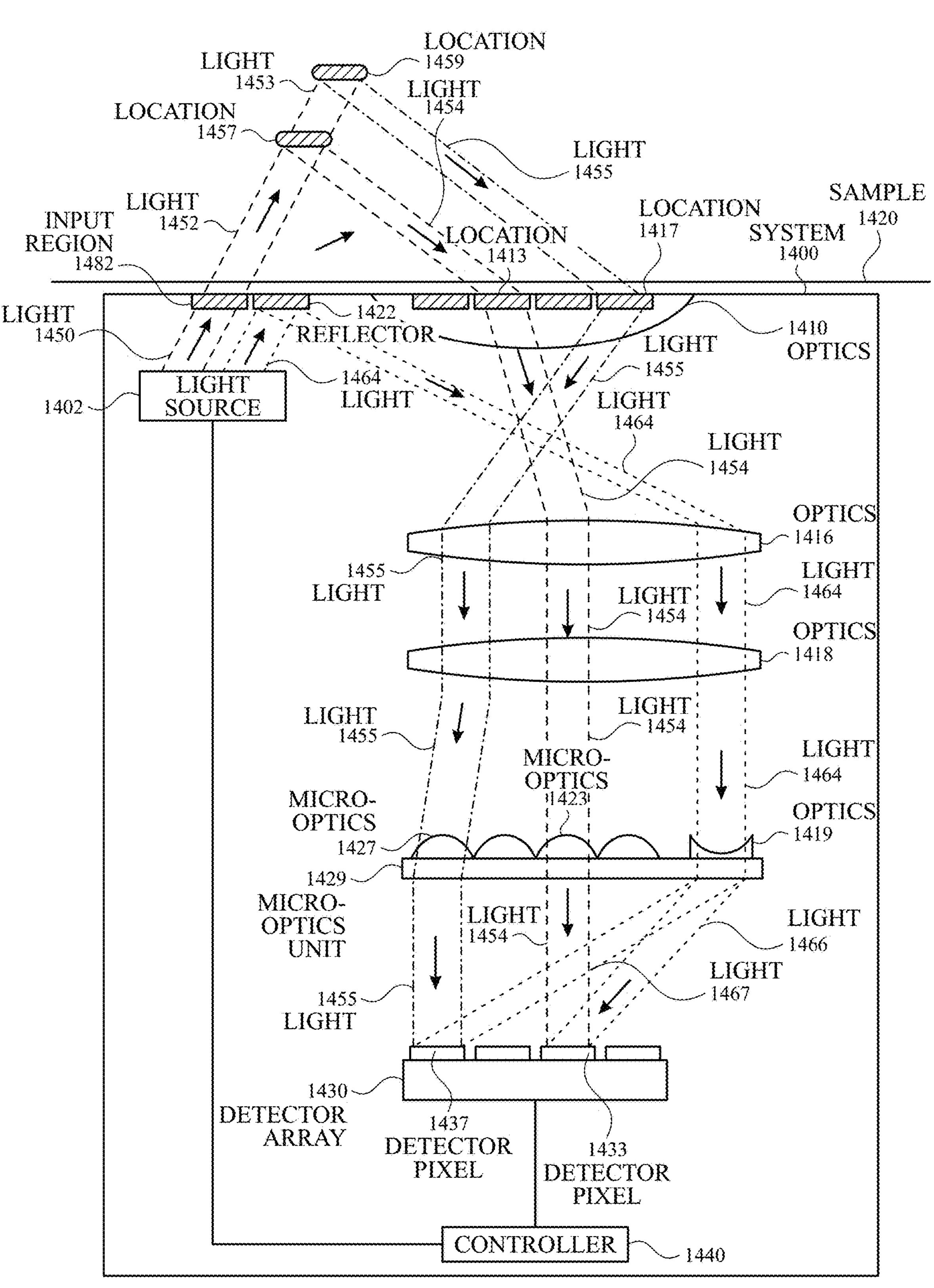
FIGS. 14A-14B illustrate cross-sectional views of exemplary systems configured for determining a concentration and type of substance located in a sample using shared optics according to examples of the disclosure.

As discussed above, due to the fluctuations, drift, and/or variations that can be introduced into the electrical signal received by the controller, it may be advantageous to share components among one or more light paths that travel through the sample and the light path that reflects off the reflector. FIG. 14A illustrates a cross-sectional view of an exemplary system configured to measure a concentration and type of one or more substances located in a sample using shared optics according to examples of the disclosure. In some examples, the one or more substances of interest can have a low concentration (e.g., more than one order of magnitude less) in the sample than other substances of interest. In some examples, the concentration of the one or more substances can lead to a low SNR (e.g., $SNR<10^{-4}$ or $10^{-5}$). System 1400 can be close to, touching, resting on, or attached to sample 1420. Sample 1420 can include one or more locations, such as location 1457 and location 1459, where the substance can be measured.

System 1400 can include light source 1402. Light source 1402 can be configured to emit light 1450. Light source 1402 can be any source capable of generating light including, but not limited to, a lamp, laser, LED, OLED, EL source, super-luminescent diode, super-continuum source, fiber-based source, or a combination of one or more of these sources. In some examples, light source 1402 can be capable of emitting a single wavelength of light. In some examples, light source 1402 can be capable of emitting a plurality of wavelengths of light. In some examples, light source 1402 can be any tunable source capable of generating a SWIR signature. System 1400 can include input region 1482 located close to or near sample 1420 or an edge of the system. Input region 1482 can be formed by one or more transparent components including, but not limited to, a window, optical shutter, or mechanical shutter.

Light 1450 can exit system 1400 through input region 1482. Light that exits system 1400 and travels through sample 1420 to location 1457 can be referred to as light 1452. Light 1452 can have any angle of incidence at location 1457 including, but not limited to, 45°. In some examples, light 1450 can be a collimated beam. Location 1457 can include a concentration of the substance of interest. Light 1452 can be partially absorbed at location 1457 and can be partially reflected as light 1454. In some examples, light 1454 can be formed by light transmitting through the sample. Light 1454 can penetrate through sample 1420 and can enter system 1400 at location 1413 of optics 1410. In some examples, optics 1410 can be in contact or near a surface of sample 1420. In some examples, optics 1410 can be any type of optical component capable of changing the behavior and properties of the incoming light. Optics 1410 can include a plurality of locations, such as location 1413 and location 1417, where light can enter. In some examples, optics 1410 can include a transparent material. In some examples, optics 1410 can be a Fresnel lens or a lens configured with a large aperture (e.g., an aperture larger than the size of the incoming light beam) and a short focal length. In some examples, optics 1410 can be a Silicon lens.

System 1400 can include optics to magnify or project the incoming light beam. Similar to the optics illustrated in and discussed with respect to system 1300 illustrated in FIG. 13, the optics in system 1400 can be capable of reimagining the optical paths, including the path lengths, angles of incidence, and exit locations, at the edge of system 1400 to another plane closer to detector array 1430. To reduce the differences in any fluctuations, drifts, and/or variations between a light path (e.g., light 1452 or light 1453) penetrating through the sample 1420 and a light path reflecting off a reference (e.g., reflector 1422), system 1400 can share the optics between the two different light paths. System 1400 can include optics 1416 and optics 1418 for reimaging both light that has traveled through sample 1320 and light used as a reference signal. In some examples, optics 1416 and optics 1418 can be configured such that a replica of the image located at the edge of the system can be produced onto another plane (e.g., the plane where the detector array 1430 is located) without magnification. In some examples, optics 1416 and optics 1418 can be configured to introduce a magnification, such as a 2.5×-5× magnification, into the replica.

Figure 14B:
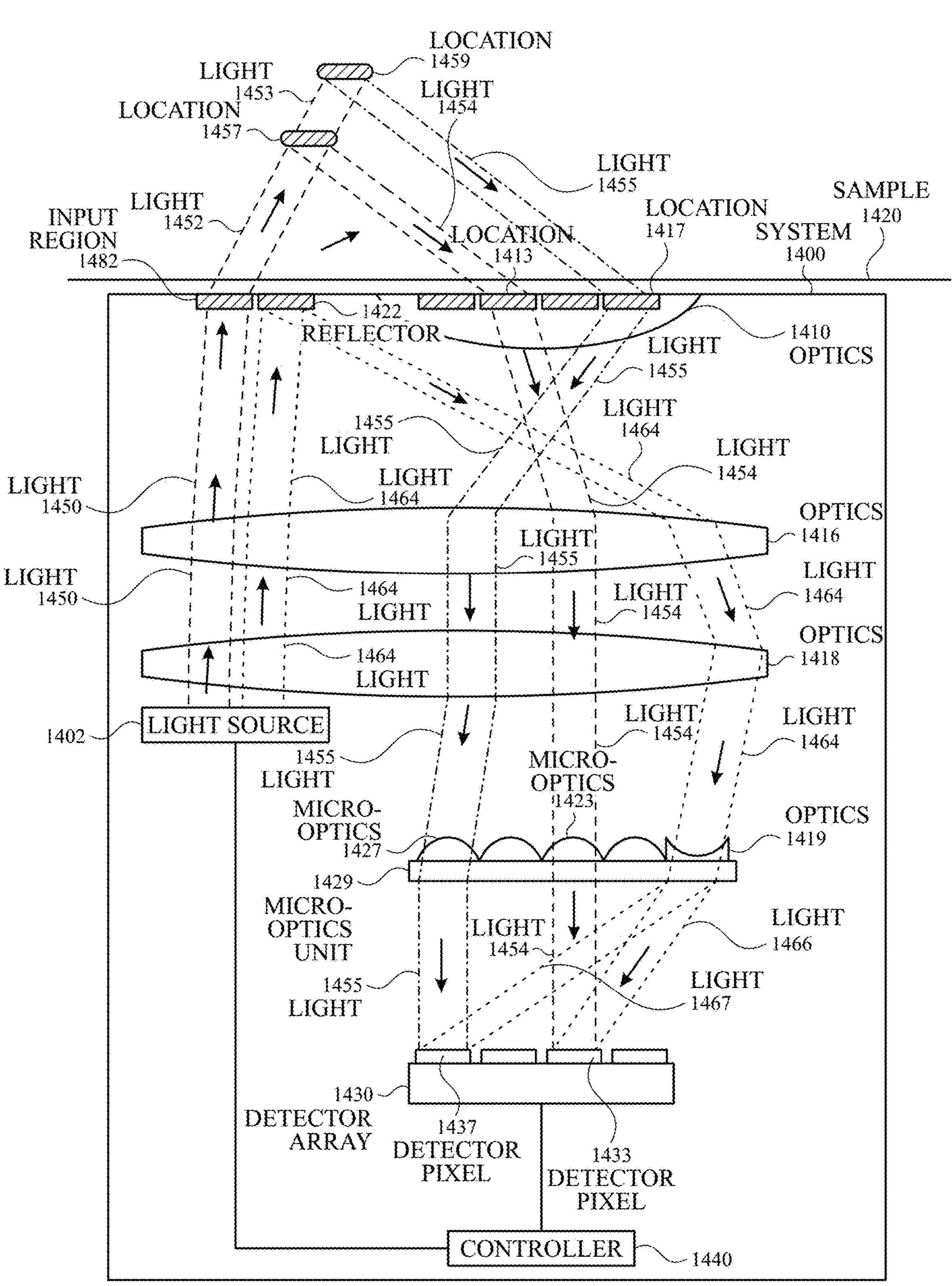

FIG. 14B illustrates the system including optics that are shared for both the incident and return or reflected light. Optics 1416 can be shared by light 1450 and light 1464 emitted from light source 1402, light 1454 and light 1455 that has traveled through sample 1420, and light 1564 that has reflected off reflector 1422. In some examples, at least two of the angles of incidence of light 1454, light 1455, light 1464, and light 1450 at optics 1416 and/or optics 1418 can be different.

Referring to FIGS. 14A-14B, light 1454 can transmit through optics 1416 and optics 1418 and can be incident on microoptics 1423, included in microoptics unit 1429. Microoptics unit 1429 can comprise a plurality of microlenses, such as microoptics 1423 and microoptics 1427, attached to a substrate. A microlens can be a small lens or one that is smaller (e.g., a lens with a diameter less than 1 mm) than a conventional lens. In some examples, the microlenses can be any type of lens and can include any type of material conventionally used in lenses. In some examples, two or more of the microlenses can have the same optical and/or physical properties. One skilled in the art would appreciate that the same optical properties and the same physical properties can include tolerances that result in a 15% deviation. Light 1454 can transmit through microoptics 1423 and can be incident on detector pixel 1433. In some examples, microoptics unit 1429 can be coupled to one or more apertures or apertures. In some examples, microoptics unit 1429 can be coupled to a patterned aperture, such as an aperture where locations between adjacent microoptics are opaque to prevent light mixing.

Detector pixel 1433 can be included in detector array 1430. Detector array 1430 can include a plurality of detector pixels, such as detector pixel 1433 and detector pixel 1437. In some examples, detector array 1430 can be a single detector pixel detector. In some examples, at least one detector pixel can be independently controlled from other detector pixels included in detector array 1430. In some examples, at least one detector pixel can be capable of detecting light in the SWIR. In some examples, at least one detector pixel can be a SWIR detector capable of operating between 2.2-2.7 μm. In some examples, at least one detector pixel can be a HgCdTe, InSb, or InGaAs based detector. In some examples, at least one detector pixel can be capable of detecting a path length, angle of incidence, and/or exit location of the incoming light beam. Detector pixel 1433 can detect light 1454 and can generate an electrical signal indicative of the properties of light 1454. Detector array 1430 can transmit the electrical signal to controller 1440. Controller 1440 can process and/or store the electrical signal.

System 1400 can determine the concentration of the substance in sample 1420 by utilizing the information from light penetrating through the sample in conjunction with the information from light reflecting off reflector 1422. Light source 1402 can emit light 1464, which can be directed at reflector 1422. Reflector 1422 can include any type of material capable of at least partially reflecting light. Exemplary reflective materials can include, but are not limited to, Ti, Co, Nb, W, NiCr, TiW, Cr, Al, Au, and Ag. The thickness of the reflector 1422 can be configured based on the wavelength of light, type of material, and/or composition. In some examples, the size and shape of reflector 1422 can be configured to be larger or the same as the size and/or shape of the light beam included in light 1464. One skilled in the art would appreciate that the same optical properties and the same physical properties can include tolerances that result in a 15% deviation. In some examples, the reflector 1422 can be configured to reflect greater than 75% of light 1464. In some examples, reflector 1422 can be configured to reflect greater than 90% of light 1464. In some examples, the size and shape of reflector 1422 can be such that no or a minimal (e.g., less than 10%) amount of light 1464 is allowed to transmit through reflector 1422, and light 1464 is prevented from traveling through sample 1420. In some examples, reflector 1422 can be configured to reflect light 1464 as a specular reflection. In some examples, reflector 1422 can be a spectroscopically neutral blocker. In some examples, the reference can be formed by chopping light 1464 between the sample 1420 and reference (e.g., reflector 1422).

Light 1464 can reflect off reflector 1422 towards optics 1416. Light 1464 can transmit through optics 1416 towards optics 1418. Light 1464 can transmit through optics 1418 and can be incident on optics 1419. Optics 1419 can be any type of lens configured for spreading out the incoming light beam. In some examples, optics 1419 can be a negative lens, which can be a lens with a focal length that is negative. In some examples, optics 1419 can be a prism. In some examples, optics 1419 can include a different prism wedge angled for each detector pixel in detector array 1430. In some examples, system 1400 can be configured with a beamsplitter for spreading out the incoming light beam. In some examples, optics 1419 can be configured to spread out or divide light into multiple beams, such as light 1466 and light 1467. In some examples, optics 1419 can spread out light such that each light beam can be directed to a different detector pixel. In some examples, optics 1419 can uniformly spread out light such that the optical properties of each light beam can be the same. One skilled in the art would appreciate that the same optical properties can include tolerances that result in a 15% deviation. In some examples, optics 1419 can spread out light beam such that intensities of at least two light beams are different. In some examples, optics 1419 can comprise multiple optics or microoptics. In some examples, the size and/or size of optics 1419 can be based on the number of detector pixels and/or the properties of the one or more light beams exiting optics 1419. In some examples, an aperture can be coupled to optics 1419 to control the properties and/or direction of light exiting optics 1419. In some examples, optics 1419 or system 1400 can be configured such that light that reflects off a surface of sample 1420 or an edge of system 1400 reflects back into the system (i.e., light that has not traveled through sample 1420) and is prevented from being incident on optics 1419, although stray light or background light can be incident on optics 1419.

Light 1464 can transmit through optics 1419 to form light 1466. Light 1466 can be incident on detector pixel 1433. Detector pixel 1433 can detect light 1466 and can generate an electrical signal indicative of the properties of light 1466. Detector array 1430 can transmit the electrical signal to controller 1440. Controller 1440 can process and/or store the electrical signal. Controller 1440 can utilize the signal information measured from light 1454 to determine the reflectivity or concentration of the substance at location 1457 and can utilize the signal information from light 1466 to determine the properties of reflector 1422. Using any of the above discussed methods, controller 1440 can process both signal information to determine the concentration of the substance at location 1457 located in sample 1420.

Similar to measuring the concentration of the substance at location 1557, the same components can be used to measure the concentration of the substance at location 1559. Light source 1502 can emit light 1550, which can exit system 1500 at input region 1582 to form light 1553. In some examples, system 1500 can include multiple apertures. For example, system 1500 can include at least two apertures, where light 1552 can exit one aperture and light 1553 can exit another aperture. Light 1553 can be incident on location 1559 and can reflect back into system 1500 as light 1555. Light 1555 can enter system 1500 through optics 1510 at location 1517. Light 1555 can transmit through optics 1516 and optics 1518 and can be incident on microoptics 1527. Light 1555 can transmit through microoptics 1527 and can be detected by detector pixel 1537 included in detector array 1530. Detector pixel 1537 can detect light 1555 and can generate an electrical signal indicative of the properties of the detected light 1555. The electrical signal can be transmitted from the detector array 1530 to controller 1540. Controller 1540 can process and/or store the electrical signal. Controller 1440 can utilize the signal information measured from light 1455 to determine the reflectivity or concentration of the substance at location 1459 and can utilize the signal information from light 1467 to determine the properties of the reflector 1422. Controller 1440 can process both signal information to determine the concentration and type of substance at location 1459. In some examples, controller 1440 can determine the properties of reflector 1422 (or light 1466 incident on detector pixel 1433) and light 1467 incident on detector pixel 1437 simultaneously without the need for separate measurements. In some examples, location 1457 and location 1459 can have the same depth from the surface of sample 1420. One skilled in the art would appreciate that the same depth can include tolerances that result in a 15% deviation. In some examples, location 1457 and location 1459 can have different depths from the surface of sample 1420. Controller 1440 can measure the reflectivity, refractive index, density, concentration, scattering coefficient, scattering anisotropy, absorbance, or a combination of the optical properties at both location 1457 and location 1459 and can average the measured values. Although the FIGURE and discussion above relates to two locations in the sample, examples of the disclosure can include any number of locations and are not limited to one or two locations.

As illustrated in the FIGURE, system 1400 can include a plurality of microoptics and a plurality of detector pixels, where each microoptics can be coupled to a detector pixel. Each microoptics-detector pixel pair can be associated with a location in the sample. In some examples, the association can be one microoptics-detector pixel pair to one location in the sample. For example, microoptics 1423 and detector pixel 1433 can be associated with location 1457 and microoptics 1427, and detector pixel 1437 can be associated with location 1459. Since controller 1440 can associate detector pixel 1433 and detector pixel 1437 to different location (e.g., location 1457 and location 1459), controller 1450 can determine and locate different concentrations of the substance for different areas of sample 1420.

Figure 15:
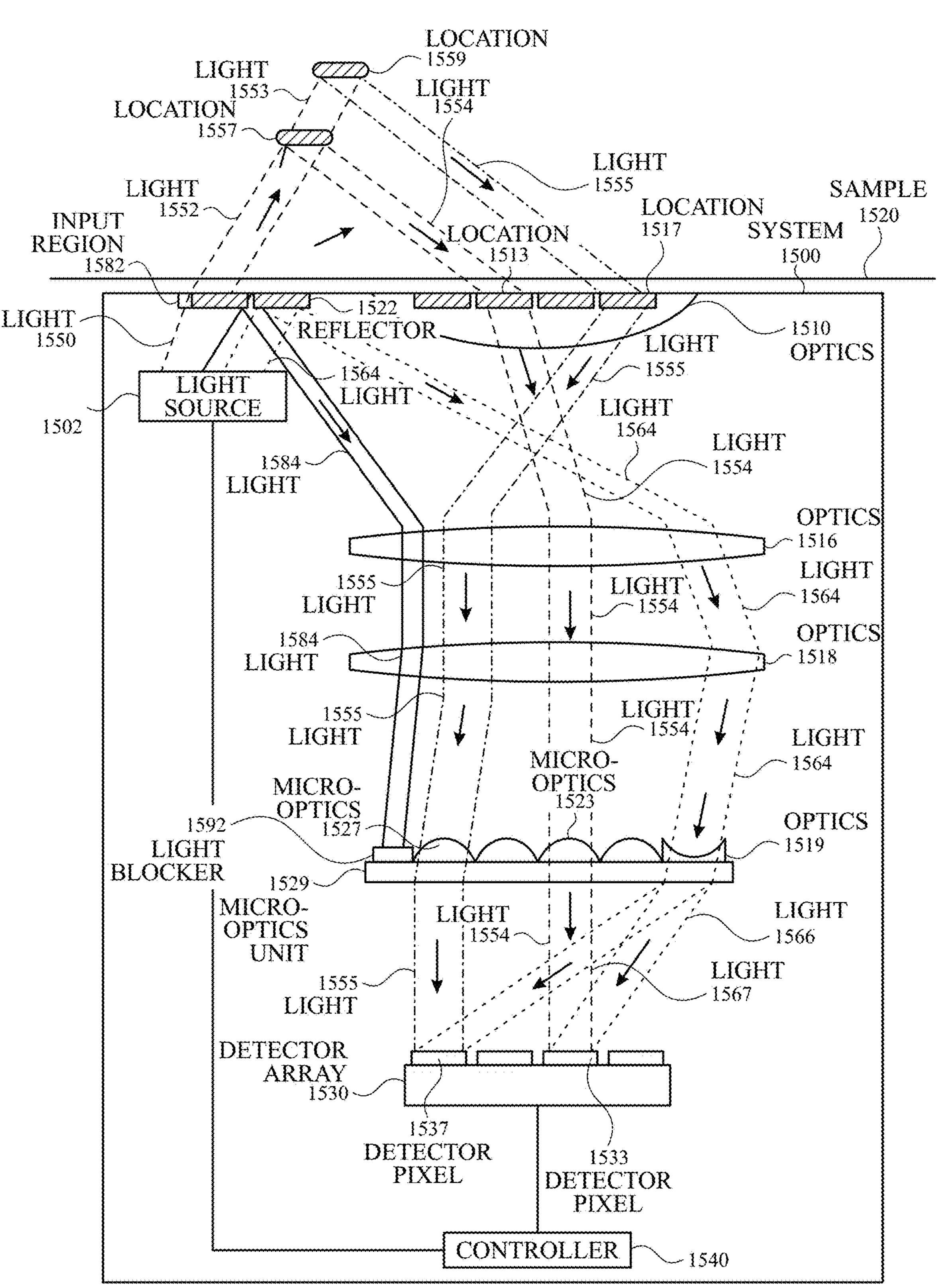
FIG. 15 illustrates a cross-sectional view of an exemplary system configured for determining a concentration and type of substance located in a sample and configured to reduce or eliminate light reflections or scattering at the sample-system interface according to examples of the disclosure.

While system 1300 (illustrated in FIG. 13) and system 1400 (illustrated in FIG. 14) can account for fluctuations, drift, and/or variations due to shared components (e.g., light source, lenses, and/or detector array), these systems may not account for light that reflects and/or scatters at the edge of the system. FIG. 15 illustrates a cross-sectional view of an exemplary system configured to measure a concentration and type of one or more substances in a sample and configured to reduce or eliminate light reflections or scattering at the edge of the system according to examples of the disclosure. Similar to system 1300 and system 1400, system 1500 can comprise multiple components including a light source 1502, optics 1510, optics 1516, optics 1518, microoptics unit 1527, detector array 1530, and controller 1540. These components can include one or more properties discussed above with reference to the components included in system 600, system 800, system 1300, and system 1400.

The concentration of the substance at location 1557 can be measured using light 1550 exiting system 1500 through input region 1582, light 1552, and light 1554 formed by reflecting off location 1557. Light 1554 can enter system 1500 at location 1513 and can transmit through optics 1510, optics 1516, optics 1518, and microoptics 1523, included in microoptics unit 1529. Detector pixel 1533, included in detector array 1530, can detect light 1554 and can generate an electrical signal indicative of the optical properties of light 1554. The concentration of the substance at location 1559 can be measured using light 1550 exiting system 1500 through input region 1582, light 1553, and light 1555 formed by reflecting off location 1559. Light 1555 can enter system 1500 at location 1517 and can transmit through optics 1510, optics 1516, optics 1518, and microoptics 1527, included in microoptics unit 1529. Detector pixel 1537, included in detector array 1530, can detect light 1555 and can generate an electrical signal indicative of the optical properties of light 1555. The optical properties of the reference or reflector 1522 can be determined using light 1564 that reflects off reflector 1522, transmits through optics 1516, optics 1518, and optics 1519. Light 1564 can be spread out by optics 1519 to form light 1566 incident on detector pixel 1533 and light 1567 incident on detector pixel 1537. Controller 1540 can receive electrical signals indicative of light reflected off location 1557, location 1559, and reflector 1522 to determine the concentration of the substance at one or more locations in sample 1520.

Although light 1550 can be directed towards input region 1582 and can be configured for exiting system 1500, in some examples, light 1550 can scatter or reflect off the edge of system 1500 at one or more locations (e.g., location between input region 1582 and reflect 1522. Light that scatters or reflects off the edge of the system and back into the system 1500 can be referred to as light 1584. Since light 1584 can include stray light that reflects back into system 1500, a portion or all of light 1584 can be incident on one or more microoptics (e.g., microoptics 1523 or microoptics 1527). Light that is incident on the microoptics can transmit to one or more detector pixels (e.g., detector pixel 1633 or detector pixel 1637) included in the detector array 1530. As a result, stray light can be measured by detector array 1530, which can erroneously change the electrical signal that the detector array 1530 can generate and transmit to controller 1540. Any change in electrical signal due to stray light can lead to a false measurement or determination of the concentration of the substance in the sample 1520.

Therefore, to prevent light 1584 from being detected by detector array 1530, system 1500 can direct light 1584 towards optics 1516 and optics 1518. Light 1584 can transmit through optics 1516 and optics 1518 and can be incident on light blocker 1592. Light blocker 1592 can include any material capable of absorbing or blocking light. In some examples, light blocker 1592 can include any material (e.g., an anti-reflection coating) that prevents incident light from reflecting. In some examples, light blocker 1592 can include any material that reflects at wavelengths different from the detection wavelengths of detector array 1530. In some examples, system 1500 can, additionally or alternatively, include an anti-reflection coating at one or more locations along the edge of the system.

Figure 16A:
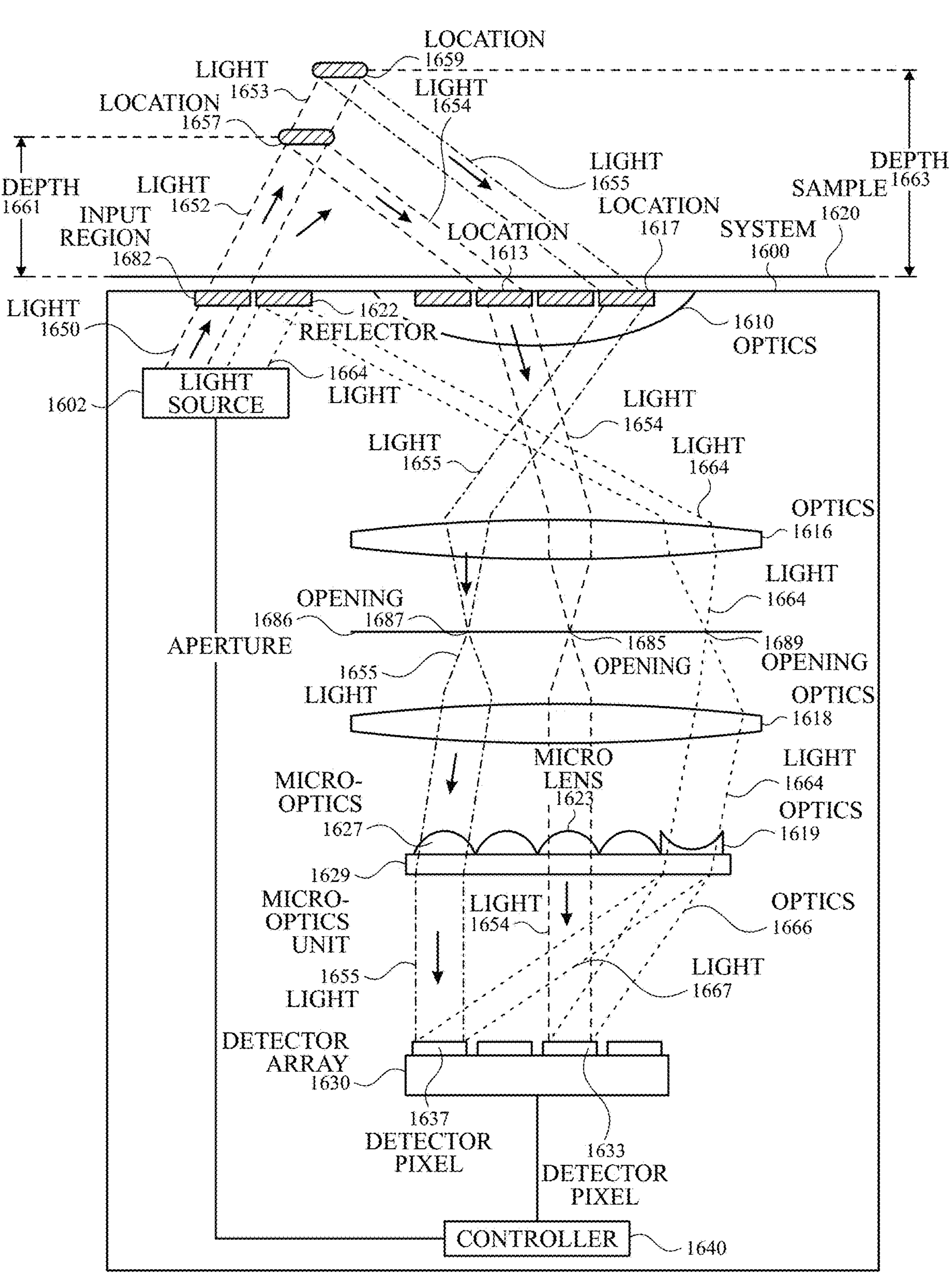
FIG. 16A illustrates a cross-sectional view of an exemplary system configured for determining a concentration and type of substance located in a sample according to examples of the disclosure.

Examples of the disclosure can include other types of optics or optic systems and are not limited to the systems illustrated in FIGS. 13, 14A-14B, and 15. Additionally, examples of the disclosure can include measuring the concentration of a sample at different depths within the sample, which can lead to optical paths with different path lengths. FIG. 16A illustrates a cross-sectional view of an exemplary system configured to measure a concentration and type of one or more substances located at different depths in a sample according to examples of the disclosure. In some examples, the one or more substances of interest can have a low concentration (e.g., more than one order of magnitude less) in the sample than other substances of interest. In some examples, the concentration of the one or more substances can lead to a low SNR (i.e., SNR<$10^{-4}$ or $10^{-5}$). System 1600 can be close to, touching, resting on, or attached to sample 1620. Sample 1620 can include one or more locations, such as location 1657 and location 1659, where the substance can be measured. Location 1657 can be located a depth 1661 away from the edge of the system, and location 1659 can be located a depth 1663 away from the edge of the system. In some examples, depth 1661 can be different from depth 1663.

System 1600 can include light source 1602. Light source 1602 can be configured to emit light 1650. Light source 1602 can be any source capable of generating light including, but not limited to, a lamp, laser, LED, OLED, EL source, super-luminescent diode, super-continuum source, fiber-based source, or a combination of one or more of these sources. In some examples, light source 1602 can be capable of emitting a single wavelength of light. In some examples, light source 1602 can be capable of emitting a plurality of wavelengths of light. In some examples, light source 1602 can be any tunable source capable of generating a SWIR signature. System 1600 can include input region 1682 located close to or near sample 1620 or an edge of the system. Input region 1682 can be formed by one or more transparent components including, but not limited to, a window, optical shutter, or mechanical shutter.

Light 1650 can exit system 1600 through input region 1682. Light that exits system 1600 and travels to location 1657 can be referred to as light 1652. Light 1652 can have any angle of incidence at location 1657 including, but not limited to, 45°. In some examples, light 1650 can a collimated beam. Location 1657 can include a concentration of the substance of interest. Light 1652 can be partially absorbed at location 1657 and can be partially reflected as light 1654. In some examples, light 1654 can be formed by light transmitting through the sample. Light 1654 can penetrate through sample 1620 and can enter system 1600 at location 1613 of optics 1610. In some examples, optics 1610 can be in contact or near sample 1620. Optics 1610 can be any type of optical component capable of changing the behavior and properties of the incoming light. Optics 1610 can include a plurality of locations, including location 1613 and 1617, where light is allowed to enter. In some examples, optics 1610 can include a transparent material. In some examples, optics 1610 can be a Fresnel lens or a lens configured with a large aperture (e.g., an aperture larger than the size of the incoming light beam) and a short focal length. In some examples, optics 1610 can be a Silicon lens.

System 1600 can include optics, such as a confocal system. A confocal system can be any type of optical system configured for resolving path lengths, angles of incidence, exit locations, or any combination of these properties of multiple optical paths within a sample. In some examples, the optical system configured for accepting one or more incident light rays with a path length within a range of path lengths and an angle of incidence within a range of angles, and rejecting optical paths with a path length outside the range of path lengths and with an angle of incidence outside the range of angles. A confocal system can include optics 1616 and optics 1618. Optics 1616 and optics 1618 can be objective lenses. An objective lens can be a lens capable of collecting the incident light and magnifying the light beam, while having a short focal length. Optics 1616 can collect light 1654 and direct light 1654 towards an aperture included in aperture 1686. Aperture 1686 can include one or more apertures, such as opening 1685, configured to allow light to transmit through. Aperture 1686 can be capable of selecting light with one or more specific path lengths, angles of incidence, or both and rejecting or attenuating light with other path lengths or angles of incidence. Selection and rejection of light based on path length, angle of incidence, or both can be optimized by adjusting the aperture size (i.e., the size of the aperture in the aperture plane). The selected light (i.e., light with one or more specific path lengths, angles of incidence, or both) can be in focus when it reaches an aperture in the aperture plane, and rejected light can be out of focus. Light that is out of focus can have a beam size that is larger than the aperture size, can have an angle of incidence that is outside the collection range, or both, and therefore can be rejected. Light that is in focus can have a light beam that is within a range of path lengths and range of collection angles, and therefore can be allowed to transmit through the aperture plane. In some examples, the system can include one or more modulating elements, such as micromirrors, acousto-optic modulators, or electro-optic modulators.

Light 1654 exiting opening 1685 can transmit through optics 1618 and can be incident on microoptics 1623, included in microoptics unit 1629. Microoptics unit 1629 can comprise a plurality of microlenses, such as microoptics 1623 and microoptics 1627, attached to a substrate. A microlens can be a small lens or one that is smaller (e.g., a lens with a diameter less than 1 mm) than a conventional lens. In some examples, the microlenses can be any type of lens and can include any type of material conventionally used in lenses. In some examples, two or more of the microlenses can have the same optical and/or physical properties. One skilled in the art would appreciate that the same optical properties and the same physical properties can include tolerances that result in a 15% deviation. Light 1654 can transmit through microoptics 1623 and can be incident on detector pixel 1633. In some examples, microoptics unit 1629 can be coupled to one or more aperture planes. In some examples, microoptics unit 1629 can be coupled to a patterned aperture, such as an aperture where locations between adjacent microoptics are opaque to prevent light mixing.

Detector pixel 1633 can be included in detector array 1630. Detector array 1630 can include a plurality of detector pixels, such as detector pixel 1633 and 1637. In some examples, detector array 1630 can be a single detector pixel detector. In some examples, at least one detector pixel can be independently controlled from other detector pixels included in detector array 1630. In some examples, at least one detector pixel can be capable of detecting light in the SWIR. In some examples, at least one detector pixel can be a SWIR detector capable of operating between 2.2-2.7 μm. In some examples, at least one detector pixel can be a HgCdTe, InSb, or InGaAs based detector. In some examples, at least one detector pixel can be capable of detecting a path length, angle of incident, and/or exit location of the incoming light beam. Detector pixel 1633 can detect light 1654 and can generate an electrical signal indicative of the properties of light 1654. Detector array 1630 can transmit the electrical signal to controller 1640. Controller 1640 can process and/or store the electrical signal.

System 1600 can determine the concentration and type of substance in sample 1620 by utilizing the information from light traveling through the sample in conjunction with the information from light reflecting off reflector 1622. Light source 1602 can emit light 1664, which can reflect off reflector 1622. Reflector 1622 can include any type of material capable of at least partially reflecting light. Exemplary reflective materials can include, but are not limited to, Ti, Co, Nb, W, NiCr, TiW, Cr, Al, Au, and Ag. The thickness of reflector 1622 can be determined based on the wavelength of light, type of material, and/or composition. In some examples, the size and shape of reflector 1622 can be configured to be larger or the same size and/or shape of the light beam included in light 1664. One skilled in the art would appreciate that the same size and the same shape can include tolerances that result in a 15% deviation. In some examples, reflector 1622 can be configured to reflect greater than 75% of light 1764. In some examples, reflector 1622 can be configured to reflect greater than 90% of light 1764. In some examples, the size and shape of reflector 1622 can be such that no or a minimal (e.g., less than 10%) amount of light 1664 is allowed to transmit through the reflector 1622, and light 1664 is prevented from traveling through sample 1620. In some examples, reflector 1622 can be configured to reflect light 1664 as a specular reflection. In some examples, reflector 1622 can be a spectroscopically neutral blocker. In some examples, the reference can be formed by chopping light 1664 between the sample 1620 and reference (e.g., reflector 1622).

Light 1664 can reflect off reflector 1622 towards optics 1616. Light 1664 can transmit through optics 1616 towards aperture 1686. In some examples, the path length of light 1664 can be a known value, so aperture 1686 can be configured to include opening 1689, whose size and shape can allow light 1664 to transmit through. Light 1664 exiting aperture plane 1668 can be incident on optics 1618. Light 1664 can transmit through optics 1618 and can be incident on optics 1619. Optics 1619 can be any type of optics configured for spreading out the incoming light beam. In some examples, optics 1619 can be a negative lens, which can be a lens with a focal length that is negative. In some examples, optics 1619 can be a prism. In some examples, optics 1619 can include a different prism wedge angled for each detector pixel included in detector array 1630. In some examples, system 1600 can be configured with a beamsplitter for spreading out the incoming light beam. In some examples, optics 1619 can be configured to spread out or divide light into multiple beams, such as light 1666 and light 1667. In some examples, optics 1619 can spread out light such that each light beam is directed to a different detector pixel included in detector array 1630. In some examples, optics 1619 can uniformly spread out light such that one or more optical properties of each light beam are the same. One skilled in the art would appreciate that the same optical properties can include tolerances that result in a 15% deviation. In some examples, optics 1619 can spread out the light beam such that intensities of at least two light beams are different. In some examples, optics 1619 can comprise multiple optics or microoptics. In some examples, the size and/or size of optics 1619 can be based on the number of detector pixels and/or the properties of the one or more light beams exiting optics 1619. In some examples, an aperture can be coupled to optics 1619 to control the properties and/or direction of light exiting optics 1619. In some examples, optics 1619 or system 1600 can be configured such that light that reflects off a surface of sample 1620 or an edge of system 1600 reflects back into the system (i.e., light that has not traveled through sample 1620) and is prevented from being incident on optics 1619, although stray light or background light can be incident on optics 1619.

Light 1664 can transmit through optics 1619 to form light 1666. Light 1666 can be incident on detector pixel 1633. Detector pixel 1633 can detect light 1666 and can generate an electrical signal indicative of the properties of light 1666. Detector array 1630 can transmit the electrical signal controller 1640. Controller 1640 can process and/or store the electrical signal. Controller 1640 can utilize the signal information measured from light 1654 to determine the reflectivity or concentration of the substance at location 1657 and can utilize the signal information from light 1666 to determine the properties of reflector 1622. Using any of the above discussed methods, controller 1640 can process both signal information to determine the concentration and type of substance at location 1657.

Similar to measuring the concentration and type of one or more substances at location 1657, the same components can be used to measure the concentration and type of one or more substances at location 1659. Light source 1602 can emit light 1650, which can exit system 1600 at input region 1682 to form light 1653. In some examples, system 1600 can include multiple apertures. For example, system 1600 can include at least two apertures, where light 1652 can exit one aperture and light 1653 can exit another aperture. Light 1653 can be incident on location 1659 and can reflect back into system 1600 as light 1655. Light 1655 can enter system 1600 through optics 1610 at location 1617. Light 1655 can transmit through optics 1616 and can be incident on aperture 1686. Aperture 1686 can include opening 1687 configured to allow light 1655 (and any light with the same path length as light 1655) to transmit through. One skilled in the art would appreciate that the same path length can include tolerances that result in a 15% deviation. In some examples, since location 1657 can be located at depth 1661, different from depth 1663 of location 1659, aperture 1686 can include at least two apertures with different aperture sizes. For example, opening 1685 can be configured with an aperture size based on the path length of light 1654, and opening 1687 can be configured with an aperture size based on the path length of light 1655. Light 1655 can transmit through opening 1687, can transmit through optics 1618, and can be incident on microoptics 1627. Light 1655 can transmit through microoptics 1627 and can be detected by detector pixel 1637, included in detector array 1630. Detector pixel 1637 can detect light 1655 and can generate an electrical signal indicative of the properties of light 1655. Detector array 1630 can transmit the electrical signal can be transmitted to controller 1640, and controller 1640 can process and/or store the electrical signal.

Controller 1640 can utilize the signal information measured from light 1655 to determine the reflectivity or concentration of the substance at location 1659 and can utilize the signal information from light 1667 to determine the properties of reflector 1622. Controller 1640 can process both signal information to determine the concentration of the substance at location 1659. In some examples, controller 1640 can determine the properties of reflector 1622 (or light 1666 incident on detector pixel 1633) and light 1667 incident on detector pixel 1637 simultaneously without the need for separate measurements. In some examples, location 1657 and location 1659 can have the same depth from a surface of the sample 1620. One skilled in the art would appreciate that the same depth can include tolerances that result in a 15% deviation. In some examples, location 1657 and location 1659 can have different depths from the surface of the sample 1620. Controller 1640 can measure the reflectivity, refractive index, density, concentration, scattering coefficient, scattering anisotropy, absorbance, or any combination of optical properties at both location 1657 and location 1659 and can average the measured values. Although the FIGURE and discussion above relates to two locations in the sample, examples of the disclosure can include any number of locations and are not limited to one or two locations.

As illustrated in the FIGURE, system 1600 can include a plurality of apertures, a plurality of microoptics, and a plurality of detector pixels, where each aperture and microoptics can be coupled to a detector pixel. In some examples, each aperture-microoptics-detector pixel trio can be associated with a location in the sample. In some examples, the association can be one aperture-microoptics-detector pixel trio to one location in the sample. For example, opening 1685, microoptics 1623, and detector pixel 1633 can be associated with location 1657. Similarly, opening 1687, microoptics 1627, and detector pixel 1637 can be associated with location 1659. Since controller 1640 can associate detector pixel 1633 and detector pixel 1637 to the different locations (e.g., location 1657 and location 1659) in sample 1620, controller 1640 can determine and locate different concentrations of the substance for different locations within sample 1620. In some examples, different substances can be located in the different locations and controller 1640 can associate the locations to the different substances.

In some examples, system 1600 can be polarization sensitive. For some samples, polarized light incident on the sample can reflect strongly off the surface of the sample without undergoing a significant change in polarization. In some examples, this reflected light can be largely specular. In contrast, polarized light that enters the sample and reflects off one or more layers can have an initial polarization when incident on the sample, but can become progressively depolarized by scattering from one or more substances in the sample. The degree of polarization can be used to determine the depth that light travels in the sample prior to backscattering. The depth that light travels in the sample prior to backscattering can be used to estimate the path length of the optical path. In some examples, the path length of the optical path can be equal to two times the scattering depth. In some examples, the degree of polarization of light that travels through the sample and reflects back can also provide information about the nature of the sample.

In some examples, system 1600 can be configured to measure the change in polarization state by including one or more polarizing filters. A first polarizing filter can be located between light source 1602 and sample 1620, and a second polarizing filter can be located between sample 1620 and detector 1630. In some examples, the second polarizing filter can be different from the first polarizing filter in that the second polarizing filter can be configured to block out polarized light with a polarization that the first polarizing filter transmits through. In such a manner, light reflected off the surface of sample 1620 can be spatially separated from reflected off a location in sample 1620.

Figure 16B:
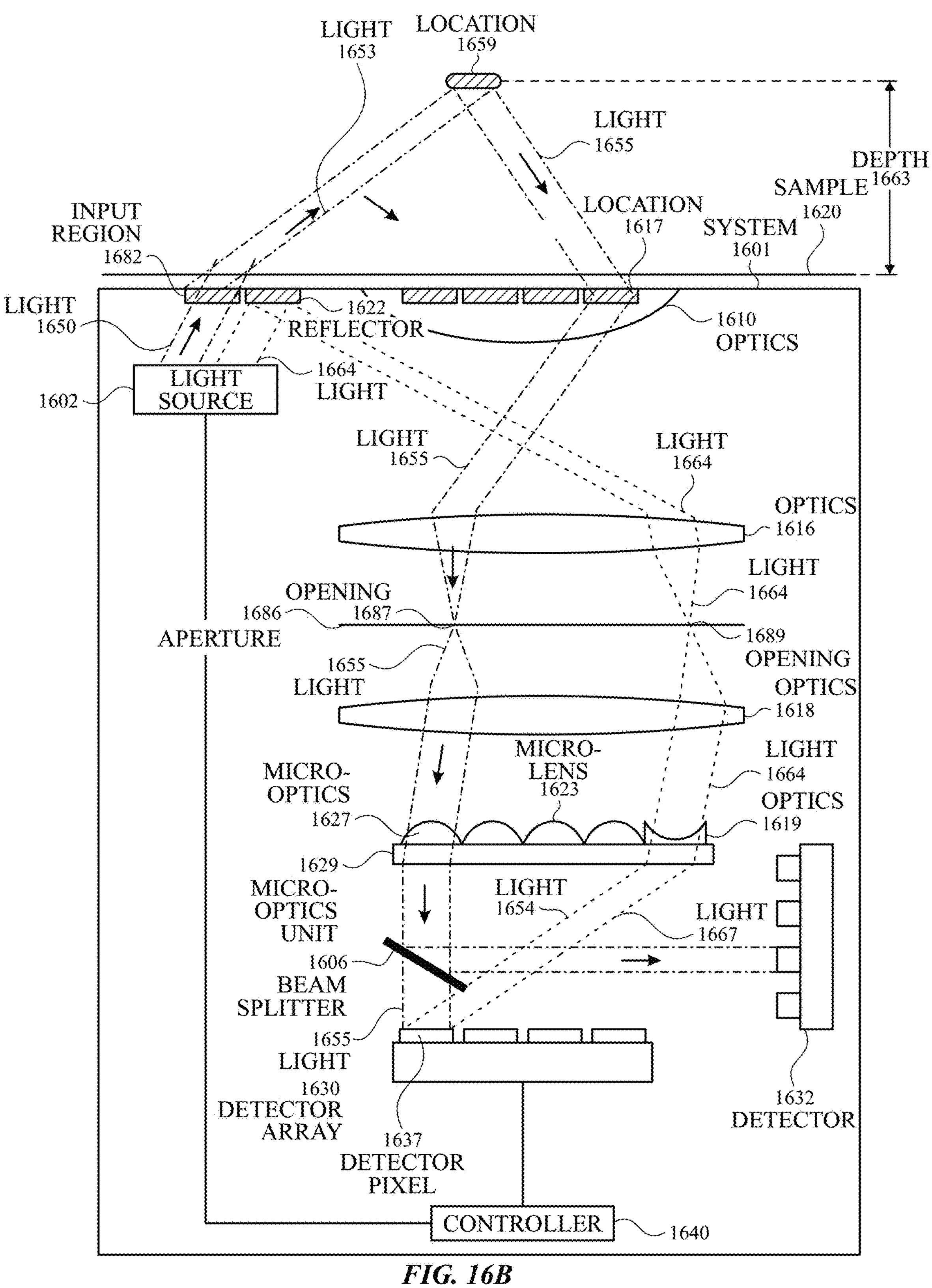
FIG. 16B illustrates a cross-sectional view of an exemplary polarization sensitive system according to examples of the disclosure.

FIG. 16B illustrates a cross-sectional view of an exemplary polarization sensitive system according to examples of the disclosure. System 1601 can include one or more of the components included in system 1600, discussed above and illustrated in FIG. 16A. System 1601 can further include beamsplitter 1606 and detector 1632. Beamsplitter 1606 can split light 1655 into two light paths, one light path can be measured by detector pixel 1637 included in detector array 1630, and the other light path can be measured by detector 1632. Detector pixel 1637 can be configured to measure a different polarization than detector 1632. For example, detector pixel 1637 can be configured to measure p-polarization, whereas detector 1632 can be configured to measure s-polarization.

In some examples, beamsplitter 1606 can be a polarizing beamsplitter. S-polarized light can reflect off a surface of beamsplitter 1606 and can be detected by detector 1632. In some examples, detector 1632 can include a wire grid polarizer located on its surface. In some examples, detector 1630 can include a wire grid polarizer located on the surface. P-polarized light can transmit through beamsplitter 1606 and can be detected by detector pixel 1637. Based on the ratio of s-polarized light (e.g., light detected by detector 1632) and p-polarized light (e.g., light detected by detector pixel 1637), the concentration and type of one or more substances in the sample can be determined.

In some examples, specular reflectance from light that has not traveled into the sample can be excluded or removed from the measurements by configuring light 1653 to have an angle of incidence at location 1659 different from the angle of the incidence of scattered light 1655 at location 1617. In some examples, the specular reflectance can be discarded by directing light onto a black absorbing material (e.g., black mask). In some examples, system 1601 can include a polarizer located between location 1659 and detector pixel 1637. The polarizer can be configured to exclude light having one or more polarizations.

In some examples, the amount of scattering can depend on the size of the scattering objects in the sample. As a result, the amount of scattering and the peak scattering angle can be a function of wavelength. For example, at 1.5-2.5 μm, a large percentage of light (e.g., greater than 30%) scattered from the sample can have a scattering angle between 40-60°. The scattering angle can be related to the size of one or more substances located in the sample. By associating the scattering angles with the size of one or more substances located in the sample, different types of substances in the sample can be identified and distinguished. In some examples, system 1601 can include a wide wavelength band (e.g., greater than 1200 nm spectral range) antireflective (AR) coating in order to detect light with a scattering angle between 40-60°. In some examples, system 1601 can include one or more masking materials to limit the range of scattering angles detected by the system 1601.

Figure 17:
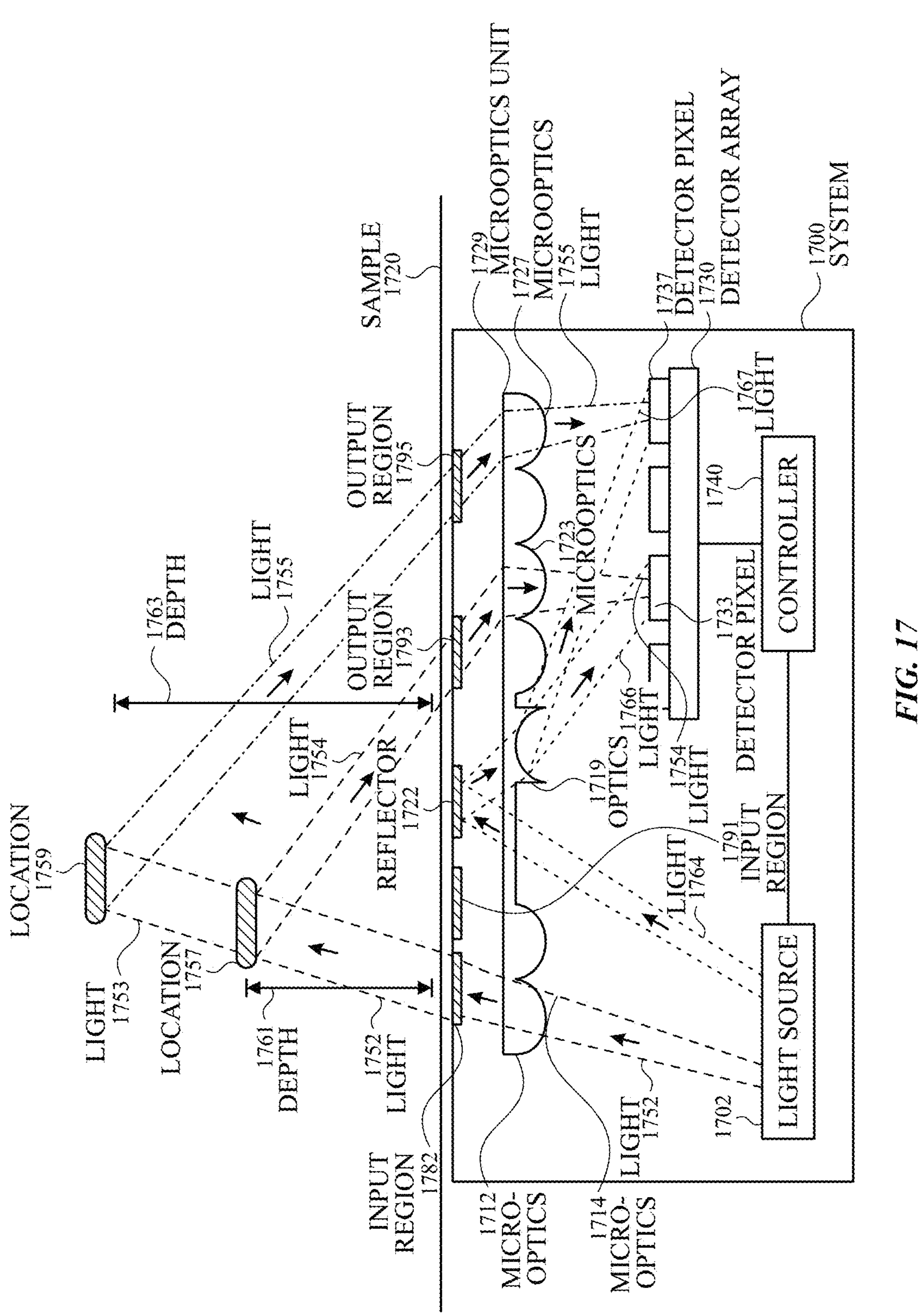
FIG. 17 illustrates a cross-sectional view of an exemplary system configured for determining a concentration and type of substance in a sample according to examples of the disclosure.

FIG. 17 illustrates a cross-sectional view of an exemplary system configured to determine a concentration and type of one or more substances located within a sample according to examples of the disclosure. In some examples, the one or more substances of interest can have a low concentration (e.g., more than one order of magnitude less) in the sample than other substances of interest. In some examples, the concentration of the one or more substances can lead to a low SNR (i.e., SNR<$10^{-4}$ or $10^{-5}$). Sample 1720 can include one or more locations, such as location 1757 and location 1759, where one or more substances can be measured.

System 1700 can be close to, touching, resting on, or attached to sample 1720. In some examples, system 1700 can be a compact, portable electronic device. Compact, portable electronic devices can have stringent size requirements due to the increasing demand for smaller, thinner, and lighter design that are more user-friendly and aesthetically appealing. To implement the functionality of the above disclosed examples, system 1700 can include components such as light source 1702, microoptics unit 1729, detector array 1730, and controller 1740. One or more components or optics can be eliminated by integrating the features into other components or optics and by placing the integrated components closer to a surface of the sample or an edge of the system.

Light source 1702 can be configured to emit light 1752. Light source 1702 can be any source capable of generating light including, but not limited to, a lamp, laser, LED, OLED, EL source, super-luminescent diode, super-continuum source, fiber-based source, or a combination of one or more of these sources. In some examples, light source 1702 can be capable of emitting a single wavelength of light. In some examples, light source 1702 can be capable of emitting a plurality of wavelengths of light. In some examples, light source 1702 can be any tunable source capable of generating a SWIR signature. Light source 1702 can include one or more components for emitting multiple light beams, such as light 1752 and light 1753, directed at different apertures, such as input region 1782 and input region 1791. Input region 1782 and input region 1791 can be located close to or near sample 1720 or an edge of the system 1700. System 1700 can also include one or more apertures, such as input region 1782, input region 1791, output region 1793, and output region 1795, and each aperture can be comprise one or more transparent components including, but not limited to, a window, optical shutter, and mechanical shutter.

Light 1752 can exit system 1700 through input region 1782. Light 1752 can penetrate through sample 1720 and can be incident on location 1757. Light 1752 can have any angle of incidence at location 1757 including, but not limited to, 45°. In some examples, light 1752 can be a collimated beam. Location 1757 can include a concentration of the substance of interest. Light 1752 can be partially absorbed at location 1757 and can be partially reflected as light 1754. In some examples, light 1754 can be formed by light transmitting through the sample. Light 1754 can penetrate through sample 1720 and can enter system 1700 through output region 1793.

Light 1754 can be incident on microoptics 1723 of microoptics unit 1729. Microoptics unit 1729 can comprise a plurality of microoptics, such as microoptics 1723 and 1727, attached to a substrate. In some examples, the microoptics can be any type of lens and can include any type of material conventionally used in lenses. In some examples, two or more of the microoptics included in the microoptics unit 1729 can have the same optical and/or physical properties. One skilled in the art would appreciate that the same optical properties and the same physical properties can include tolerances that result in a 15% deviation. Light 1754 can transmit through microoptics 1723 and can be incident on detector pixel 1733 of detector array 1730. In some examples, microoptics unit 1729 can be coupled to one or more apertures or apertures. In some examples, microoptics unit 1729 can be coupled to a patterned aperture, such as an aperture where locations between adjacent microoptics are opaque to prevent light mixing.

Detector pixel 1733 can be included in detector array 1730. Detector array 1730 can include a plurality of detector pixels, such as detector pixels 1733 and 1737. In some examples, detector array 1730 can be a single pixel detector. In some examples, at least one detector pixel can be independently controlled from other detector pixels in the detector array 1730. In some examples, at least one detector pixel can be capable of detecting light in the SWIR. In some examples, at least one detector pixel can be a SWIR detector capable of operating between 2.2-2.7 μm. In some examples, at least one detector pixel can be a HgCdTe, InSb, or InGaAs based detector. In some examples, at least one detector pixel can be capable of detecting a position and/or angle of the incoming light beam. Detector pixel 1733 can detect light 1754 and can generate an electrical signal indicative of the properties of light 1754. Detector array 1730 can transmit the electrical signal to controller 1740, which can process and/or store the electrical signal.

Light source 1702 can also emit light 1764 to measure the optical properties of reflector 1722. Reflector 1722 can comprise any type of material, such as Ti, Co, Nb, W, NiCr, TiW, Cr, Al, Au, and Ag, capable of partially reflecting or reflecting a large percentage of light. The thickness of reflector 1722 can be determined based on the wavelength of light, type of material, and/or composition. In some examples, the size and shape of reflector 1722 can be configured to be larger or the same size and/or shape of light 1764. One skilled in the art would appreciate that the same size and the same shape can include tolerances that result in a 15% deviation. In some examples, the reflector 1722 can be configured to reflect greater than 75% of light. In some examples, the reflector 1722 can be configured to reflect greater than 90% of light. In some examples, the size and shape of reflector 1722 can be such that no or minimal (e.g., less than 10%) amounts of light 1764 is allowed to transmit through reflector 1722, and light 1764 is prevented from penetrating through sample 1720. In some examples, reflector 1722 can be configured to reflect light 1764 as a specular reflection. In some examples, reflector 1722 can be a spectroscopically neutral blocker. In some examples, the reference can be formed by chopping light 1764 between sample 1720) and the reference (e.g., reflector 1722).

Light 1764 can reflect off reflector 1722 towards optics 1719. Optics 1719 can be any type of optics configured for spreading out the incoming light beam. In some examples, optics 1719 can be a negative lens, which can be a lens with a focal length that is negative. In some examples, optics 1719 can be a prism. In some examples, optics 1719 can include a different prism wedge angled for each detector pixel included in the detector array 1730. In some examples, system 1700 can be configured with a beamsplitter for spreading out the incoming light beam. In some examples, optics 1719 can be configured to spread out or divide light into multiple beams, such as light 1766 and 1767. In some examples, optics 1719 can spread out light such that each light beam is directed to a different detector pixel included in the detector array 1730. In some examples, optics 1719 can uniformly spread out light such that each light beam has one or more optical properties that are the same. One skilled in the art would appreciate that the same optical properties can include tolerances that result in a 15% deviation. In some examples, optics 1719 can spread out the light beam such that intensities of at least two light beams are different. In some examples, optics 1719 can comprise multiple optics or microoptics. In some examples, the size and/or size of optics 1719 can be based on the number of detector pixels and/or the properties of the one or more light beams exiting optics 1719. In some examples, an aperture can be coupled to optics 1719 to control the properties and/or direct light exiting optics 1719. In some examples, optics 1719 or system 1700 can be configured such that light that reflects off a surface of sample 1720 or an edge of system 1700 reflects back into the system (i.e., light that has not traveled through sample 1720) and is prevented from being incident on optics 1719, although stray light or background light can be incident on optics 1719.

Light 1764 can transmit through optics 1719 to form light 1766. Light 1766 can be incident on detector pixel 1733. Detector pixel 1733 can detect light 1766 and can generate an electrical signal indicative of the properties of light 1766. Detector array 1730 can transmit the electrical signal to controller 1740, which can process and/or store the electrical signal. Controller 1740 can utilize the signal information measured from light 1754 to determine the reflectivity or concentration of the substance at location 1757 and can utilize the signal information from light 1766 to determine the properties of reflector 1722. Using any of the above discussed methods, controller 1740 can process both signal information to determine the concentration of the substance at location 1757.

Similar to measuring the concentration of the substance at location 1757, the same components can be used to measure the concentration of the substance at location 1759. Light source 1702 can emit light 1753, which can exit system 1700 at input region 1791. Light 1753 can be incident on location 1759 and can reflect back into system 1700 as light 1755. Light 1755 can enter system 1700 at output region 1795. Light 1755 can be incident on microoptics 1727, included in microoptics unit 1729. Light 1755 can transmit through microoptics 1727 and can be incident on detector pixel 1737, included in detector array 1730. Detector pixel 1737 can detect light 1755 and can generate an electrical signal indicative of the properties of light 1755. Detector array 1730 can transmit the electrical signal to controller 1740, which can process and/or store the electrical signal. Controller 1740 can utilize the signal information measured from light 1755 to determine the reflectivity or concentration of the substance at location 1759 and can utilize the signal information from light 1767 to determine the properties of reflector 1722. Controller 1740 can process both signal information to determine the concentration of the substance at location 1759 located in sample 1720. In some examples, controller 1740 can determine the properties of reflector 1722 (or light 1766 incident on detector pixel 1733) and light 1767 incident on detector pixel 1737 simultaneously without the need for separate measurements. Controller 1740 can measure the reflectivity, refractive index, density, concentration, scattering coefficient, scattering anisotropy, absorbance, or a combination of these optical properties at both location 1757 and location 1759 and can average the measured values. Although the FIGURE and discussion above relates to two locations in the sample, examples of the disclosure can include any number of locations and are not limited to one or two locations.

As illustrated in the FIGURE, system 1700 can include a plurality of microoptics and a plurality of detector pixels, where each microoptics can be coupled to a detector pixel. Each microoptics-detector pixel pair can be associated with a location in the sample. In some examples, the association can be one microoptics-detector pixel pair to one location in the sample. For example, microoptics 1723 and detector pixel 1733 can be associated with location 1757. Microoptics 1727 and detector pixel 1737 can be associated with location 1759. Since controller 1750 can associate detector pixel 1733 and detector pixel 1737 to the different locations (e.g., location 1757 and location 1759) within the sample, controller 1750 can determine and locate different concentrations of the substance for different locations in sample 1720.

Figure 18:
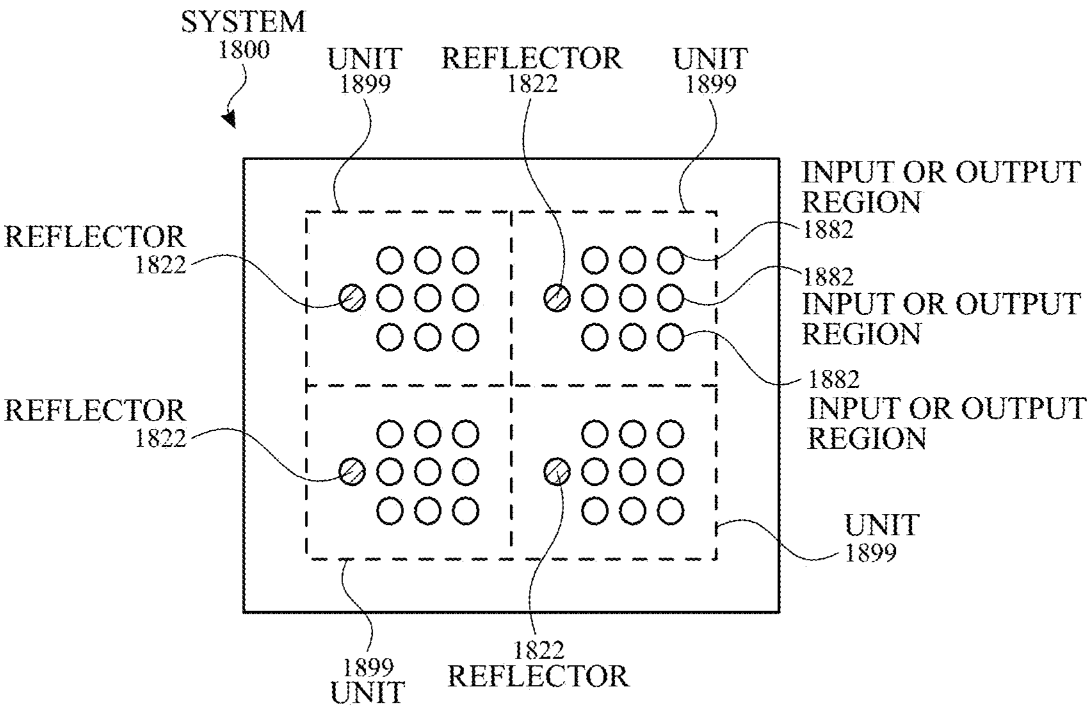
FIGS. 18-19 illustrate top views of a surface of exemplary systems configured for determining a concentration and type of substance located in a sample according to examples of the disclosure.

FIG. 18 illustrates a top view of an exemplary system configured to measure one or more substances located within a sample according to examples of the disclosure. System 1800 can be close to, touching, resting on, or attached to the sample. System 1800 can be segmented into a plurality of units 1899. Each unit 1899 can comprise one or more reflectors 1822 and a plurality of apertures 1882. Reflector 1822 can include any type of material capable of at least partially reflecting light. In some examples, reflector 1822 may not be visible from the top view, but can be placed in the same location as indicated by the figure.

One or more of the plurality of apertures 1882 can be configured to allow light to enter or exit the top surface of system 1800. One or more optical components, such as a light source, lens, microlens, detector pixel, or detector array, can be located close to, below, or above one or more of the plurality of apertures 1882. In some examples, apertures 1882 and/or reflector 1822 can be circular in shape or can be a metal dot. In some examples, apertures 1882 and reflector 1822 can be separated by a gap or an optical isolation material to prevent light mixing. Although the FIGURE illustrates the plurality of apertures 1882 as arranged in a column and row format with reflector 1822 located on one side of unit 1899, the plurality of apertures 1882 can be arranged in any manner. For example, reflector 1822 can be located in the center and can be associated with surrounding apertures 1882 and corresponding components. In some examples, reflector 1822 can be associated with those optical components located in the same unit 1899. For example, the reference measurement from reflector 1822 can be distributed by a negative lens (or prism or beamsplitter) to the optical components in the same unit 1899. In some examples, each input or output region 1882 can be associated with a lens or microlens. The size and/or shape of the input or output region 1882 or lens or both can be based on location of the associated detector pixel in a detector array. In some examples, each input or output region 1882 can be associated with a depth below the surface of the sample and/or the angle of incidence of incoming light.

In some examples, due to the small size of the apertures, any of the above disclosed systems can include on 10-100 apertures and reflectors. For example, each aperture can have a diameter of 100-900 μm, and each unit can have a length (or width) of around 5 mm. With a large number of apertures and reflectors, the system can measure a plurality of locations within the sample. In some examples, a plurality of apertures can be configured to measure locations with the same depth, and the controller can have a sufficient number of values to average to account for the inhomogeneity that can exist along different locations within the sample. One skilled in the art would appreciate that the same depth can include tolerances that result in a 15% deviation. In some examples, a plurality of apertures can be configured to measure locations with differing depths, and the system can account for inhomogeneity that can exist along the depth of sample. In some examples, a first set of apertures can be configured to measure a first substance, and a second set of apertures can be configured to measure a second substance different from the first substance.

Figure 19:
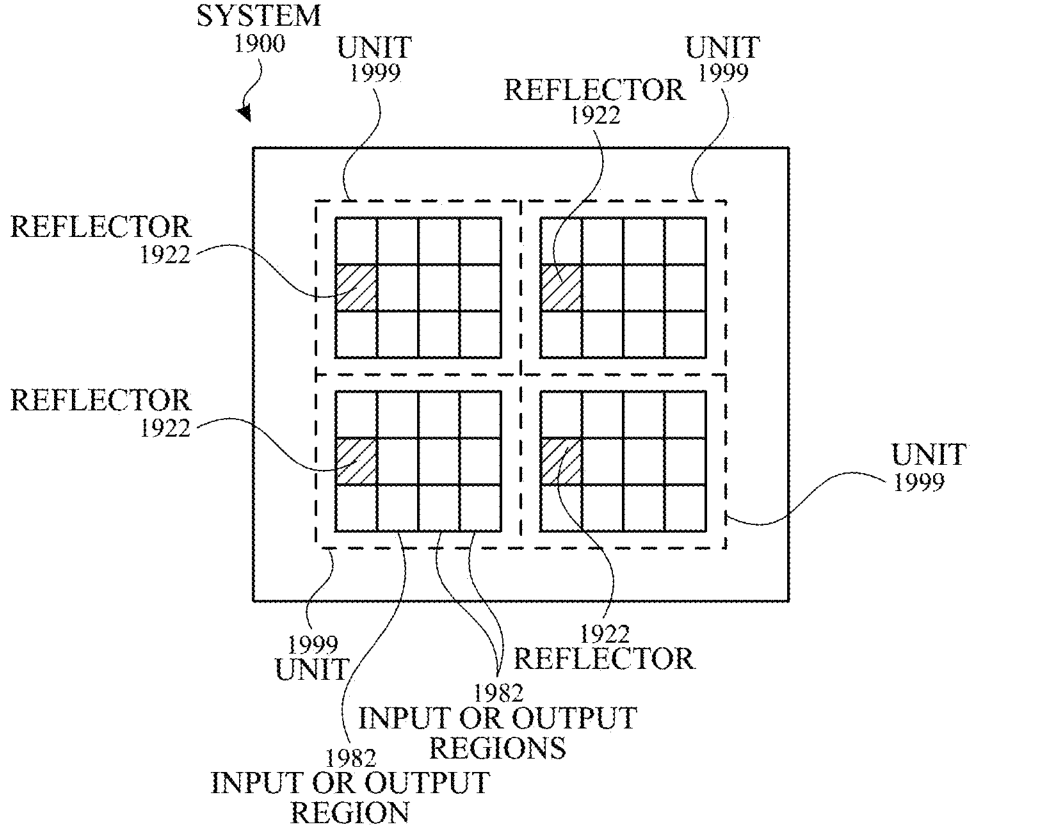

FIG. 19 illustrates a top view of an exemplary system configured to measure a concentration and type of one or more substances located within a sample according to examples of the disclosure. System 1900 can be close to, touching, resting on, or attached to the sample. System 1900 can be segmented into a plurality of units 1999. Each unit 1999 can comprise one or more reflectors 1922 and a plurality of input or output regions 1982. Reflector 1922 can include any type of material capable of at least partially reflecting light. In some examples, reflector 1922 may not be visible from the top view, but can be placed in the same location as indicated by the FIGURE. One skilled in the art would appreciate that the same location can include tolerances that result in a 15% deviation.

One or more of the plurality of input or output regions 1982 can be configured to allow light to enter or exit the top surface of system 1900. One or more optical components, such as a light source, lens, microlens, detector, or detector array, can be located close to, below, or above one or more of the plurality of input or output regions 1982. System 1900 can have the same components as system 1800, but arranged as a grid of squares. In some examples, input or output regions 1982 and reflector 1922 can be separated by a gap or an optical isolation material to prevent light mixing. In some examples, reflector 1922 can be associated with input or output regions 1982 and corresponding optical components within the same unit 1999.

Although some of the examples described and illustrated above were discussed separately, one skilled in the art would understand that one or more of the examples can be combined and included into a single system and/or method. For example, although system 1500 (illustrated in FIG. 15) includes light blocker 1592 and system 1600 (illustrated in FIGS. 16A-16B) includes aperture 1686, both examples can be combined and included in a single system.

One or more of the functions described above can be performed, for example, by firmware stored in memory and executed by a processor or controller. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding a signal) that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus, or device, a portable computer diskette (magnetic), a random access memory (RAM) (magnetic), a read-only memory (ROM) (magnetic), an erasable programmable read-only memory (EPROM) (magnetic), a portable optical disc such as a CD, CD-R, CD-RW, DVD, DVD-R, or DVD-RW, or flash memory such as compact flash cards, secured digital cards, USB memory devices, memory sticks and the like. In the context of this document, a "transport medium" can be any medium that can communicate, propagate, or transport the program for use by or in connection with the instruction execution system, apparatus, or device. The transport readable medium can include, but is not limited to, an electronic, magnetic, optical, electromagnetic, or infrared wired or wireless propagation medium.

As discussed above, examples of the disclosure can include measuring a concentration of a substance in a sample at a sampling interface. In some examples, the sample can include at a least a portion of a user, where additional information can be used to improve the delivery of measured information, analysis, or any other content that may be of interest to the users. In some examples, the measured information, analysis, or other content may include personal information such as information that can uniquely identify the user (e.g., can be used to contact or locate the user). In some examples, personal information can include geographic information, demographic information, telephone numbers, email addresses, mailing addresses, home addresses, or other identifying information. Use of such personal information can be used to the benefit of the user. For example, the personal information can be used to deliver the measured information, analysis, or other content to the user. Use of personal information can include, but is not limited to, enabling timely and controlled delivery of the measured information.

The disclosure also contemplates that an entity that may be measuring, collecting, analyzing, disclosing, transferring, and/or storing the personal information will comply with well-established privacy policies and/or practices. These privacy policies and/or practices can be generally recognized as meeting (or exceeding) industry or governmental requirements for private and secure personal information and should be implemented and consistently used. For example, personal information should be collected for legitimate and reasonable purposes (e.g., to deliver the measured information to the user) and should not be shared (e.g., sold) outside of those purposes. Furthermore, collected personal information should occur only after receiving the informed consent of the user(s). To adhere to privacy policies and/or practices, entities should take any steps necessary for safeguarding and securing outside access to the personal information. In some examples, entities can subject themselves to third party evaluation(s) to certify that the entities are adhering to the well-established, generally recognized privacy policies and/or practices.

In some examples, the user(s) can selectively block or restrict access to and/or use of the personal information. The measurement system can include one or more hardware components and/or one or more software applications to allow the user(s) to selective block or restrict access to and/or use of the personal information. For example, the measuring system can be configured to allow users to "opt in" or "opt out" of advertisement delivery services when collecting personal information during registration. In some examples, a user can select which information (e.g., geographical location) to provide and which information (e.g., phone number) to exclude.

Although examples of the disclosure can include systems and method for measuring a concentration of a substance with the use of the user's personal information, examples of the disclosure can also be capable of one or more functionalities and operation without the user's personal information. Lack of all or a portion of the personal information may not render the systems and methods inoperable. In some examples, content can be selected and/or delivered to the user based on non-user specific personal (e.g., publicly available) information.

In some examples, a system for measuring a concentration of a substance in a sample at a sampling interface is disclosed. The system may comprise: a light source configured to emit a first light including one or more wavelengths; one or more optics; one or more modulators configured to modulate at least a portion of the first light, the one or more modulators located between the one or more optics and the sampling interface; a reference comprising one or more spectroscopic properties; a first detector configured to detect the at least portion of the first light; and logic configured to: send one or more first signals to the light source, and receive one or more second signals from the first detector. Additionally or alternatively to one or more examples disclosed above, in some examples, the one or more modulators includes an optical chopper located between the light source and the sampling interface or reference. Additionally or alternatively to one or more examples disclosed above, in some examples, the reference is at least one of a neutral density filter, blank attenuator, and a reflector. Additionally or alternatively to one or more examples disclosed above, in some examples, the reference is a reflector made of at least one of Titanium (Ti), Cobalt (Co), Niobium (Nb), Tungsten (W), Nickel Chrome (NiCr), Titanium Tungsten (TiW), Chrome (Cr), Aluminum (Al), Gold (Au), and Silver (Ag). Additionally or alternatively to one or more examples disclosed above, in some examples, the reference is a reflector configured with a size that is greater than or equal to a size of the first light emitted from the light source. Additionally or alternatively to one or more examples disclosed above, in some examples, the reference is a reflector that includes a metal dot. Additionally or alternatively to one or more examples disclosed above, in some examples, the reference is a specular reflector. Additionally or alternatively to one or more examples disclosed above, in some examples, the reference is a reflector and a portion of the first light is incident on the reflector. Additionally or alternatively to one or more examples disclosed above, in some examples, the system further comprises a filter, the filter including at least one of an acousto-optic tunable filter (AOTF), angle tunable narrow bandpass filter, or a plurality of sub-filters, each sub-filter having a different spectral range, located between the light source and the beamsplitter, the filter configured to select one or more discrete wavelengths from the one or more wavelengths of the first light emitted from the light source. Additionally or alternatively to one or more examples disclosed above, in some examples, an edge of the system is located at a sample-system interface, and further wherein the one or more optics includes a silicon objective lens, the silicon objective lens configured to collect a reflection of at least a portion of the first light at the sample-system interface. Additionally or alternatively to one or more examples disclosed above, in some examples, the first detector includes a plurality of detector pixels, and further wherein the one or more optics includes a optics configured for distributing a portion of the first light to one or more of the plurality of detector pixels. Additionally or alternatively to one or more examples disclosed above, in some examples, the first optics is at least one of a negative lens, prism, and beamsplitter. Additionally or alternatively to one or more examples disclosed above, in some examples, distributing the portion of the first light comprises splitting the portion of the first light into multiple light beams, each light beam directed to a different detector pixel included a set of the plurality of detector pixels. Additionally or alternatively to one or more examples disclosed above, in some examples, each detector pixel of the set of the plurality of detector pixels is associated with different locations in the sample, each location having a same path length within the sample. Additionally or alternatively to one or more examples disclosed above, in some examples, each detector pixel included in the set of plurality of detector pixels is associated with different path lengths in the sample. Additionally or alternatively to one or more examples disclosed above, in some examples, distributing a portion of the first light comprises splitting the portion of the first light into multiple light beams, at least one of the multiple light beams configured to have one or more properties that is same as another of the multiple light beams. Additionally or alternatively to one or more examples disclosed above, in some examples, the one or more optics includes a microoptics unit, the microoptics unit comprising a plurality of microlenses. Additionally or alternatively to one or more examples disclosed above, in some examples, the sample comprises a plurality of locations, and further wherein the first detector comprises a plurality of detector pixels, each detector pixel associated with one of the plurality of microoptics and one of the plurality of locations. Additionally or alternatively to one or more examples disclosed above, in some examples, the first detector is configured to measure short-wave infrared (SWIR) in at least a portion of 1.4-2.7 μm. Additionally or alternatively to one or more examples disclosed above, in some examples, the first detector is configured to measure short-wave infrared (SWIR) in at least a portion of 2.2-2.7 μm. Additionally or alternatively to one or more examples disclosed above, in some examples, the first detector is a HgCdTe, InSb, or InGaAs based detector. Additionally or alternatively to one or more examples disclosed above, in some examples, the system further comprises a light blocking material capable of absorbing or blocking light reflected from an edge of the system. Additionally or alternatively to one or more examples disclosed above, in some examples, the logic is further configured to: determine whether the received one or more second signals match a spectral fingerprint of the substance; and determine the concentration of the substance at the sampling interface based on the match of the spectral fingerprint. Additionally or alternatively to one or more examples disclosed above, in some examples, the one or more optics includes a beamsplitter configured to split at least a portion of the first light emitted from the light source into multiple beams comprising at least a second light and a third light. Additionally or alternatively to one or more examples disclosed above, in some examples, the system further comprises a second detector configured to detect a first polarization of the third light, wherein the first detector is configured to detect a second polarization of the second light, the second polarization being different than the first polarization.

In some examples, a system for projecting a first image is disclosed. The system comprising: one or more optics configured to reimage the first image located on a first plane to a second image located on a second plane, different from the first plane, at least one of the one or more optics producing an intermediate plane of focus located between the first plane and the second plane, wherein the first image includes a plurality of concentration values. Additionally or alternatively to one or more examples disclosed above, in some examples, the second image includes a magnification of the first image. Additionally or alternatively to one or more examples disclosed above, in some examples, the one or more optics is capable of selecting a first light with a same path length as a pre-determined path length or within a range of pre-determined path lengths and rejecting a second light with path length different from the pre-determined path length or outside the range of pre-determined path lengths. Additionally or alternatively to one or more examples disclosed above, in some examples, the system further comprises an aperture, the aperture comprising one or more aperture, each aperture configured to select the fourth light and reject the fifth light. Additionally or alternatively to one or more examples disclosed above, in some examples, the aperture comprises at least two apertures of different sizes.

In some examples, a method for measuring a concentration of a substance in a sample at a sampling interface, the method comprising: during a calibration phase: deactivating a light source and a modulator, determining a level by detecting with a detector an amount of dark current or stray light or both, and setting a zero level equal to the level; and during a measurement phase: measuring an absorbance, reflectance, or transmittance value in a same location of the sampling interface to determine an optical value; measuring an absorbance, reflectance, or transmittance value in a reference to determine a reference optical value, and dividing the optical value by the reference optical value to obtain a sampling point, repeating the determination of the optical value and the determination of the reference optical value to obtain a plurality of sampling points, and averaging the plurality of sampling points to determine the concentration of the substance at the sampling interface, wherein the number of plurality of sampling points within a continuous measurement phase is less than 100. Additionally or alternatively to one or more examples disclosed above, in some examples, the number of plurality of sampling points is less than or equal to 10. Additionally or alternatively to one or more examples disclosed above, in some examples, the method further comprises a plurality of frames, each frame include one calibration phase and one measurement phase, and wherein determining the concentration of the substance at the sampling interface comprising averaging the plurality of sampling points from at least two of the plurality of frames. Additionally or alternatively to one or more examples disclosed above, in some examples, a duration of the measurement phase is based on a stability of at least one of the laser and the detector. Additionally or alternatively to one or more examples disclosed above, in some examples, the duration of the measurement phase is less than 60 seconds. Additionally or alternatively to one or more examples disclosed above, in some examples, the method is capable of accounting for zero drift and gain drift from both the light source and the detector. Additionally or alternatively to one or more examples disclosed above, in some examples, the method is capable of removing stray light. Additionally or alternatively to one or more examples disclosed above, in some examples, determining the reference optical value comprises modulating light between the sample and the reference. Additionally or alternatively to one or more examples disclosed above, in some examples, the measurement phase includes a plurality of optical values and a plurality of reference optical values, and further wherein the plurality of optical values and the plurality of reference optical values are measured at different times within the measurement phase.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

What is claimed is:

1. A light measurement system for measuring concentration of a substance, the system comprising:
- a light source configured to emit light into a sample;
- a detector;
- a first optics unit configured to:
  - receive first light returned from a first location of the sample and focus the received first light on a plane; and
  - receive second light from a second location of the sample and focus the received second light on the plane;
- an aperture unit positioned at the plane and between the first optics unit and the detector, the aperture unit defining:
  - a first opening configured to selectively transmit a portion of the received first light; and
  - a second opening configured to selectively transmit a portion of the received second light; and
- a second optics unit positioned between the aperture unit and the detector, the second optics unit configured to:
  - receive the portion of the received first light from the aperture unit and direct the portion of the received first light to the detector; and
  - receive the portion of the received second light from the aperture unit and direct the portion of the received second light to the detector.

2. The light measurement system of claim 1, wherein:
- the detector comprises a first detector pixel and second detector pixel; and
- the second optics unit is configured to:
  - direct the portion of the received first light to the first detector pixel; and
  - direct the portion of the received second light to the second detector pixel.

3. The light measurement system of claim 2, further comprising a third optics unit positioned between the second optics unit and the detector, wherein the third optics unit comprises:

a first optics configured to receive the portion of the received first light from the second optics unit and direct the portion of the received first light to the first detector pixel; and a second optics configured to receive the portion of the received second light from the second optics unit and direct the portion of the received second light to the second detector pixel.

4. The light measurement system of claim 3, wherein:

the third optics unit comprises a microoptics unit having an array of micro lenses;

the first optics is a first micro lens of the array of micro lenses; and the second optics is a second micro lens of the array of micro lenses.

5. The light measurement system of claim 1, wherein the aperture unit is configured to selectively transmit light based on one or more pathlengths of received light, an angle of incidence of received light, or a combination thereof.

6. The light measurement system of claim 5, wherein:

the first opening comprises a first aperture size that is configured to selectively transmit light having a first pathlength and block light having a second pathlength; and the second opening comprises a second aperture size, different from the first aperture size, that is configured to selectively transmit light having the first pathlength and block light having the second pathlength.

7. The light measurement system of claim 6, wherein:

the first aperture size is configured to transmit light from a first depth of the sample; and the second aperture size is configured to transmit light from a second depth of the sample.

8. The light measurement system of claim 1, further comprising a controller operable coupled to the detector, wherein the controller is configured to determine a concentration of a substance in the sample based on the portion of the received first light measured by the detector and the portion of the received second light measured by the detector.

9. A light measurement system, comprising:

a light source configured to emit light into a sample;

a detector comprising a first detector pixel and a second detector pixel;

a first optics unit configured to:

receive first light returned from a first location of the sample and focus the received first light at on a plane; and receive second light from a second location of the sample and focus the received second light on the plane;

an aperture unit positioned at the plane and between the first optics unit and the detector, the aperture unit defining:

a first opening configured to selectively transmit a portion of the received first light; and a second opening configured to selectively transmit a portion of the received second light; and a microoptics unit positioned between the aperture unit and the detector, wherein the microoptics unit comprises:

a first optics configured to receive the portion of the received first light from the first opening and direct the portion of the received first light to the first detector pixel; and a second optics configured to receive the portion of the received second light from the second opening and direct the portion of the received second light to the second detector pixel.

10. The light measurement system of claim 9, further comprising a second optics unit positioned between the aperture unit and the microoptics unit, the second optics configured to:

receive the portion of the received first light from the aperture unit and direct the portion of the received first light to the first optics; and receive the portion of the received second light from the aperture unit and direct the portion of the received second light to the second optics.

11. The light measurement system of claim 10, wherein the first optics unit and the second optics unit each comprise an objective lens.

12. The light measurement system of claim 9, wherein:

the first optics is a first micro lens of an array of micro lenses; and the second optics is a second micro lens of the array of micro lenses.

13. The light measurement system of claim 12, wherein:

the microoptics unit comprises a substrate; and each microlens in the array of micro lenses is attached to the substrate.

14. The light measurement system of claim 12, wherein:

the microoptics unit comprises an array of microlenses; and microlenses of the array of micro lenses are separated by opaque sections.

15. The light measurement system of claim 9, wherein the first opening has a different size from the second opening.

16. A system for measuring concentration of a substance in a sample, the system comprising:

a light source configured to emit light into the sample;

a detector comprising a first detector pixel and a second detector pixel;

a plurality of output regions located at an interface of the system and configured to:

receive first light returned from a first location of the sample and focus the received first light at on a plane; and receive second light from a second location of the sample and focus the received second light on the plane;

an aperture unit positioned at the plane and between the plurality of output regions and the detector, the aperture unit defining:

a first opening configured to selectively transmit a portion of the received first light; and a second opening configured to selectively transmit a portion of the received second light; and an optics unit positioned between the aperture unit and the detector, the optics unit comprising:

a first optics configured to receive the portion of the received first light from the first opening and direct the portion of the received first light to the first detector pixel; and a second optics configured to receive the portion of the received second light from the second opening and direct the portion of the received second light to the second detector pixel.

17. The system of claim 16, wherein:

the detector comprises a plurality of detector pixels;

the optics unit comprises a plurality of microoptics; and each microoptics of the plurality of microoptics is optically coupled to a detector pixel of the plurality of detector pixels.

18. The system of claim 17, wherein each micro-optic-detector pixel pair is associated with a different sampling location.

19. The system of claim 16, further comprising a first objective lens positioned between the plurality of output regions and the aperture unit, and configured to focus the first light and the second light on the plane of the aperture unit.

20. The system of claim 19, further comprising a second objective lens positioned between the aperture unit and the optics unit and configured to focus light receive from the aperture unit on the optics unit.

* * * * *